United States Patent

Abe et al.

[11] Patent Number: 5,966,509
[45] Date of Patent: Oct. 12, 1999

[54] NETWORK MANAGEMENT DEVICE

[75] Inventors: Hiroaki Abe; Takahiro Miyazaki; Yuki Kajitani, all of Kawasaki; Kazuya Jimbo; Hideyuki Chiba, both of Sapporo, all of Japan

[73] Assignee: Fujitsu Limited, Kanagawa, Japan

[21] Appl. No.: 08/890,161

[22] Filed: Jul. 9, 1997

[30] Foreign Application Priority Data

Jan. 14, 1997 [JP] Japan .................................. 9-004645

[51] Int. Cl.⁶ .............................. G06F 11/30; G06F 17/40
[52] U.S. Cl. ............................... 395/182.02; 395/200.53; 395/200.54; 395/200.52
[58] Field of Search .............................. 395/182.02, 670, 395/200.53, 200.58, 200.3, 183.01, 200.52, 187.01, 200.54, 200.5

[56] References Cited

U.S. PATENT DOCUMENTS

| | | | |
|---|---|---|---|
| 5,436,909 | 7/1995 | Dev et al. | 395/182.02 |
| 5,471,617 | 11/1995 | Farrand et al. | 395/670 |
| 5,504,921 | 4/1996 | Dev et al. | 395/200.53 |
| 5,526,489 | 6/1996 | Nilakantan et al. | 395/200.58 |
| 5,559,955 | 9/1996 | Dev et al. | 395/182.02 |
| 5,586,254 | 12/1996 | Kondo et al. | 395/183.01 |
| 5,742,762 | 4/1998 | Scholl et al. | 395/200.3 |
| 5,751,933 | 5/1998 | Dev et al. | 395/182.02 |
| 5,774,667 | 6/1998 | Garvey et al. | 395/200.52 |
| 5,805,801 | 9/1998 | Holloway et al. | 395/187.01 |
| 5,812,750 | 9/1998 | Dev et al. | 395/182.02 |
| 5,835,720 | 11/1998 | Nelson et al. | 395/200.54 |
| 5,838,907 | 11/1998 | Hansen | 395/200.5 |

FOREIGN PATENT DOCUMENTS

| | | |
|---|---|---|
| 5-41706 | 2/1993 | Japan . |
| 5-252161 | 9/1993 | Japan . |
| 6-152599 | 5/1994 | Japan . |

*Primary Examiner*—Parshotam S. Lall
*Assistant Examiner*—Bau Trong Le
*Attorney, Agent, or Firm*—Helfgott & Karas, PC.

[57] ABSTRACT

A network management device for managing a plurality of network elements has a network element management data acquisition unit for acquiring, in stages, various management data possessed by the network elements when a session with a network element is resumed and when the network management device itself is started up, a rule management table for storing a dependence relationship between an operation and management data necessary to execute the operation, a feasible operation decision processing unit which, when an operation has been specified, refers to the dependence relationship to determine whether management data necessary to execute the operation has been acquired. If the necessary management data has been acquired, a network management execution unit executes network management conforming to the operation.

15 Claims, 57 Drawing Sheets

FIG. 7

| NE MANAGEMENT DATA ITEMS / OPERATION | DEVICE CONSTRUCTION | OE NO. | VPL | VCL | NE NO. | FRAME NO. | SHELF NO. | UNIT NO. | CARD NO. | VP NO. | VC NO. | |
|---|---|---|---|---|---|---|---|---|---|---|---|---|
| ADD ON NE | ○ | ○ | | | | | | | | | | |
| ACQUIRE CARD ATTRIBUTE | ○ | ○ | | | | | | | | | | |
| SET VC LINK | ○ | ○ | ○ | | | | | | | | | |
| SET VPC PATH | ○ | ○ | ○ | | | | | | | | | |
| SET VCC PATH | ○ | ○ | ○ | ○ | | | | | | | | |
| ⋮ | | | | | | | | | | | | |
| ⋮ | | | | | | | | | | | | |
| ACQUIRE OFFICE ALARM INFORMATION | | | | | ○ | | | | | | | |
| ACQUIRE FRAME ALARM INFORMATION | | | | | ○ | ○ | | | | | | |
| ACQUIRE SHELF ALARM INFORMATION | | | | | ○ | ○ | ○ | | | | | |
| ⋮ | | | | | | | | | | | | |
| ⋮ | | | | | | | | | | | | |

| MANAGED DEVICE | CELL COUNT |
|---|---|
| 123474234297782 (FRAME NO.) | 12 |
| 1762536446 (SHELF NO.) | 33 |
| 465987123459876 (UNIT NO.) | 45 |
| 4563298277 (CARD NO.) | 33 |

| MANAGEMENT CATEGORY | VALUE OF COUNT |
|---|---|
| CALL COUNT | 12 |
| SESSION COUNT | 33 |
| CELL COUNT | 35665316 |

FIG.24

| ACQUISITION | CALL COUNT |
|---|---|
| 1996/09/19/05/00 | 12 |
| 1996/09/19/05/15 | 33 |
| 1996/09/19/05/30 | 45 |
| 1996/09/19/05/45 | 33 |
| 1996/09/19/06/00 | 12 |
| 1996/09/19/06/15 | 1 |
| 1996/09/19/06/30 | 0 |
| 1996/09/19/06/45 | 32 |
| 1996/09/19/07/00 | 1 |
| 1996/09/19/07/15 | 7 |

FIG. 31

NAME
SUBSCRIBER NAME : XXXXX (OE=ffffffSUUC)

AUGUST, 1996

CONTENT OF AGREEMENT : REQUESTED BAND : 1000M Cell/sec
USED BETWEEN : TOKYO ~ OSAKA
TIMES USED : REGULARLY
☐ EVERY WEEK  DAY OF THE WEEK (HH:MM-hh:mm)
☐ EVERY DAY   (HH:MM-hh:mm)

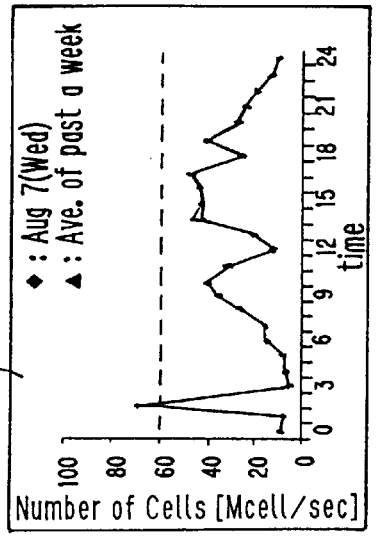
TCND

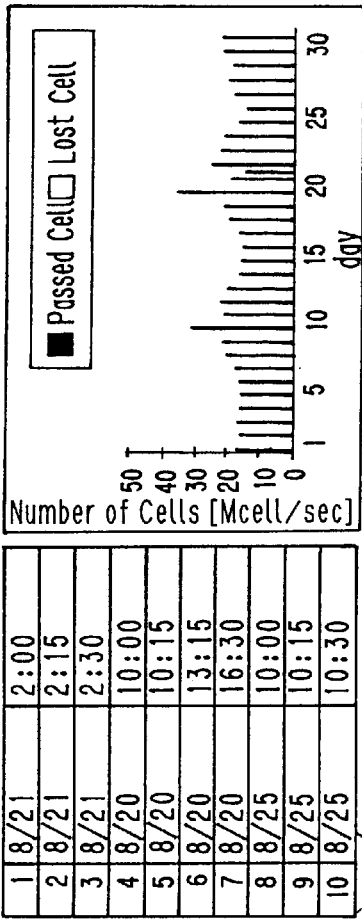
TCNM

COUNT OF VALID CELLS PASSED: BEST 10

| | | |
|---|---|---|
| 1 | 8/21 | 2:00 |
| 2 | 8/21 | 2:15 |
| 3 | 8/21 | 2:30 |
| 4 | 8/20 | 10:00 |
| 5 | 8/20 | 10:15 |
| 6 | 8/20 | 13:15 |
| 7 | 8/20 | 16:30 |
| 8 | 8/25 | 10:00 |
| 9 | 8/25 | 10:15 |
| 10 | 8/25 | 10:30 |

TSPC

AMOUNT USED : 21.780G Cell (18.750G Cell)
DAILY AVERAGE : 702.6M Cell (604.8M Cell)
PEAK DATE : AUGUST 13 (TUESDAY)   (JULY 15)
PEAK VOLUME : 1078M Cell (956M Cell)
EXCESS DAY COUNT : ONE DAY (0 DAYS)
LOST CELLS : 78M Cell (0MByte)
※ ( ) INDICATES VALUE OF PRECEDING MONTH

TANL

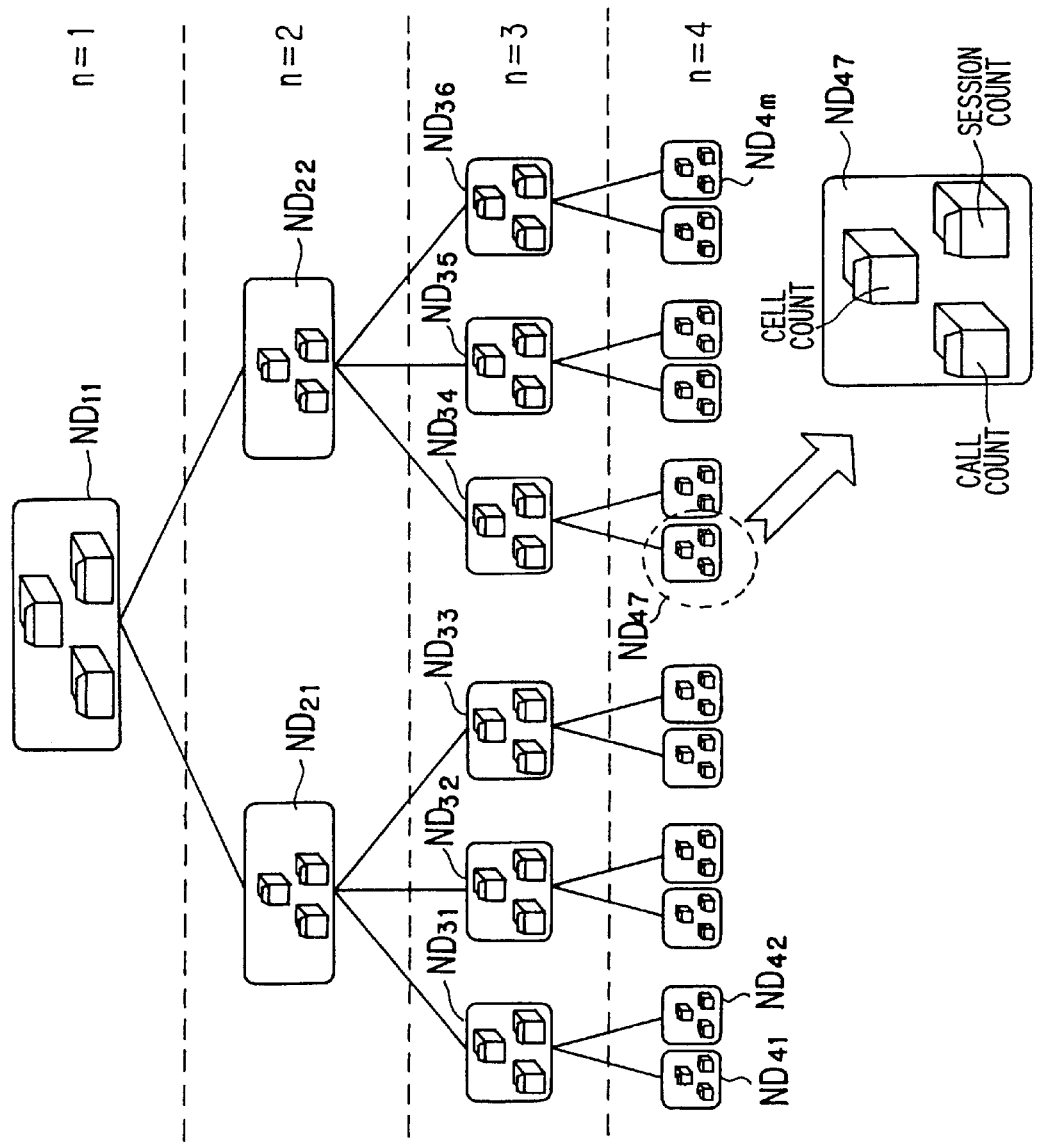

FIG. 33

OE/VP/VC TRAFFIC MONITORING AND SETTING

SUBSCRIBER NAME
aaaaaa

SUBSCRIBER INFORMATION

REQUESTED BAND :        Cell/sec
USED BETWEEN   :    ~
TIMES USED     : ■ REGULARLY
                 □ EVERY WEEK  DAY OF THE WEEK ( : ~ : )
                 □ EVERY DAY ( : ~ : )

MONITORED OBJECT
■ OE ( OE = fffffsuuc )
□ VP ( VPI = )
□ VC ( VCI = )
                    — MDD

MEASUREMENT DATA
■ CELL COUNT
■ CALL COUNT
□ SESSION COUNT

FIG. 34

| MANAGED OBJECT | MANAGEMENT CATEGORY | | |
| --- | --- | --- | --- |
| | Cell | Call | Session |
| A | ○ | | |
| B | | ○ | |
| C | ○ | | ○ |
| D | ○ | | |

FIG. 42

15-MINUTE TRAFFIC DATA TABLE — 71

SEPTEMBER 21, 1996

| q(x) | ACQUISITION TIME PERIOD | VALID CELL COUNT |
|---|---|---|
| 1 | 0:00-0:15 | 253 |
| 2 | 0:15-0:30 | 312 |
| 3 | 0:30-0:45 | 195 |
| 4 | 0:45-1:00 | 222 |
| 5 | 1:00-1:15 | 345 |
| 6 | 1:15-1:30 | 265 |
| 7 | 1:30-1:45 | 310 |
| 8 | 1:45-2:00 | 230 |
| 9 | 1:45-2:00 | 211 |
| 10 | 2:00-2:15 | 165 |
| 11 | 2:15-2:30 | 144 |
| 12 | 2:30-2:45 | 131 |
| 13 | 2:45-3:00 | 111 |
| ... | ... | ... |
| 93 | 23:00-23:15 | 450 |
| 94 | 23:15-23:30 | 366 |
| 95 | 23:30-23:45 | 351 |
| 96 | 23:45-0:00 | 280 |

HOURLY TRAFFIC DATA TABLE — 72

SEPTEMBER 21, 1996

| h(x) | ACQUISITION TIME PERIOD | VALID CELL COUNT |
|---|---|---|
| 1 | 0:00-1:00 | 981 |
| 2 | 1:00-2:00 | 1150 |
| 3 | 2:00-3:00 | 651 |
| 4 | 3:00-4:00 | 590 |
| 5 | 4:00-5:00 | 658 |
| 6 | 5:00-6:00 | 744 |
| 7 | 6:00-7:00 | 799 |
| 8 | 7:00-8:00 | 844 |
| 9 | 8:00-9:00 | 900 |
| 10 | 9:00-10:00 | 954 |
| 11 | 10:00-11:00 | 1002 |
| 12 | 11:00-12:00 | 811 |
| 13 | 12:00-13:00 | 988 |
| 14 | 13:00-14:00 | 1214 |
| 15 | 14:00-15:00 | 1221 |
| 16 | 15:00-16:00 | 1354 |
| 17 | 16:00-17:00 | 1421 |
| 18 | 17:00-18:00 | 1200 |
| 19 | 18:00-19:00 | 1124 |
| 20 | 19:00-20:00 | 1022 |
| 21 | 20:00-21:00 | 1050 |
| 22 | 21:00-22:00 | 1001 |
| 23 | 22:00-23:00 | 988 |
| 24 | 23:00-24:00 | 866 |

HOURLY TRAFFIC DATA TABLE

| h(x) | ACQUISITION TIME PERIOD | VALID CELL COUNT |
|---|---|---|
| 1 | 0:00-1:00 | 981 |
| 2 | 1:00-2:00 | 1150 |
| 3 | 2:00-3:00 | 651 |
| 4 | 3:00-4:00 | 590 |
| 5 | 4:00-5:00 | 658 |
| 6 | 5:00-6:00 | 744 |
| 7 | 6:00-7:00 | 799 |
| 8 | 7:00-8:00 | 844 |
| 9 | 8:00-9:00 | 900 |
| 10 | 9:00-10:00 | 954 |
| 11 | 10:00-11:00 | 1002 |
| 12 | 11:00-12:00 | 811 |
| 13 | 12:00-13:00 | 988 |
| 14 | 13:00-14:00 | 1214 |
| 15 | 14:00-15:00 | 1221 |
| 16 | 15:00-16:00 | 1354 |
| 17 | 16:00-17:00 | 1421 |
| 18 | 17:00-18:00 | 1200 |
| 19 | 18:00-19:00 | 1124 |
| 20 | 19:00-20:00 | 1022 |
| 21 | 20:00-21:00 | 1050 |
| 22 | 21:00-22:00 | 1001 |
| 23 | 22:00-23:00 | 988 |
| 24 | 23:00-24:00 | 866 |

SEPTEMBER, 1996 — 73

DAILY TRAFFIC DATA TABLE

| d(x) | ACQUISITION DAY | VALID CELL COUNT |
|---|---|---|
| 1 | 9/1 | 35862 |
| 2 | 9/2 | 33124 |
| 3 | 9/3 | 29056 |
| 4 | 9/4 | 29555 |
| 5 | 9/5 | 31524 |
| 6 | 9/6 | 33124 |
| 7 | 9/7 | 36245 |
| 8 | 9/8 | 29854 |
| 9 | 9/9 | 28655 |
| 10 | 9/10 | 24586 |
| 11 | 9/11 | 28552 |
| 12 | 9/12 | 27569 |
| 13 | 9/13 | 24532 |
| 14 | 9/14 | 31420 |
| 15 | 9/15 | 31115 |
| 16 | 9/16 | 28452 |
| 17 | 9/17 | 29945 |
| 18 | 9/18 | 34529 |
| 19 | 9/19 | 25442 |
| 20 | 9/20 | 26653 |
| 21 | 9/21 | 23533 |
| 22 | 9/22 | |
| 23 | 9/23 | |
| 24 | 9/24 | |
| 25 | 9/25 | |
| 26 | 9/26 | |
| 27 | 9/27 | |
| 28 | 9/28 | |
| 29 | 9/29 | |
| 30 | 9/30 | |
| 31 | | |

FIG.44

SEPTEMBER, 1996    73

DAILY TRAFFIC DATA TABLE

| d(x) | ACQUISITION DAY | VALID CELL COUNT |
|---|---|---|
| 1 | 9/1 | 35862 |
| 2 | 9/2 | 33124 |
| 3 | 9/3 | 29056 |
| 4 | 9/4 | 29555 |
| 5 | 9/5 | 31524 |
| 6 | 9/6 | 33124 |
| 7 | 9/7 | 36245 |
| 8 | 9/8 | 29854 |
| 9 | 9/9 | 28655 |
| 10 | 9/10 | 24586 |
| 11 | 9/11 | 28552 |
| 12 | 9/12 | 27569 |
| 13 | 9/13 | 24532 |
| 14 | 9/14 | 31420 |
| 15 | 9/15 | 31115 |
| 16 | 9/16 | 28452 |
| 17 | 9/17 | 29945 |
| 18 | 9/18 | 34529 |
| 19 | 9/19 | 25442 |
| 20 | 9/20 | 26653 |
| 21 | 9/21 | 23533 |
| 22 | 9/22 | |
| 23 | 9/23 | |
| 24 | 9/24 | |
| 25 | 9/25 | |
| 26 | 9/26 | |
| 27 | 9/27 | |
| 28 | 9/28 | |
| 29 | 9/29 | |
| 30 | 9/30 | |
| 31 | | |

1996    74

MONTHLY TRAFFIC DATA TABLE

| m(x) | ACQUISITION MONTH | VALID CELL COUNT |
|---|---|---|
| 1 | JANUARY | 765235 |
| 2 | FEBRUARY | 653263 |
| 3 | MARCH | 688539 |
| 4 | APRIL | 953265 |
| 5 | MAY | 1002354 |
| 6 | JUNE | 985632 |
| 7 | JULY | 882356 |
| 8 | AUGUST | 845623 |
| 9 | SEPTEMBER | |
| 10 | OCTOBER | |
| 11 | NOVEMBER | |
| 12 | DECEMBER | |

MONTHLY TRAFFIC DATA TABLE

| m(x) | ACQUISITION MONTH | VALID CELL COUNT |
|---|---|---|
| 1 | JANUARY | 765235 |
| 2 | FEBRUARY | 653263 |
| 3 | MARCH | 688539 |
| 4 | APRIL | 953265 |
| 5 | MAY | 1002354 |
| 6 | JUNE | 985632 |
| 7 | JULY | 882356 |
| 8 | AUGUST | 845623 |
| 9 | SEPTEMBER | |
| 10 | OCTOBER | |
| 11 | NOVEMBER | |
| 12 | DECEMBER | |

1995 ~ 2004    75

YEARLY TRAFFIC DATA TABLE

| y(x) | ACQUISITION YEAR | VALID CELL COUNT |
|---|---|---|
| 1 | 1995 | 13526425 |
| 2 | 1996 | |
| 3 | 1997 | |
| 4 | 1998 | |
| 5 | 1999 | |
| 6 | 2000 | |
| 7 | 2001 | |
| 8 | 2002 | |
| 9 | 2003 | |
| 10 | 2004 | |

FIG.55

| | d(date, day) | | |
|---|---|---|---|
| 1 | sun | 9/1 | |
| 2 | mon | 9/2 | |
| 3 | tue | 9/3 | |
| 4 | wed | 9/4 | 1st Week |
| 5 | thu | 9/5 | |
| 6 | fri | 9/6 | |
| 7 | sat | 9/7 | |
| 8 | sun | 9/8 | |
| 9 | mon | 9/9 | |
| 10 | tue | 9/10 | |
| 11 | wed | 9/11 | 2nd Week |
| 12 | thu | 9/12 | |
| 13 | fri | 9/13 | |
| 14 | sat | 9/14 | |
| 15 | sun | 9/15 | |
| 16 | mon | 9/16 | |
| 17 | tue | 9/17 | |
| 18 | wed | 9/18 | 3rd Week |
| 19 | thu | 9/19 | |
| 20 | fri | 9/20 | |
| 21 | sat | 9/21 | |
| 22 | sun | 9/22 | |
| 23 | mon | 9/23 | |
| 24 | tue | 9/24 | |
| 25 | wed | 9/25 | 4th Week |
| 26 | thu | 9/26 | |
| 27 | fri | 9/27 | |
| 28 | sat | 9/28 | |
| 29 | sun | 9/29 | 5th Week |
| 30 | mon | 9/30 | |
| 31 | | | |

DAILY TRAFFIC DATA TABLE 73

FIG.56

DAY-OF-THE-WEEK DATA TABLE 76

| | SUNDAY | MONDAY | TUESDAY | WEDNESDAY | THURSDAY | FRIDAY | SATURDAY |
|---|---|---|---|---|---|---|---|
| FIRST WEEK | 9/1 | 9/2 | 9/3 | 9/4 | 9/5 | 9/6 | 9/7 |
| SECOND WEEK | 9/8 | 9/9 | 9/10 | 9/11 | 9/12 | 9/13 | 9/14 |
| THIRD WEEK | 9/15 | 9/16 | 9/17 | 9/18 | 9/19 | 9/20 | 9/21 |
| FOURTH WEEK | 9/22 | 9/23 | 9/24 | 9/25 | 9/26 | 9/27 | 9/28 |
| FIFTH WEEK | 9/29 | 9/30 | w(tue,5) | w(wed,5) | w(thu,5) | w(fri,5) | w(sat,5) |

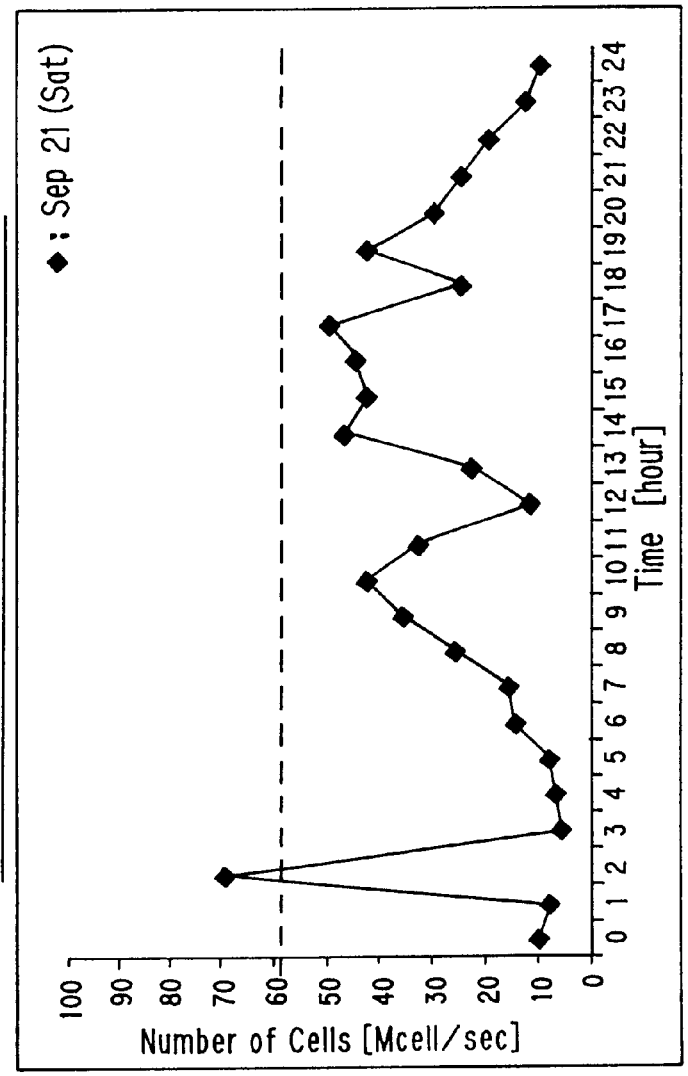
FIG. 57A — SEPTEMBER 21, 1996 (HOURLY CHARACTERISTIC)
FIG. 57B — YEARLY VALID CELL COUNT LIST SORTED IN DESCENDING ORDER
SEPTEMBER 21, 1996
| h(x) | ACQUISITION TIME PERIOD | VALID CELL COUNT |
|---|---|---|
| 1 | 2:00-3:00 | 70 |
| 2 | 17:00-18:00 | 50 |
| 3 | 14:00-15:00 | 47 |
| 4 | 16:00-17:00 | 45 |
| 5 | 19:00-20:00 | 43 |
| 6 | 15:00-16:00 | 43 |
| 7 | 10:00-11:00 | 43 |
| 8 | 9:00-10:00 | 36 |
| 9 | 11:00-12:00 | 33 |
| 10 | 20:00-21:00 | 30 |
| 11 | 8:00-9:00 | 26 |
| 12 | 21:00-22:00 | 25 |
| 13 | 18:00-19:00 | 25 |
| 14 | 13:00-14:00 | 23 |
| 15 | 22:00-23:00 | 20 |
| 16 | 7:00-8:00 | 16 |
| 17 | 6:00-7:00 | 15 |
| 18 | 23:00-0:00 | 13 |
| 19 | 12:00-13:00 | 12 |
| 20 | 0:00-1:00 | 10 |
| 21 | 5:00-6:00 | 8 |
| 22 | 1:00-2:00 | 8 |
| 23 | 4:00-5:00 | 7 |
| 24 | 3:00-4:00 | 6 |

FIG. 60

|    | A         | B  |
|----|-----------|----|
| 1  | ISHIKAWA  | 35 |
| 2  | IBARAGI   | 32 |
| 3  | SAGA      | 26 |
| 4  | GIFU      | 26 |
| 5  | KOCHI     | 24 |
| 6  | AICHI     | 23 |
| 7  | CHIBA     | 23 |
| 8  | OKAYAMA   | 22 |
| 9  | MIE       | 22 |
| 10 | TOYAMA    | 22 |
| 11 | SAITAMA   | 22 |
| 12 | TOCHIGI   | 22 |
| 13 | EHIME     | 21 |
| 14 | TOKYO     | 21 |
| 15 | NAGASAKI  | 20 |
| 16 | YAMAGUCHI | 20 |
| 17 | KYOTO     | 20 |
| 18 | FUKUI     | 20 |
| 19 | SHIZUOKA  | 20 |
| 20 | GUNMA     | 20 |
| 21 | OSAKA     | 19 |
| 22 | SHIMANE   | 18 |
| 23 | FUKUSHIMA | 18 |
| 24 | HOKKAIDO  | 18 |
| 25 | SHIGA     | 17 |
| 26 | YAMANASHI | 17 |
| 27 | KANAGAWA  | 17 |
| 28 | MIYAGI    | 17 |
| 29 | AKITA     | 17 |
| 30 | OKINAWA   | 16 |
| 31 | WAKAYAMA  | 16 |
| 32 | NIGATA    | 16 |
| 33 | YAMAGATA  | 16 |
| 34 | IWATE     | 16 |
| 35 | AOMORI    | 16 |
| 36 | FUKUOKA   | 15 |
| 37 | NARA      | 15 |
| 38 | NAGANO    | 15 |
| 39 | HYOGO     | 14 |
| 40 | KUMAMOTO  | 13 |
| 41 | TOTTORI   | 13 |
| 42 | KAGOSHIMA | 12 |
| 43 | OITA      | 11 |
| 44 | TOKUSHIMA | 11 |
| 45 | HIROSHIMA | 10 |
| 46 | MIYAZAKI  | 8  |
| 47 | KAGAWA    | 8  |

FIG. 62E — YEARLY TRAFFIC DATA TABLE SORTED IN DESCENDING ORDER

95

| y(x) | 1 | 2 | 3 | 4 | 5 | 6 | 7 | 8 | 9 | 10 |
|---|---|---|---|---|---|---|---|---|---|---|
| | 2004 | 2003 | 2002 | 2001 | 2000 | 1999 | 1998 | 1997 | 1996 | 1995 |

FIG. 62D — MONTHLY TRAFFIC DATA TABLE SORTED IN DESCENDING ORDER

94

| m(x) | 1 | 2 | 3 | 4 | 5 | 6 | 7 | 8 | 9 | 10 | 11 | 12 |
|---|---|---|---|---|---|---|---|---|---|---|---|---|
| | 4/1996 | 5/1996 | 9/1996 | 10/1996 | | | | | | | | 2/1996 |

FIG. 62C — DAILY TRAFFIC DATA TABLE SORTED IN DESCENDING ORDER

93

| d(x) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| | 9/20 | 9/19 | 9/10 | 9/5 | 9/25 | | | | | | | | | | | | | | | | | | | | | | | | | | |

FIG. 62B — HOURLY TRAFFIC DATA TABLE SORTED IN DESCENDING ORDER

92

| h(x) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| | 9:00-10:00 | 10:00-11:00 | 13:00-14:00 | 14:00-15:00 | 17:00-18:00 | | | | | | | | | | | | | | | | | | | 2:00-3:00 |

FIG. 62A — 15-MINUTE TRAFFIC DATA TABLE SORTED IN DESCENDING ORDER

91

| q(x) | 1 | 2 | 3 | 4 | 5 | 6 | 7 | 8 | 9 | 10 | 11 | 12 | 13 | ... | 93 | 94 | 95 | 96 |
|---|---|---|---|---|---|---|---|---|---|---|---|---|---|---|---|---|---|---|
| | 9:00-9:15 | 10:00-10:15 | 10:15-10:30 | 9:15-9:30 | 13:00-13:15 | 14:15-14:30 | 13:15-13:30 | 9:30-9:45 | 9:45-10:00 | 10:30-10:45 | 10:45-11:00 | 17:00-17:15 | 16:45-17:00 | | 2:00-2:15 | 2:45-3:00 | 2:15-2:30 | 2:30-2:45 |

NETWORK MANAGEMENT DEVICE

BACKGROUND OF THE INVENTION

This invention relates to a network management device and, more particularly, to a network management device for managing a plurality of network elements such as an ATM switch, transmitting unit, router, bridge and computer interconnected by a communication network. More specifically, the invention relates to network management device capable of being utilized in the field of network management operations such as network management by the operator of an information communications network and network management within an enterprise.

Raising the working efficiency of operators managing network domains and improving service to network end users are common problems involved in network management systems. The present invention likewise appertains to the services field, specifically an improvement in the efficiency of network management operations and the presentation of traffic status to end users. These activities are being forwarded in the same field internationally by network standardization agencies, such as the ITU-T and ISO, which have many participating network operators and vendors of network element equipment.

It is required that a network management device acquire management data from the network element side when the apparatus starts up and at the time of resumption of operation which accompanies recovery from interruption of a session with a network element. It is also required that management data be acquired periodically from the side of the network elements after start-up/resumption of operation in order to assure coordination of data. Conventional network management is so adapted as to accept and execute operations relating to network management after all management data has been acquired from each of the network elements at start-up or resumption of operation of the network management device. In other words, the conventional network management device cannot accept and execute operations relating to network management before the acquisition of all management data is completed.

In a small-scale, simple network management device, it is required to grasp only a limited amount of management data, such as the network addresses allocated to the network elements and the status of the line connections. Consequently, the waiting time until an operation is executable is short and the quantity of management data is small. This means that problems relating to performance and data preservation capacity are comparatively few, and a large number of such network management device are available, as seen in SNMP (Simple Network Management Protocol) products such as Hewlett-Packard's Open View and Sun Microsystems's Sun Net Manager. Similarly, there are many available products for ascertaining the quantity of data that passes through a physical router or gateway owing to the importance of traffic management relating to networks.

In a case where a large-scale network typified by an ATM network is to be managed, the network elements are themselves large in scale and highly complex, the management data held within each of the network elements is of many kinds and of large quantity and the number of network elements dealt with is very large. In a network management device which deals with the management data involving a group of such numerous large-scale, multifarious network elements, there are problems relating to processing time for acquisition of the large quantity of management data held by the network elements and data capacity required by a secondary medium for saving data. More specifically, at start-up of the network management device or at recovery following the interruption of a session, the network management device requires an extended period of time to acquire all management data and the time necessary to wait until network management (operation) can be executed is prolonged. Another problem is that a large-capacity storage device is necessary. A session here means a connection linking applications in OSI Layer Five. Tasks such as control for sending and receiving data and synchronization control are carried out upon setting the session.

Further, in a large-scale network such as an ATM network, role sharing by the network management device and billing apparatus are clearly defined. Information relating to traffic management, such as the quantity of cells passed or the quantity of cells lost or whether a call has been established or not, and the names of the end users are preserved independently in each apparatus without being correlated. As a result, traffic data cannot be handled directly on a per-user basis within the network management device. In other words, a problem with the conventional network management device is that a network end user (subscriber) cannot be designated and the traffic data concerning this user cannot be handled. Though an attempt has been made to establish correspondence between the network management device and the billing system, this inevitably leads to new problems, such as an increase in the quantity of traffic data handled by the network management device, poorer performance and an increase in the capacity required for the data storage medium.

A network user has a need to refer to the traffic status of one's own apparatus on the network for the purpose of performing a planned augmentation of the network or in order to reduce cost by reconsidering the mode of operation. In order to accomplish this, it would be convenient if a traffic characteristic required by the end user could be created and supplied to the end user at an appropriate time.

SUMMARY OF THE INVENTION

Accordingly, a first object of the present invention is to make it possible to accept and execute an operation relating to network management even if acquisition of all management data has not yet been completed at start-up of the network management device or at resumption of a session, thereby enabling the operator utilizing the network management device to execute administration smoothly.

A second object of the present invention is to make it possible to accept and execute an operation relating to network management even if acquisition of all management data has not yet been completed at start-up of the network management device or at resumption of operation, and to increase executable operations in stages, thereby enabling the operator utilizing the network management device to execute administration smoothly.

A third object of the present invention is to make it possible to create various traffic characteristics and supply the traffic characteristics to a network end user in the form of a graph or the like.

A fourth object of the present invention is to designate a user to be able to handle traffic data of the user, and to create required traffic characteristics on a per-user basis and supply the characteristics to the users.

A fifth object of the present invention is to make it possible to reduce the amount of memory used in storage means for storing traffic data and to shorten the time needed for acquiring the traffic data.

A sixth object of the present invention is to make it possible to reduce the amount of data memory used and to save traffic data efficiently even in a case where long-term preservation of traffic data has been designated.

A seventh object of the present invention is to make it possible to specify a singular time, day, month and year when traffic is high or a singular subscriber for whom traffic is high.

In accordance with the present invention, the first object is attained by providing a network management device for managing a plurality of network elements interconnected by a communication network, comprising (1) network element management data acquisition means for acquiring, in stages, various management data possessed by the network elements when a session with a network element is resumed and when the network management device itself is started up, (2) operation dependence rule storage means for storing a dependence relationship between an operation relating to network management and management data necessary to execute network management that conforms to the operation, (3) means for referring to the dependence relationship, when an operation has been specified, for determining whether management data necessary to execute the network management that conforms to the operation has been acquired, and (4) means for executing the network management that conforms to the operation in a case where the necessary data has been acquired. As a result, if management information necessary for executing a prescribed operation has been acquired, the operation can be accepted and network management is executed even if all of the management data concerning the network elements has not been acquired by the network element management data acquisition means. This makes it possible for the operator to execute a smooth management operation.

In accordance with the present invention, the second object is attained by providing, in addition to the elements (1) through (4) mentioned above, (5) means for storing, in the form of a tree structure, an acquisition sequence of management data relating to resources of the network elements, wherein resource management data acquisition means serving as the network element data acquisition means acquires, in stages, and in regular order, management data relating to each resource of the network elements from the root of the tree structure. Further, according to the invention, the second object is attained by providing, in addition to the elements (1) through (4) mentioned above, (6) means for stipulating and storing, in the form of an inclusion structure, an acquisition sequence of management data relating to an alarm, wherein alarm management data acquisition means serving as the network element data acquisition means acquires management data relating to an alarm in stages in order of decreasing inclusion level in the inclusion structure. As a result, operation relating to network management can be accepted and executed even before acquisition of all management data is completed at start-up or resumption of operation of the network management device. Moreover, executable operations can be increased in stages and it is possible to narrow down managed objects in dependence upon the status of management data acquisition to finally obtain the target managed object (e.g., a faulty device). Accordingly, an operator utilizing the network management device is capable of successively performing executable operations and of executing resource management and alarm management smoothly.

In accordance with the present invention, the third object is attained by providing a network management device comprising (1) traffic data acquisition means for acquiring traffic data possessed by network elements, (2) storage means for storing the traffic data that has been acquired by the traffic data acquisition means, and (3) network management execution means for executing processing that conforms to an operation relating to network management using the traffic data that has been acquired, and outputting results of processing, wherein the traffic data acquisition means acquires traffic data over a prescribed period of time for each management category of the managed object and stores this traffic data in the storage means in the form of a three-dimensional matrix structure. Since traffic data is acquired over a prescribed period of time for each management category with regard to each managed object and the traffic data is stored in the form of a three-dimensional matrix structure, traffic characteristics can be output using traffic management data of the desired managed object, category of management and period of management. Further, by editing the traffic data having the three-dimensional structure, it is possible to create traffic characteristics required by the network end user, such as the daily change in traffic, the weekly change in traffic, the monthly change in traffic and the yearly change in traffic, with regard to a prescribed managed object and management category. These traffic characteristics can be supplied to the network end user in the form of a graph or the like.

In accordance with the present invention, the fourth object is attained by providing user correlation means for establishing correspondence between a managed object which is an object of traffic management and its user, wherein the network management execution means handles traffic data solely with regard to the managed object with which one-to-one correspondence with the user has been established. Thus, correspondence between the managed object and its user is established. If the name of the user is entered, therefore, the network management execution means obtains the managed object from the corresponding relationship, reads traffic data regarding this managed object (the user) from the storage means, creates a traffic characteristic required by the user and presents the traffic characteristic to the user.

In accordance with the present invention, the fifth object is attained by interactively designating a managed object which is an object of traffic management, management category and period of preservation, acquiring traffic data of each network element solely with regard to the managed object, management category and preservation period designated, and storing the traffic data. If this arrangement is adopted, it will suffice to acquire and store the traffic data of each network element solely with regard to the managed object, category of management and preservation period that have been designated. This makes it possible to reduce the required storage capacity of the storage means and to shorten the time needed to collect the traffic data.

In accordance with the present invention, the sixth object is attained by shaping a plurality of traffic data of a first time period to traffic data, such as average value, peak value and total amount, of a second time period longer than the first time period, thereafter successively shaping a plurality of traffic data of shorter time periods to traffic data, such as average value, peak value and total amount, of longer time periods as necessary, and storing the data. By performing shaping/compression, the amount of memory used in the storage means can be reduced, traffic data can be preserved efficiently even when long-term preservation is specified, and a variety of traffic characteristics can be created and output using the compressed/shaped data.

In accordance with the present invention, the seventh object is attained by sorting traffic management data by day, week, month or year time period in accordance with a prescribed reference, and outputting sorted results. By thus selecting the sorting method in suitable fashion, a singular time, day, month and year when traffic is high or a singular subscriber for whom traffic is high can be specified with ease.

Other features and advantages of the present invention will be apparent from the following description taken in conjunction with the accompanying drawings.

BRIEF DESCRIPTION OF THE DRAWINGS

FIG. 7 is a detailed view of a rule management table;

FIG. 24 shows a change in dependence of call count on time with regard to the target device 123474234297782;

FIG. 31 is a diagram for describing a traffic report;

FIG. 32 is a diagram for describing designation of category of management;

FIG. 33 is a diagram showing a screen for monitoring and setting traffic;

FIG. 34 is a table for designating category of management;

FIG. 42 is a diagram for describing the content of traffic data tables in a case where 15-minute intervals of traffic data are rounded to one hour of traffic data;

FIG. 43 is a diagram for describing the content of traffic data tables in a case where one-hour intervals of traffic data are rounded to one day of traffic data;

FIG. 44 is a diagram for describing the content of traffic data tables in a case where one-day intervals of traffic data are rounded to one month of traffic data;

FIG. 45 is a diagram for describing the content of traffic data tables in a case where one-month intervals of traffic data are rounded to one year of traffic data;

FIG. 55 shows traffic data by day;

FIG. 56 shows traffic data by day of the week;

FIGS. 57A and 57B are diagrams for describing first sorting processing and sorted results;

FIG. 60 is a list indicating utilization rate classified by urban and rural prefectures sorted in decreasing order;

FIGS. 62A~62E illustrate various traffic data tables sorted in decreasing order;

DESCRIPTION OF THE PREFERRED EMBODIMENTS (A) Overall Configuration of Communication System FIG. 1 is a diagram showing the overall configuration of a communication system having a serve functioning as a network management device. As shown in FIG. 1, network elements (NE) 101, 102 deployed at various locations include ATM switches 101a, 102a and maintenance terminals 101b, 102b, respectively. The network elements are connected by a public communications network 103, which accommodates user terminals (end users) 104, 105. A server machine (network management device) 106 executes network management of the network elements, and personal computers (client machines) 107, 108 used by network management operators. A management network (IP network) 109 connects the maintenance terminals 101b~102b of the network elements, the server 106 and the clients 107~108. The management network 109 is connected in the form of a LAN/WAN.

FIG. 2 shows the hardware construction of the server 106 acting as the network management device. The server machine includes a processor (CPU) 106a, a memory 106b having a storage capacity of at least 128 megabytes, and an internal hard disk 106c having a storage capacity of at least one gigabyte. A display unit 106d, an external hard disk 106e having a storage capacity of three gigabytes, a DAT (for system back-up) 106f having a storage capacity of five gigabytes and a CD-ROM drive 106g are connected to the server machine. Client machines (not shown) each constituted by a personal computer or the like and remote printers can be connected to the server 106 through the IP network 109, or client machines can be connected to the server 106 hierarchically via a router.

FIG. 3 is a diagram showing the arrangement of a speech path in an ATM switch system. Illustrated in FIG. 3 are line interfaces (LIF) 1. Each line interface 1 functions to convert a frame having a predetermined format, such as a SONET frame, to an ATM cell format and send the cell to the switch side, and to convert an ATM cell format to a SONET frame and send the frame to the corresponding line. A item of common highway terminal equipment HTEC (Highway Terminal Equipment Common) 2 has a multiplexing/demultiplexing function. Each item of common highway terminal equipment 2 is provided with redundancy and therefore has devices 2a and 2b of 0 and 1 subsystems, respectively. The 0-subsystem device 2a and the 1-subsystem device 2b are each connected to 16 of the line interfaces 1 and multiplex the cells from the line interfaces. The devices 2a, 2b also demultiplex the multiplexed cells from the switch side and send the demultiplexed cells to prescribed ones of the line interfaces. A CCR (Cell Concentrator/Router) 3 has a cell concentrating/deconcentrating function. The CCR 3 is provided with redundancy and therefore has devices 3a and 3b of 0 and 1 subsystems, respectively. The 0-subsystem device 3a and 1-subsystem device 3b are each connected to eight of the devices 2a and eight of the devices 2b, respectively, of the common highway terminal equipment 2 for concentrating the cells from the common highway terminal equipment. The devices 3a, 3b also deconcentrate multiplexed cells from the switch side and send the deconcentrated cells to prescribed ones of the HTECs. A cell switch CRSW (Cell Routing Switch) 4 is provided with redundancy and therefore has switches 4a and 4b of 0 and 1 subsystems, respectively. The 0-subsystem switch 4a and the 1-subsystem switch 4b are each connected to eight of the cell concentrator/routers 3a, 3b, respectively, for switching the input concentrated cells to prescribed paths. A highway MHW is provided between the items of common highway terminal equipment 2 and the cell concentrator/routers 3, and a highway NHW is provided between the cell concentrator/routers 3 and the cell switch 4.

Figure 1:
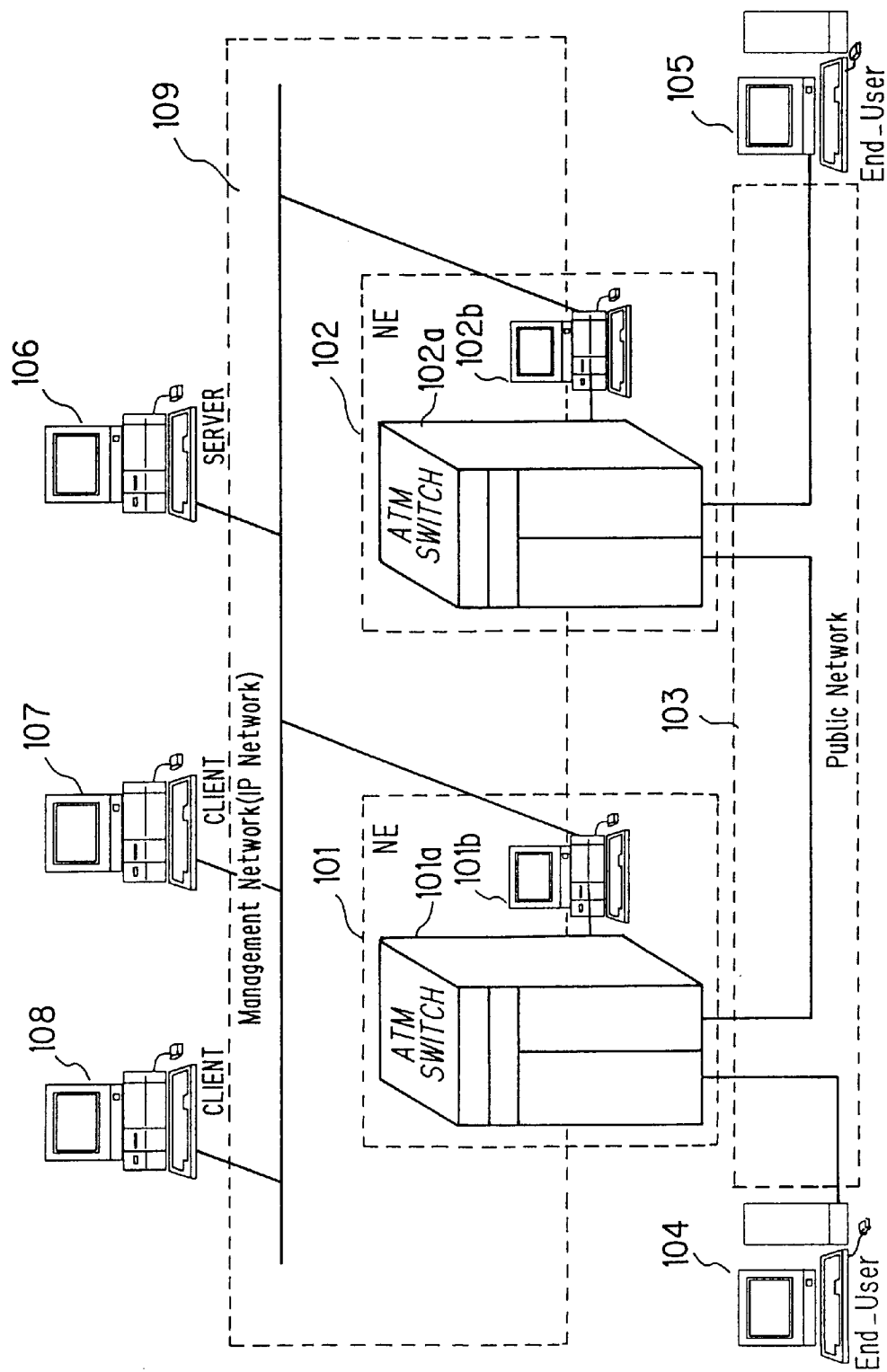
FIG. 1 is a diagram showing the overall configuration of a communication system.
Figure 2:
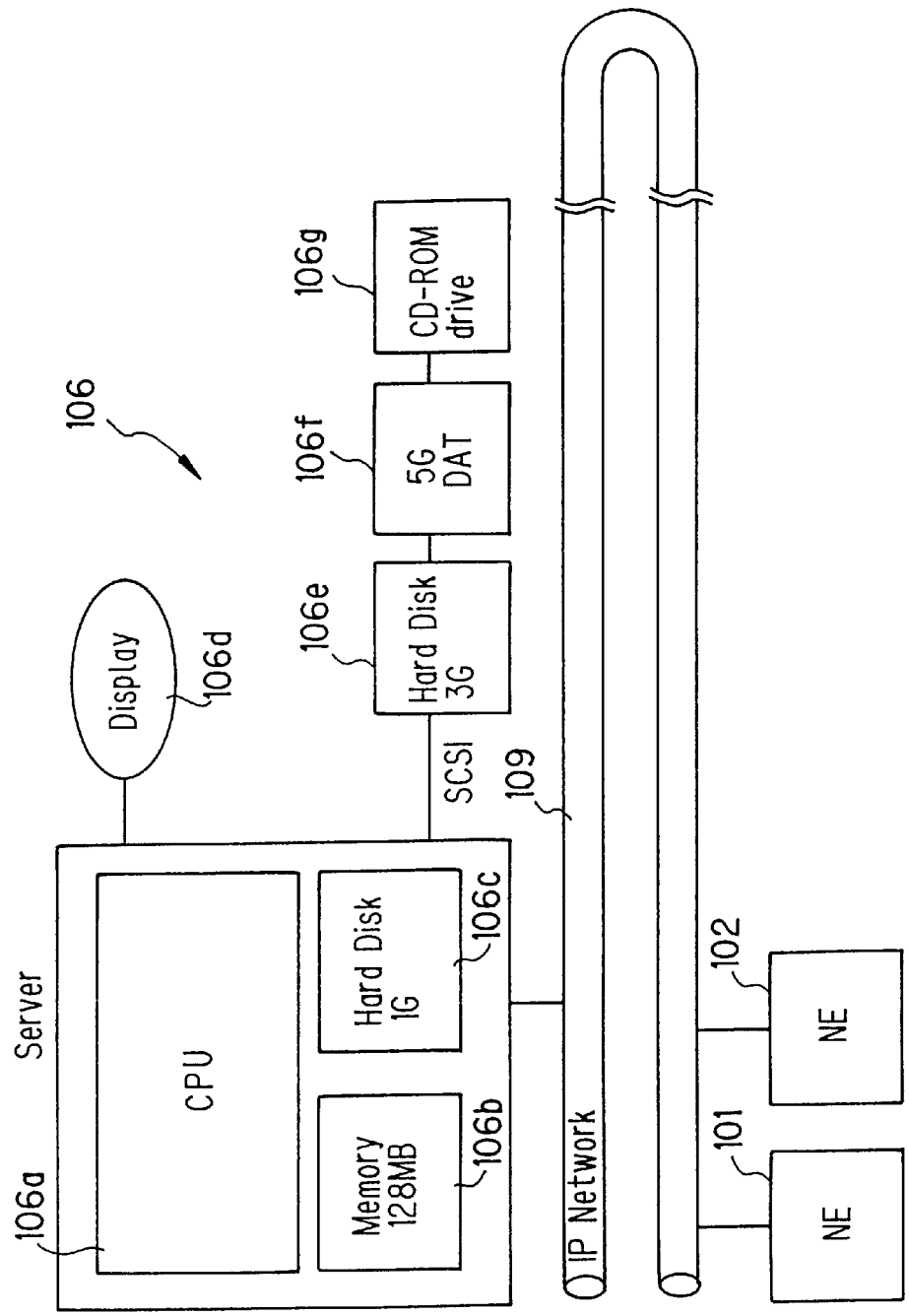
FIG. 2 is a diagram showing the construction of a server as a network management device.

The eight cell concentrator/routers 3 are connected to the cell routing switch 4, eight of the items of common highway terminal equipment 2 are connected to each cell concentrator/router 3, and 16 of the line interfaces 1 are connected to each HTEC 2. Accordingly, in the maximum switch configuration, the number of cell concentrator/routers 3 is eight, the number of items of common highway terminal equipment 2 is 64 (8×8) and the number of line interfaces is 1024 (=64×6).

The common highway terminal equipment 2, the cell concentrator/routers 3 and the cell routing switch 4 are notified, by a central processor CC (not shown in FIG. 3), of path setting information, billing control information, traffic acquisition information, fault control information and device control information via communication between processors, and each of these devices notifies the central processor CC of prescribed data (alarm information, charging information, traffic information, etc.) by communication between processors.

Figure 3:
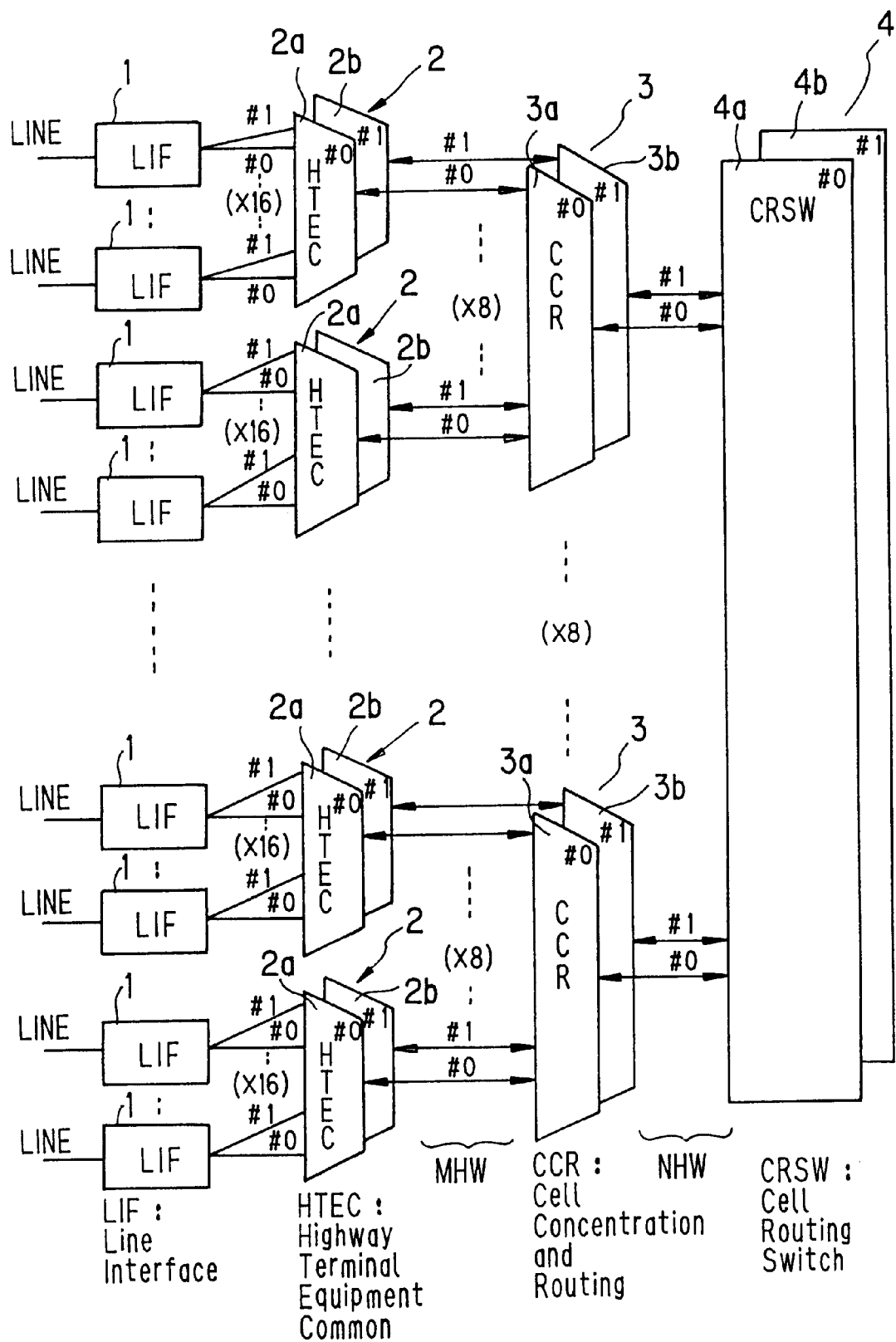
FIG. 3 is a diagram showing the arrangement of a speech path in an ATM switch system.
Figure 4:
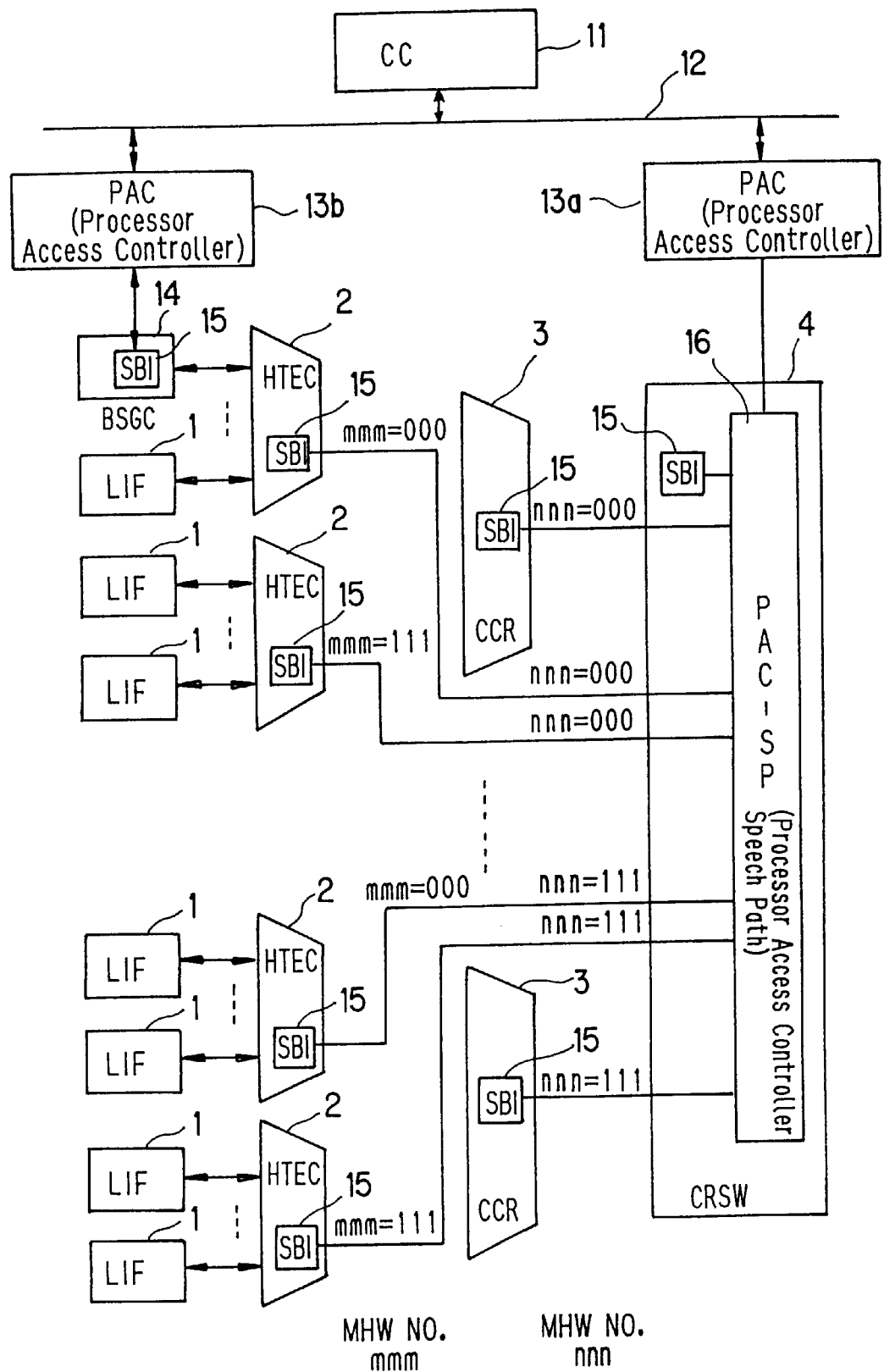
FIG. 4 is a diagram showing the arrangement of a communication channel between processors in an ATM switch system.

FIG. 4 is a diagram for describing a communication channel between processors in the ATM switch system. Components identical with those shown in FIG. 3 are designated by like reference characters. A central processor (CC) 11 controls the overall switch system and is connected to a bus 12, and processor access controllers (PAC) 13a, 13b perform bus control and control of communication between processors. A broadband signaling controller (BSGC) 14 controls signaling. The cell routing switch CRSW, the cell concentrator/routers CCR, the common highway terminal equipment HTEC and the broadband signaling controller BSCG are speech path (SP) devices.

Each of the speech path devices has a communication processor 15 equipped with a serial bus interface (SBI). A PAC-SP (PAC Speed Path) 16 controls the path connection between the PAC 13a each of the communication processors 15 in the respective speech path devices. Though the PAC 13a is provided so as to be shared by all of the speech path devices, the PAC 13b is provided exclusively for the BSGC 14. Among the speech path devices, the common highway terminal equipment (HTEC) 2, the cell concentrator/routers (CCR) 3 and the cell routing switch (CRSW) 4 send and receive all information to and from the central processor (CC) 11 by communication between processors via the PAC-SP device 16 and PAC device 13a. The BSGC device 14 sends and receives signals indicative of fault control information and device control information, etc. to and from the central processor (CC) 11 via the PAC-SP device 16 and PAC device 13a, and sends and receives a signaling signal to and from the central processor (CC) 16 via the PAC device (the dedicated PAC device) 13b.

The maintenance terminals 101b, 102b of FIG. 1 are connected, so as to be capable of data communication, to the central processors (CC) 11 in the ATM switches 101a, 102a, and are capable of receiving various information such as alarm information and traffic information acquired by the central processor 11.

Figure 5:
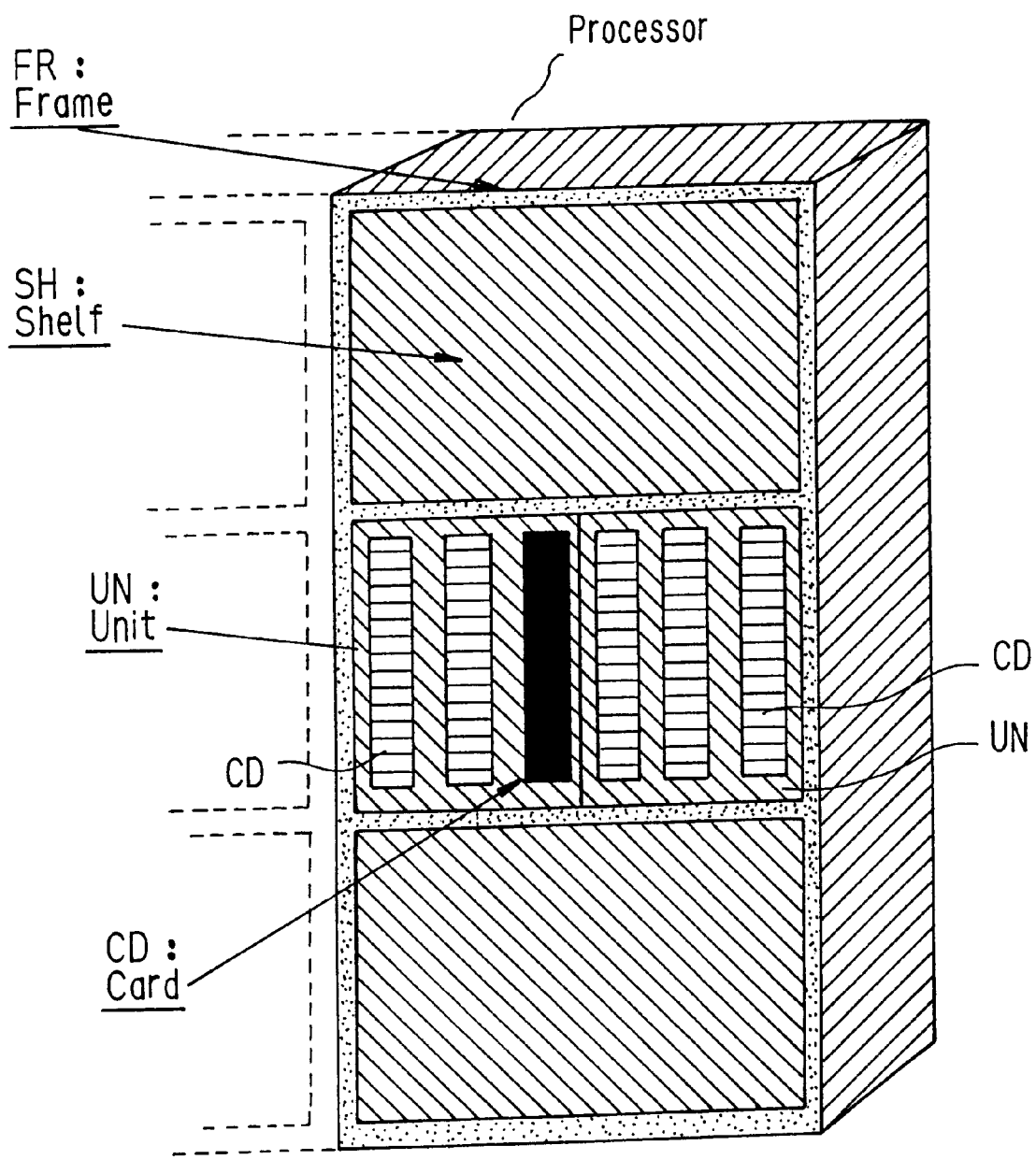
FIG. 5 is a diagram showing the hardware construction of a switch.

FIG. 5 shows an example of the hardware construction of the ATM switch, which includes a frame FR, a shelf SH, a unit UN and a card CD. The frame FR is composed of three shelves SH, each shelf SH is composed of two units UN, and three cards CD are inserted into each unit UN. The circuits shown in FIGS. 3 and 4 are mounted on each card.

Figure 6:
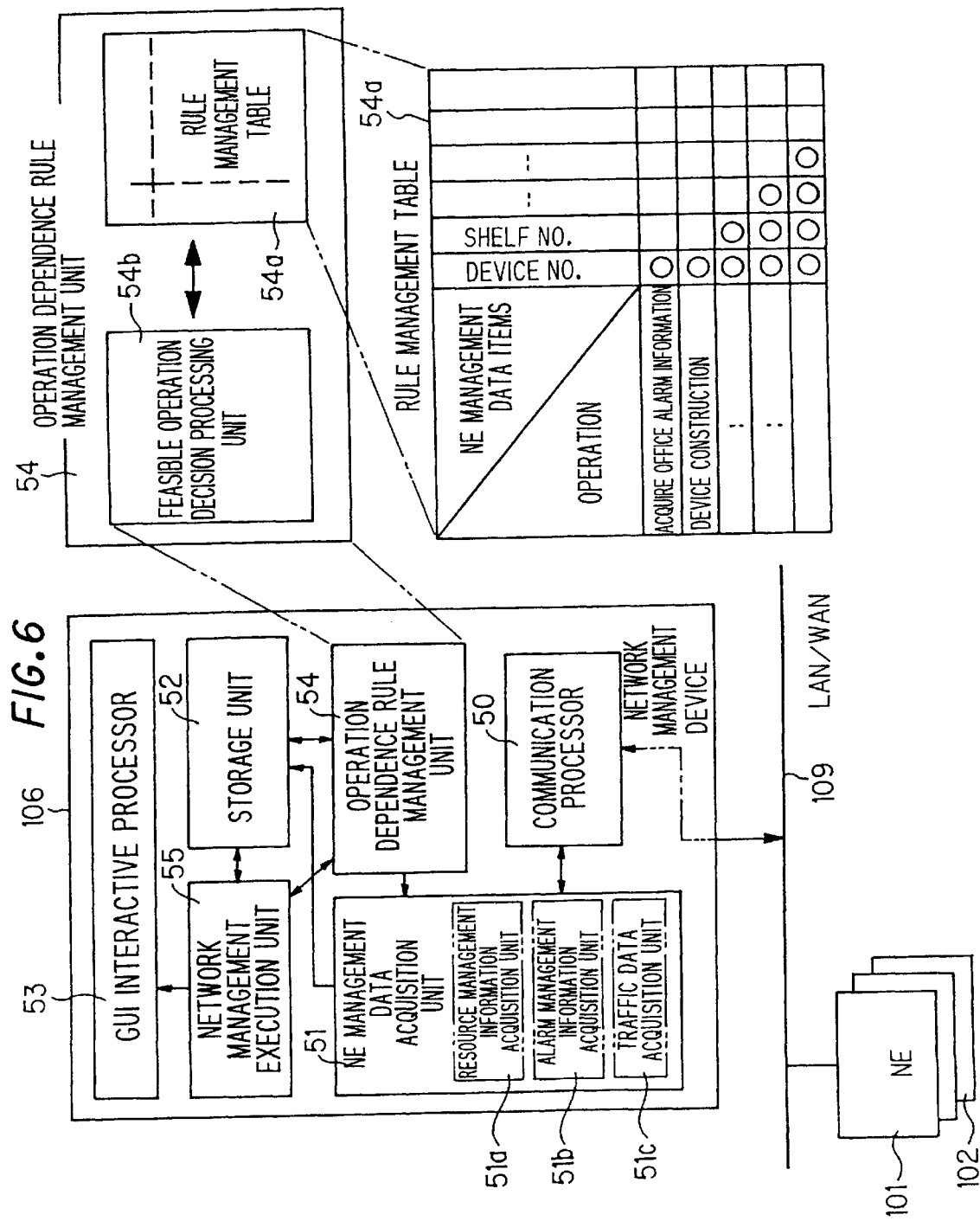
FIG. 6 is a diagram showing the functional construction of a network management device.

(B) Construction of Network Management Device (a) First Network Management Device FIG. 6 is a diagram showing the functional construction of a first network management device according to the present invention. Shown in FIG. 6 are the network elements (NE) 101, 102, the network management device 106 and the management network 109 such as a LAN/WAN.

The network management device 106 includes a communication processor 50 which executes processing for communication with the network elements 101, 102 via the management network 109, and a network element management data acquisition unit 51 for acquiring, in stages, various management data possessed by each of the network elements when a session with the network elements 101, 102 is resumed and when the network management device itself is started up. The management data acquisition unit 51 has a resource management information acquisition unit 51a for acquiring, in stages, management data relating to the network element resources, an alarm management information acquisition unit 51b for acquiring, in stages, management data relating to an alarm, and a traffic data acquisition unit 51c for acquiring, in stages, traffic data of each managed object. A storage unit 52 stores management data that has been collected from each of the network elements by the network element management data acquisition unit 51. A GUI (Graphical User Interface) interactive processor 53 serves as a man/machine interface and executes processing for setting various data via a display unit, keyboard and mouse, for designating operations and for outputting the results of operations.

An operation dependence rule management unit 54 has (1) a rule management table 54a for storing a dependence relationship between an operation relating to network management performed by the network administrator and management data (items of network element management data) necessary to execute network management that conforms to the operation, and (2) a feasible operation decision processing unit 54b which, when an operation has been specified, refers to the dependence relationship to determine whether management data necessary to execute the network management that conforms to the operation has been acquired. FIG. 7 shows a more detailed example of the rule management table 54a. The circle marks in the boxes indicate the items of network element management data necessary to execute the operation. Referring to this table makes it possible to ascertain which operation is executable during the course of network element data acquisition. For example, in order to execute the operation "SET VC LINK", it is required that three items of network element management data be acquired, namely (1) device construction, (2) OE (Office Equipment) number and (3) VPL (Virtual Path Link). As soon as these items of information have been prepared, the operation "SET VC LINK" can be executed.

A network management execution unit 55 executes network management that conforms to a requested operation in a case where the network element management data needed to execute the operation has been acquired.

Figure 8:
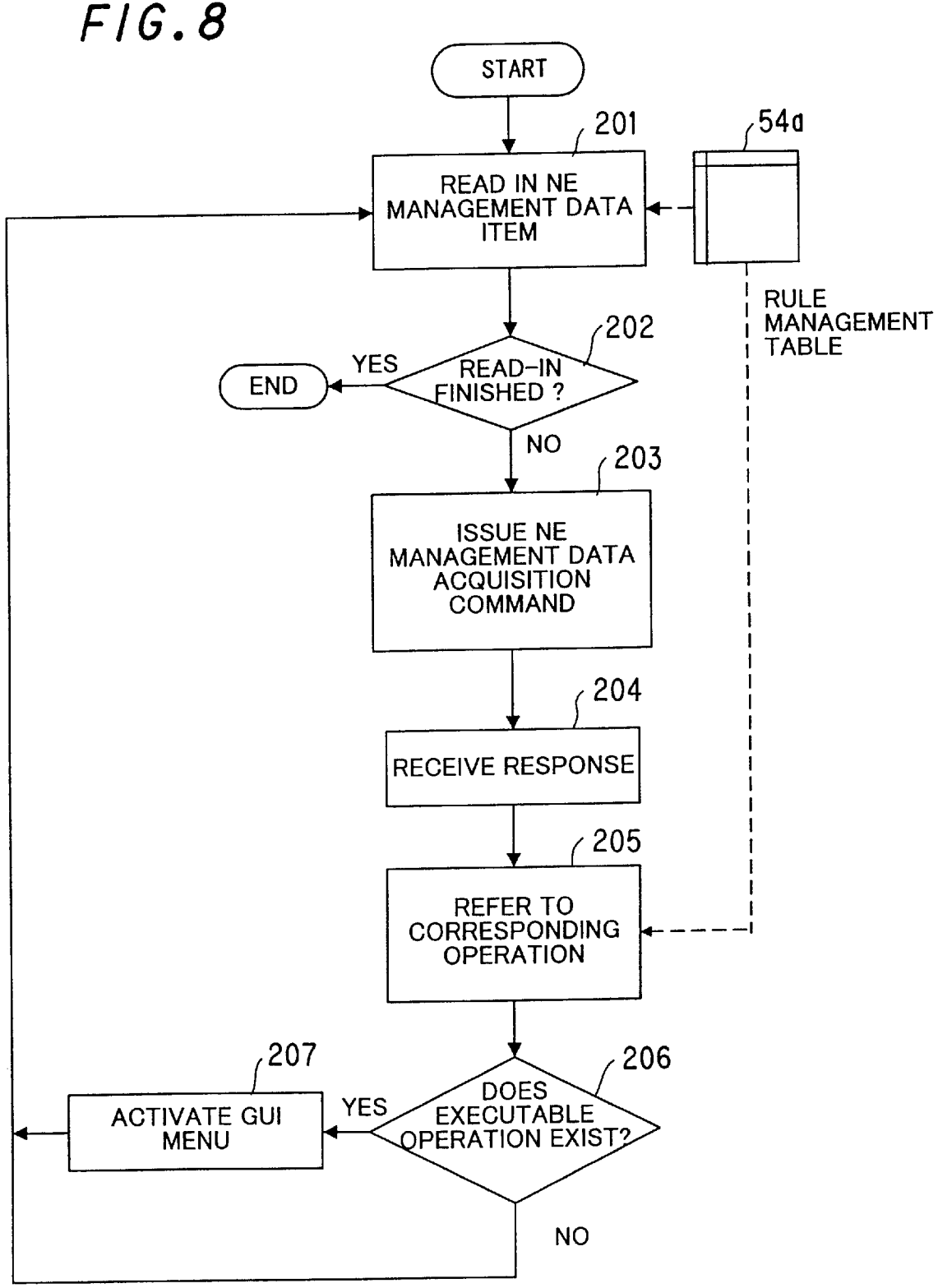
FIG. 8 is a flowchart of processing according to the invention for accepting and executing an operation even if acceptance of all management data has not yet been completed.

FIG. 8 is a flowchart of processing according to the invention for accepting and executing an operation relating to network management even if acceptance of all management data has not yet been completed a start-up of the network management device or at resumption of a session.

When the network management device is started up or when a session with a network element resumes, the network element management data acquisition unit 51 reads in an ith (where the initial value of i is 1) item of network element management data from the rule management table 54a (steps 201~202).

Next, the network element management data acquisition unit 51 issues, to each network element via the communication processor 50, an acquisition command for acquiring the ith item of network element management data (step 203), and acquires the network element management data by receiving the response (step 204). Next, the feasible operation decision processor 54b (1) checks the corresponding relationship between the operations and items of network element management data stored in the rule management table 54a and (2) refers to the acquired network element management data to determine whether an executable operation exists (steps 205, 206).

If an executable operation does not exist, the program returns to the start. If an executable operation does exist, on the other hand, the GUI menu is activated in such a manner that the operation can be utilized via the GUI menu (step 207). The program then returns to the start and the above-described processing is repeated for all items of the network element management data. As a result, the operation corresponding to the activated GUI menu can be executed by designating the activated GUI menu.

(b) Second Network Management Device

Figure 9:
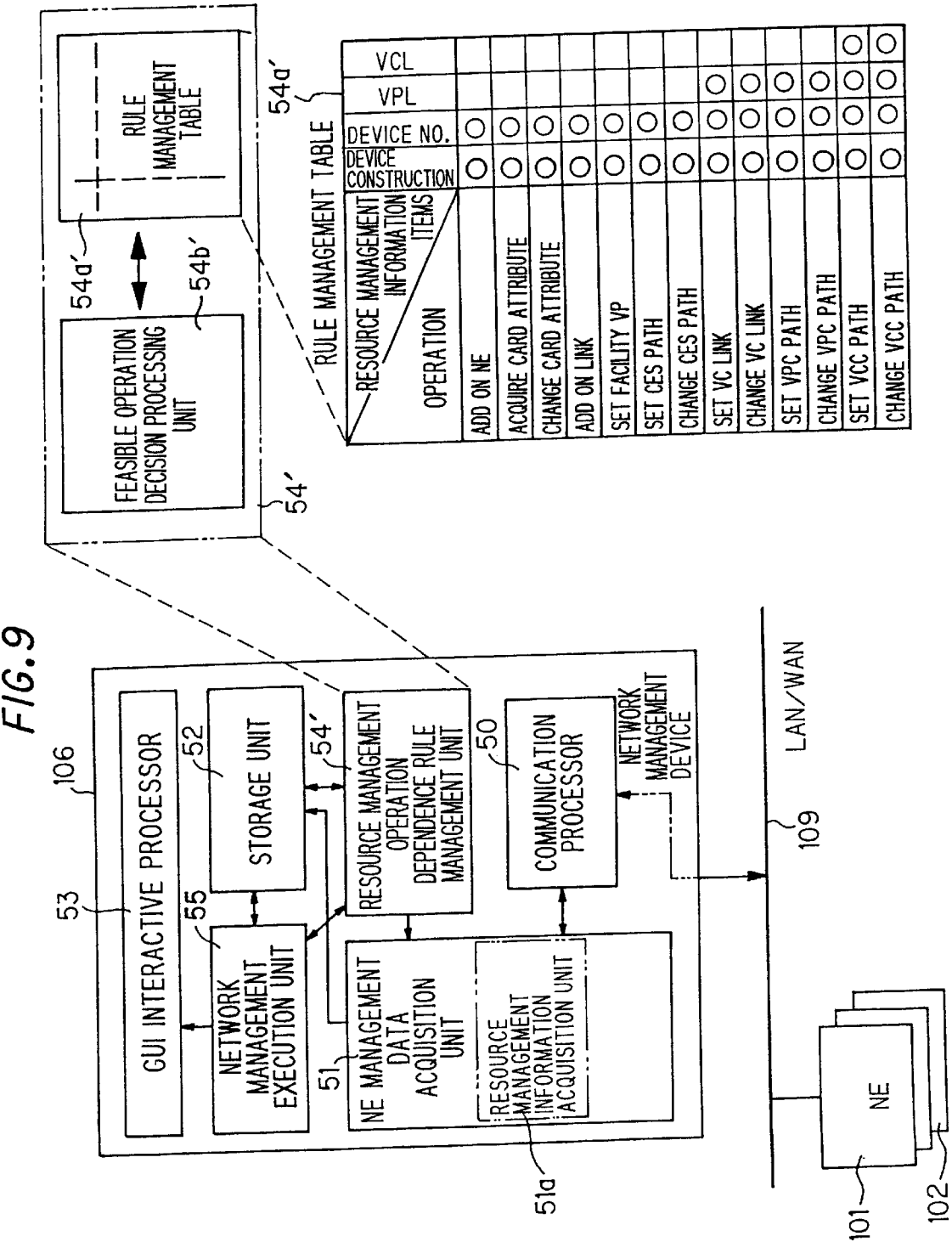
FIG. 9 is a diagram showing the functional construction of a second network management device.

FIG. 9 is a diagram showing the functional construction of a second network management device according to the present invention. Components identical with those of the first network management device shown in FIG. 6 are designated by like reference characters.

The second network management device differs from the first network management device in the following three respects:

(1) In the second network management device, the network element management data acquisition unit 51 is specialized to the resource management information acquisition unit 51a for acquiring management data relating to the network element resources. The network element resources mentioned here are managed objects such as devices held within the network elements, physical or logical communication paths, links or channels.

(2) The operation dependence rule management unit 54 is a resource-management operation dependence rule management unit 54' specialized for resource management.

(3) The resource-management operation dependence rule management unit 54' is composed of a rule management table 54a' and a feasible operation decision unit 54b'. The rule management table 54a' stores a dependence relationship between an operation concerning network management related to network element resources and items of management data (items of resource management information) necessary to execute network management that conforms to the operation. When an operation related to network element resources has been specified, the feasible operation decision unit 54b' refers to the dependence relationship to determine whether resource management information necessary to execute the network management that conforms to the operation has been acquired.

Figure 10:
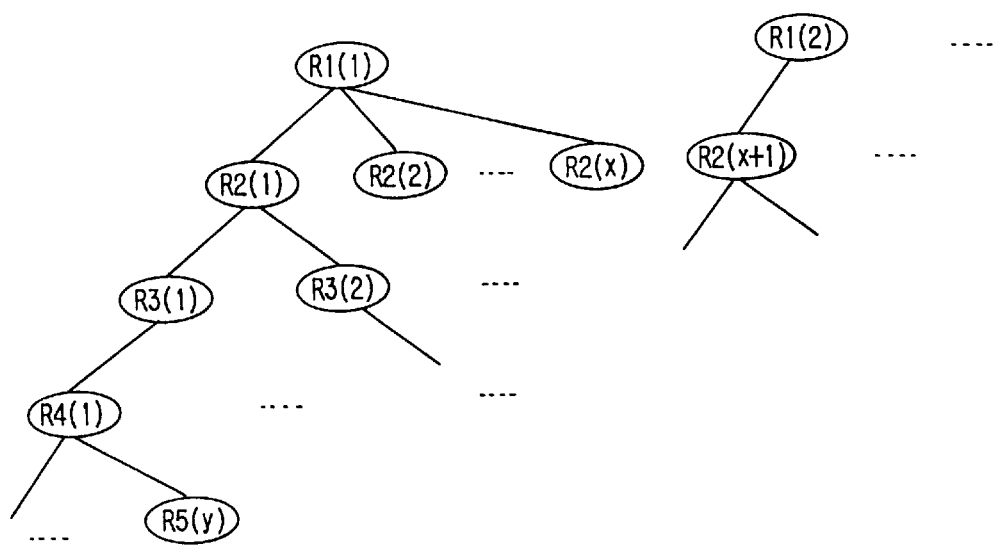
FIG. 10 is a diagram for describing the sequence through which resource management information is acquired in accordance with a tree structure.

The sequence through which items of network element resource management information are acquired is managed by a tree structure, as shown in FIG. 10. The names of the nodes in the tree represent the items of resource management information. Resource management information positioned closer to the root of the tree is acquired earlier. This means that the closer the resource management information is to the root of the tree, the earlier the operation requiring this information can be executed. Specifically, resource management information is acquired from the leading end to the tail end of the tree as follows:

leading nodes (first level): R1(1), R1(2), R1(3), . . .
next nodes (second level): R2(1), R2(2), R2(3), . . .
next nodes (third level): R3(1), R3(2), R3(3), . . .

and so on. When the items of resource management information are acquired, the executable operations are activated successively on the menu.

Figure 11:
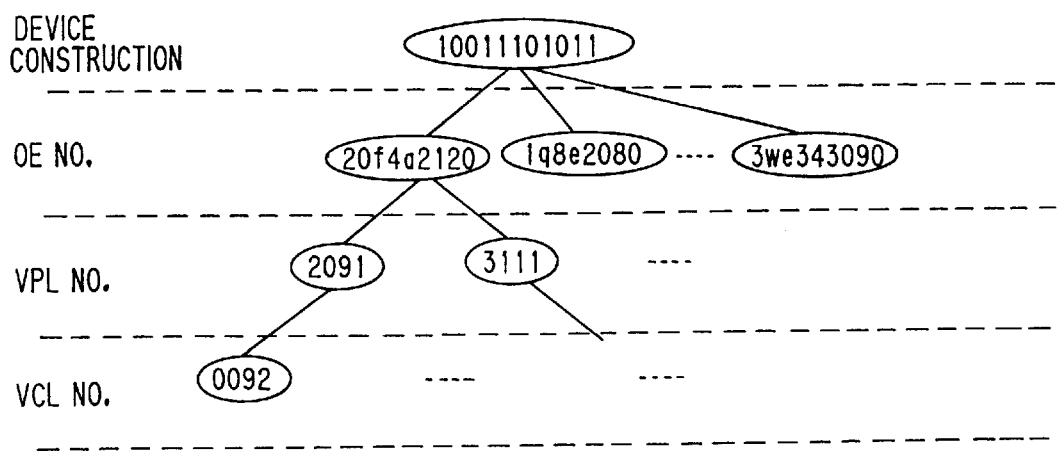
FIG. 11 shows a specific example of a tree structure.

FIG. 11 is for describing a tree structure in a case where the items of resource management information are (1) device construction, (2) OE number, (3) VPL (Virtual Path Link) number and (4) VCL (Virtual Connection Link).

The items of resource management information are arrayed in columns of items of resource management information in order of successively later acquisition in the acquisition sequence, i.e. in the order device construction →OE number→VPL number→VCL number. Operations are listed in an operation column in order from earlier stages to later stages. More specifically, the operations are listed from operations executed at acquisition of lesser resource information to operations requiring more resource information. The circle marks in the boxes indicate the items of resource management data necessary to execute the operation. Referring to this table makes it possible to ascertain which operation is executable during the course of resource management information acquisition. For example, in order to execute the operation "SET CES PATH", two items of resource management information, namely the device construction and OE number, are required. In order to execute the operation "CHANGE VCC PATH", four items of resource management information, namely the device construction, OE number, VPL and VCL, are required.

Figure 12:
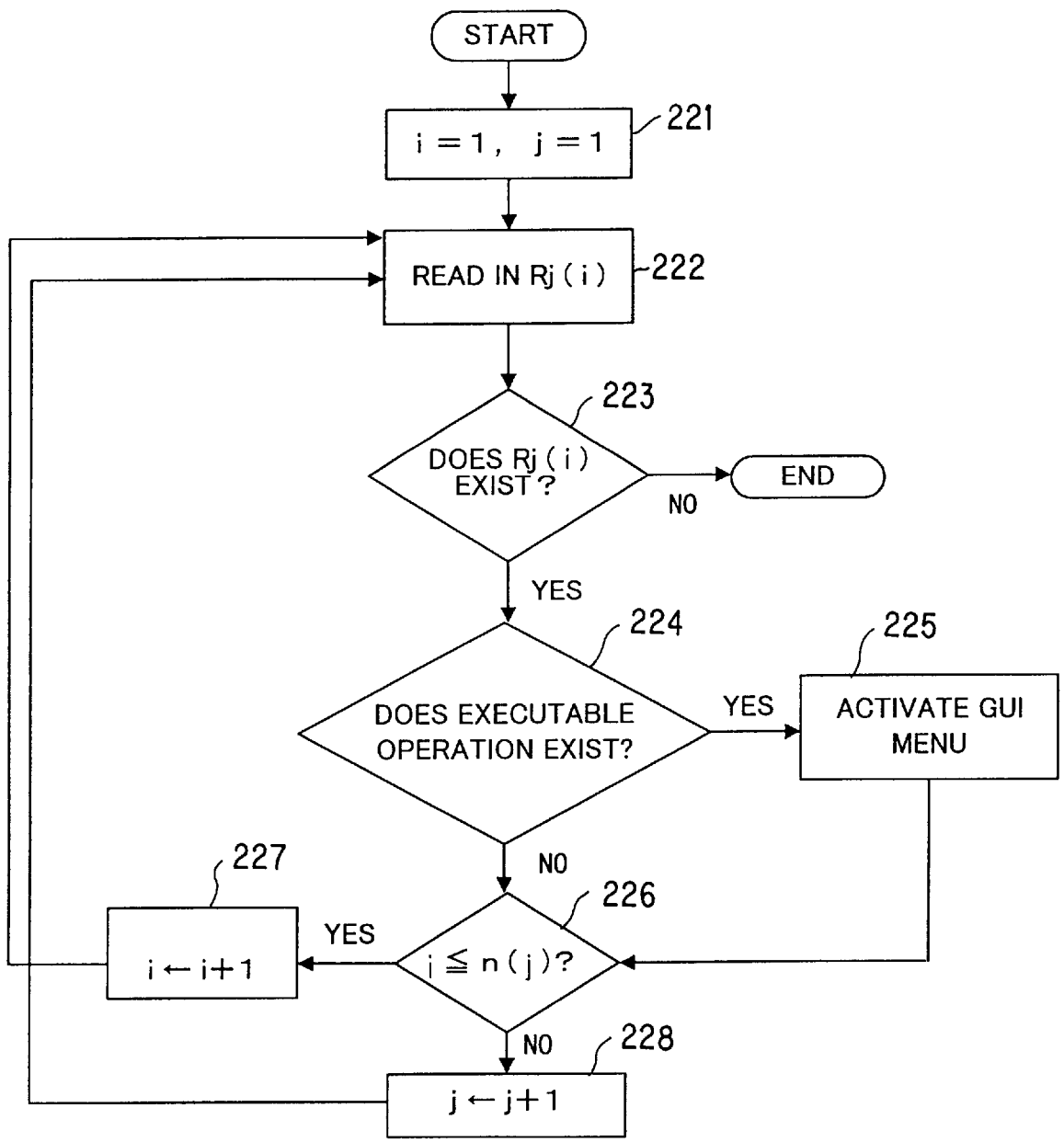
FIG. 12 is a flowchart of processing according to the invention for accepting and executing the operation of network element resource management even if acceptance of all items of network element management information has not yet been completed.

FIG. 12 is a flowchart of processing according to the invention for accepting and executing the operation of network element resource management even if acceptance of all items of network element management information has not yet been completed at start-up of the network management device or at resumption of a session. In FIG. 12, j represents the level of a tree structure, i the ith item of network element management information of the jth level and n(j) the number of nodes of the jth level.

When the network management device is started up or when a session with a network element is resumed, first i=1, j=1 is set (step 221) in order to start from the leading node R1(1). Next, Rj(i) is read in (step 222).

If a node to be read in does not exist ("NO" at step 223), processing is ended. Otherwise, the resource processing information is read in and it is determined whether an operation executable with the resource management information that has been read in exists (step 224).

If an executable operation exists, the GUI menu is activated in such a manner that this operation can be utilized through the GUI menu (step 225). If no executable operation is found, or after the processing of step 225 is executed, the sizes of i and n(j) are checked (step 226). If i≦n(j) is found to hold, i is incremented (step 227) and the processing from step S222 onward is repeated. The above operation is repeated until all nodes of the same level have been read in, i.e. until the inequality i>n(j) is established. If the inequality i>n(j) is established, a transition is made to the nodes of the next level (step 228) by performing the operations j+1→j, 1→j, after which processing from step 222 onward is repeated.

As a result, some of the operations are rendered executable early on via the GUI menu even during the course of processing for acquiring the resource management information.

(c) Third Network Management Device

Figure 13:
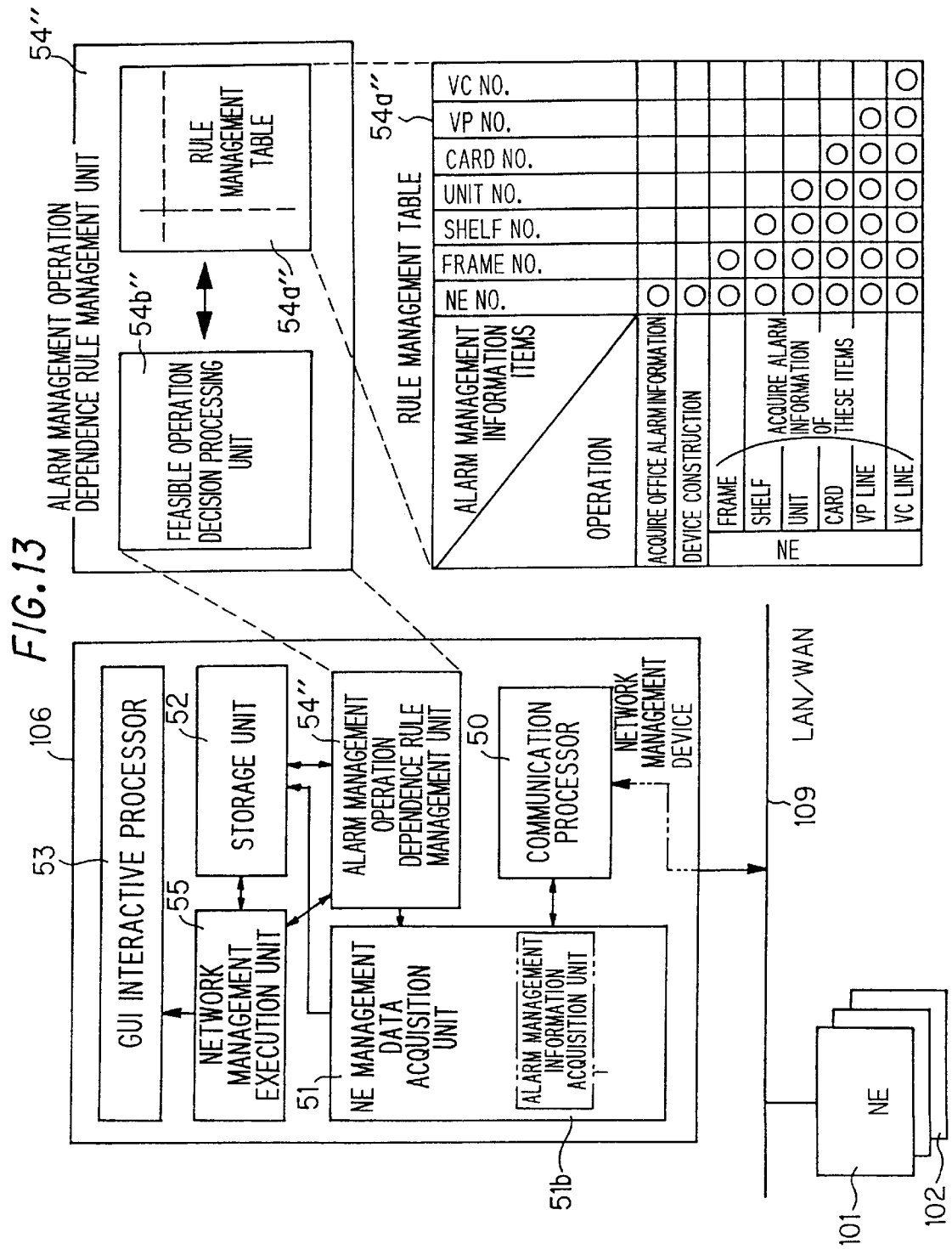
FIG. 13 is a diagram showing the functional construction of a third network management device.

FIG. 13 is a diagram showing the functional construction of a second network management device according to the present invention. Components identical with those of the first network management device shown in FIG. 6 are designated by like reference characters.

The third network management device differs from the first network management device in the following three respects:

(1) In the third network management device, the network element management data acquisition unit 51 is specialized to the alarm management information acquisition unit 51b for acquiring management data relating to an alarm.

(2) The operation dependence rule management unit 54 is an alarm-management operation dependence rule management unit 54" specialized for alarm management.

(3) The alarm-management operation dependence rule management unit 54" is composed of a rule management table 54a" and a feasible operation decision unit 54b". The rule management table 54a" stores a dependence relationship between an operation concerning an alarm and items of alarm management information. When an operation related to an alarm has been specified, the feasible operation decision unit 54b" refers to the dependence relationship to determine whether all of the alarm management information necessary to execute the network management that conforms to the operation has been acquired.

Figure 14:
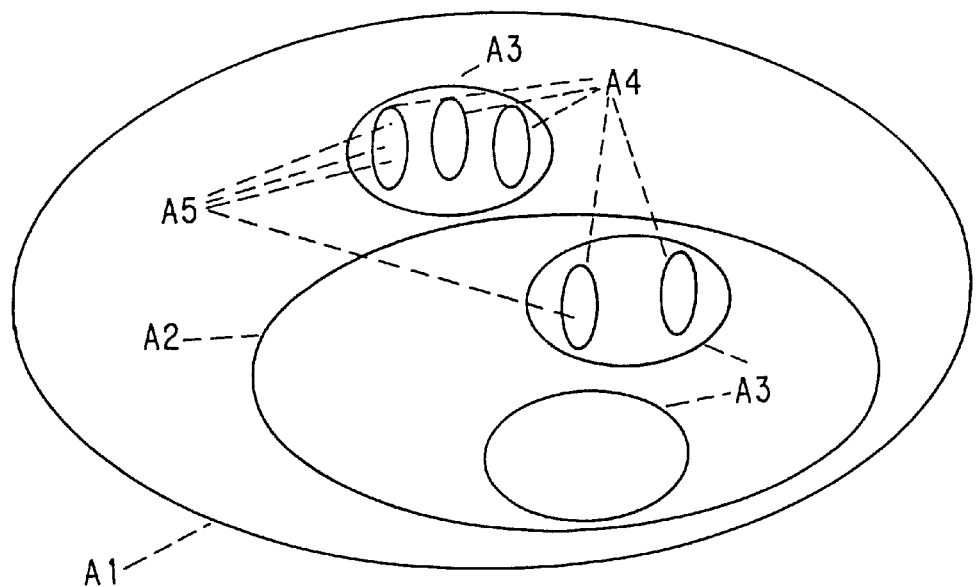
FIG. 14 is a diagram for describing the sequence through which alarm management information is acquired in accordance with an inclusion structure.

As shown in FIG. 14, objects of alarm management are divided up into groups of several inclusion levels A1, A2, A3 . . . which satisfy the relation $$A1 \supseteq A2 \supseteq A3 \supseteq \ldots$$

The inclusion level on the extreme left side of the relation is the highest, with the level becoming successively lower toward the right side. It is so arranged that alarm management information within a group having a high inclusion level is acquired sooner than alarm management information within a group having a low inclusion level. As a result, alarm information, which is from a location that is the cause of the alarm, that falls within a broader range can be acquired sooner than alarm information that falls within a more limited range.

Figure 15:
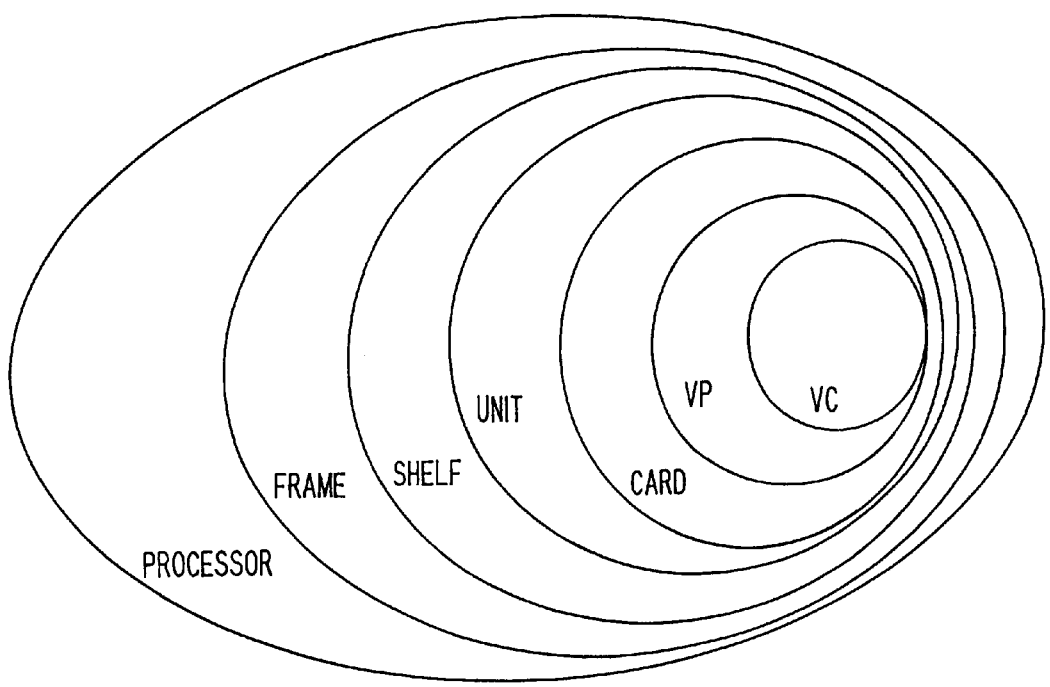
FIG. 15 shows a specific example of an inclusion structure.

FIG. 15 is a diagram for describing an inclusion relation in a case where the objects of alarm management are a processor, a frame, a shelf, a unit, a card a VP and a VC. The inclusion relation is processor⊇frame⊇shelf⊇unit⊇card⊇VP⊇VC Alarm management information is acquired successively from alarm management information of a high inclusion level to alarm management information of a low inclusion level. When the items of alarm management information are acquired, the executable operations are activated successively on the menu. Accordingly, the items of resource management information are arrayed in columns of items of alarm management information in the rule management table 54a" in order of successively later acquisition in the acquisition sequence, i.e. in the order of decreasing inclusion level, namely in the order NE number→frame number→shelf number→unit number→card number→VP number→VC number. Operations are listed in an operation column in order from earlier stages to later stages. More specifically, the operations are listed from operations executed at acquisition of lesser alarm management information to operations requiring more alarm management information. The circle marks in the boxes indicate the items of alarm management data necessary to execute the operation. Referring to this table makes it possible to ascertain which operation is executable during the course of alarm management information acquisition. For example, in order to execute the operation "ACQUIRE OFFICE ALARM INFORMATION", the network element number is necessary. In order to execute the operation "ACQUIRE CARD ALARM INFORMATION", five items of resource management information are required, namely the network element number, frame number, shelf number, unit number and card number.

Figure 16:
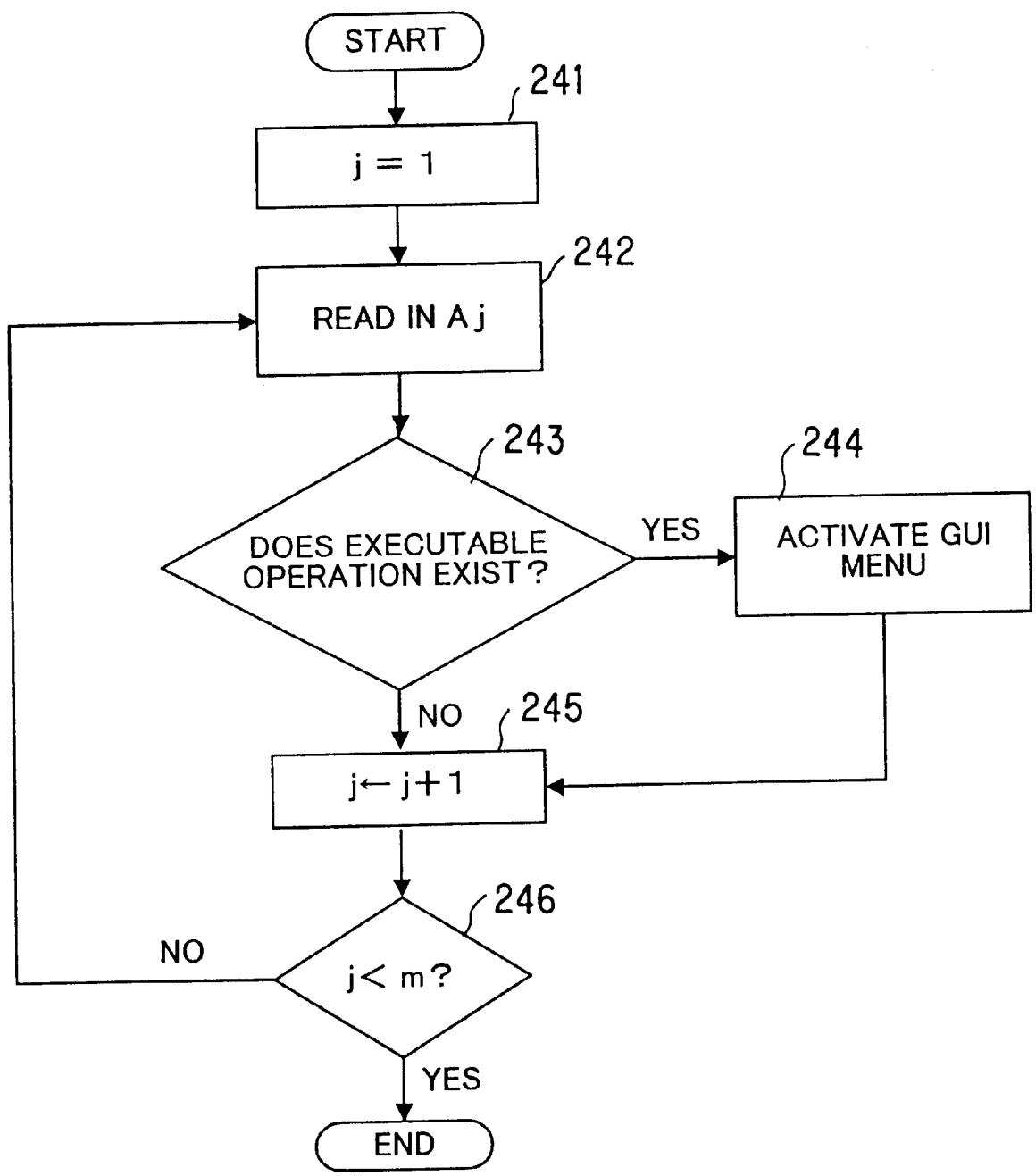
FIG. 16 is a flowchart of processing for accepting and executing an alarm management operation even if acceptance of all items of network element management information has not yet been completed.

FIG. 16 is a flowchart of processing according to the invention for accepting and executing the operation of alarm management even if acceptance of all items of network element management information has not yet been completed at start-up of the network management device or at resumption of a session. In FIG. 16, Aj represents the inclusion group of the jth level and Am represents the inclusion level of the lowest level.

First, to start from group A1 having the highest inclusion level, the operation j=1 (step 241) is performed. Next, the alarm management information of the jth inclusion group is read in (step 242). It is then determined whether an operation executable with the alarm management information that has been read in exists (step 243). If an executable operation exists, the GUI menu is activated in such a manner that this operation can be utilized through the GUI menu (step 244). Thereafter, or if no executable operation is found at step 243, the level is lowered by the operation j+1→j (step 245) and it is determined whether j<m holds (step 246). If j≧m is found to hold, then processing from step 242 is executed. If j<m holds, then processing is ended.

As a result, some of the operations are rendered executable early on via the GUI menu even during the course of processing for acquiring the alarm management information.

Figure 17:
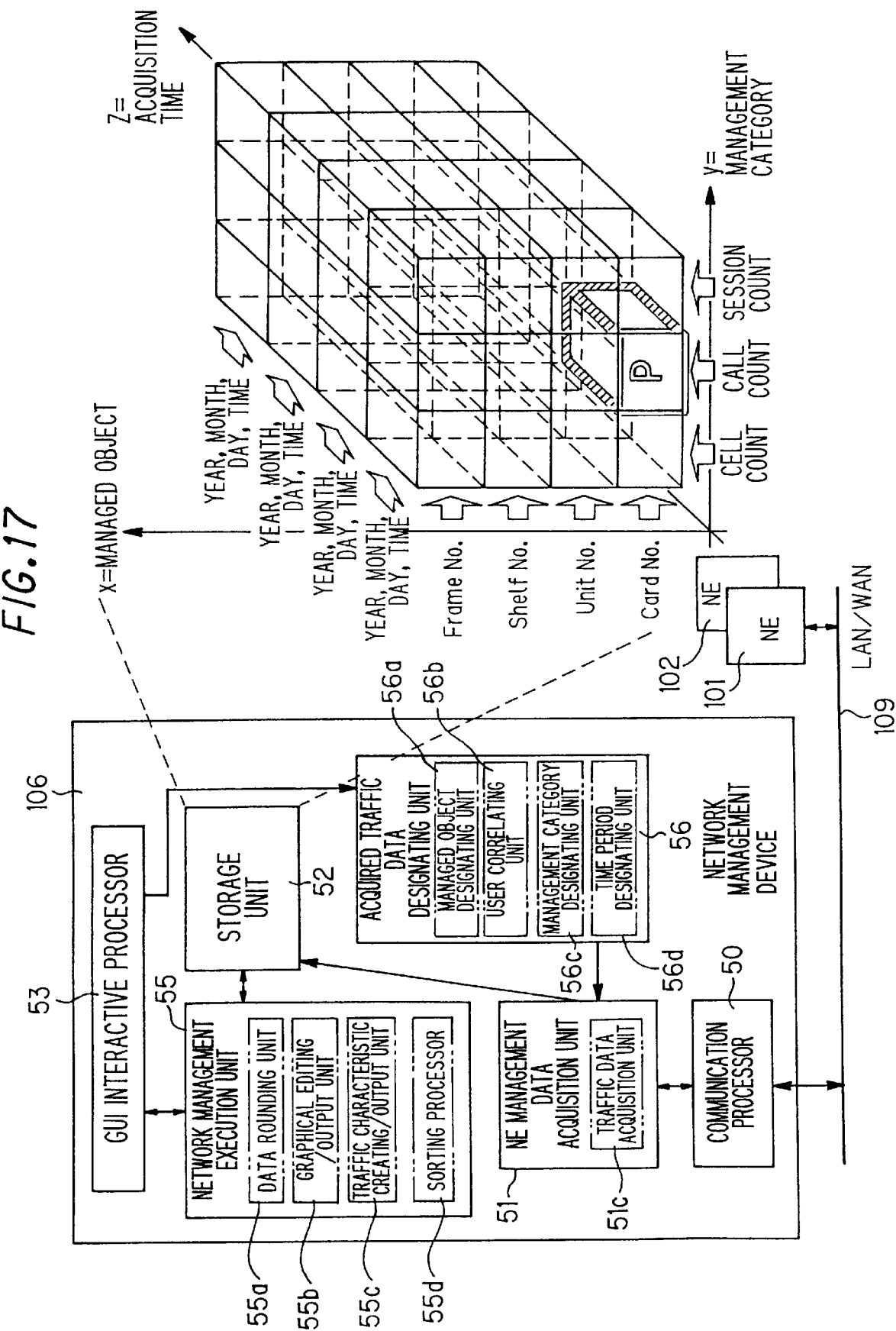
FIG. 17 is a diagram illustrating the architecture of a network management device applicable to traffic management.

(C) Traffic Management (a) Network Management Device Applicable to Traffic Management FIG. 17 is a diagram illustrating the architecture of a network management device applicable to traffic management according to the present invention.

Shown in FIG. 17 are the network elements (NE) 101, 102, the network management device 106 and the management network such as a LAN/WAN. The network management device 106 includes the communication processor 50 which executes processing for communication with the network elements 101, 102 via the management network 109, and the network element management data acquisition unit 51 for acquiring, in stages, various management data possessed by each of the network elements when a session with the network elements 101, 102 is resumed and when the network management device itself is started up. The management data acquisition unit 51 has the traffic data acquisition unit 51c for acquiring traffic data of each managed object. The traffic data acquisition unit 51c acquires, in stages, the traffic data possessed by each of the network elements when a session with the network elements 101, 102 is resumed and when the network management device itself is started up, and the proceeds to acquire traffic data periodically after start-up is completed.

The storage unit 52 stores management data and traffic data collected from each of the network elements by the traffic data acquisition unit 51c. The traffic data acquisition unit 51c acquires traffic data over a prescribed period of time for each category of management of each managed object and stores the traffic data in the storage unit 52 in the form of a three-dimensional matrix structure. The GUI interactive processor 53 serves as a man/machine interface and executes processing for setting various data via the display unit, keyboard and mouse, for designating operations and for outputting the results of operations. The network management execution unit 55 executes network management that conforms to a requested operation and has a data rounding unit 55a, a graphical editing/output unit 55b, a traffic characteristic creating/output unit 55c and a sorting processor 55d.

The data rounding unit 55a shapes traffic data of a first time period (e.g. a unit of 15 minutes) acquired by the traffic data acquisition unit 51c to traffic data, such as average value, peak value and total amount, of a second time period (e.g. a unit of one hour) longer than the first time period, then successively shapes the traffic data of shorter time periods to traffic data, such as average value, peak value and total amount, of longer time periods (i.e. minutes→hours, hours→days, days→weeks, weeks→months, months→years) as necessary, and stores the data in the storage unit 52. The graphical editing/output unit 55b edits the traffic data so that it is displayable as a graphical representation and outputs a graph based upon the edited data. Using the traffic data acquired and the traffic data shaped, the traffic characteristic creating/output unit 55c creates a traffic characteristic requested by the user in the operation and outputs this traffic characteristic as a graph. The sorting processor 55d sorts the traffic data by day, week, month or year time period in accordance with a predetermined reference and outputs the sorted results as a list or the like.

An acquired traffic data designating unit 56 designates the managed object, the category of management and the acquisition time period of the traffic data acquired from each of the network elements and establishes correspondence between the managed objects and users. The acquired traffic data designating unit 56 has (1) a managed object designating unit 56a for designating a managed object, (2) a user correlating unit 56b for establishing a corresponding relationship between managed objects and users, (3) a management category designating unit 56c for designating category of management and (4) an acquisition time period designating unit 56d for designating the acquisition time period.

(b) Three-Dimensional Matrix Structure of Traffic Data

The traffic data acquisition unit 51c acquires traffic data over a predetermined time period per each category of management of each managed object and stores the traffic data in the storage unit 52 in the form of a three-dimensional matrix structure, as set forth above. Examples of managed objects are alarms, shelves, units and cards, etc., examples of categories of management are cell management, call management and session management, etc., and examples of traffic data are cell count, call count and session count, etc.

Figure 18:
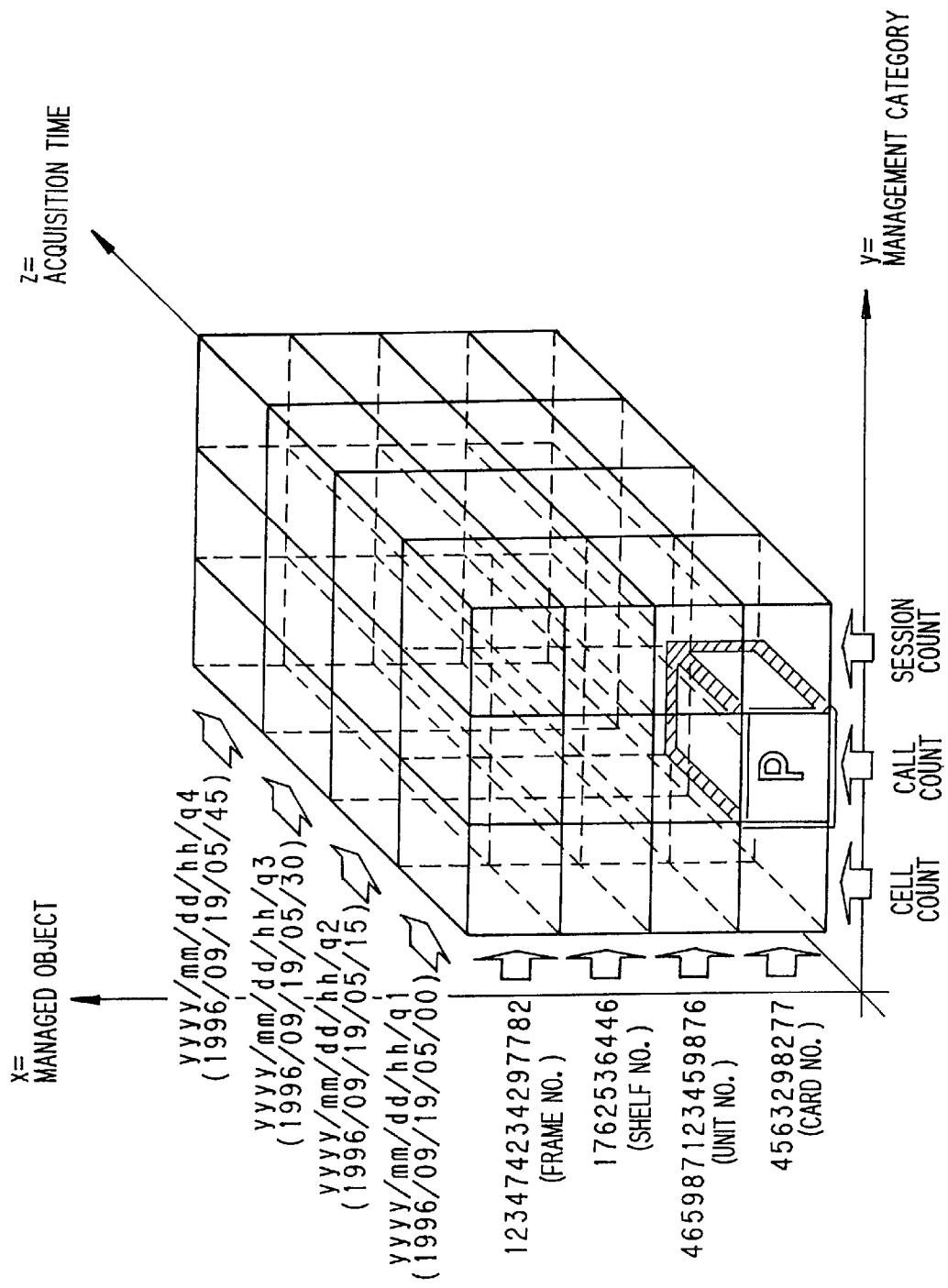
FIG. 18 is a diagram for describing a three-dimensional matrix structure of traffic management data.

FIG. 18 is an explanatory view for a case where traffic data is stored as a three-dimensional matrix structure in which managed objects are arrayed along the x axis, management categories along the y axis and acquisition time along the z axis. The managed objects are the following four items:

Frame No.=123474234297782
Shelf No.=1762536446
Unit No.=46598712349876
Card No.=4563298277 the management categories are the following three items:

Cell
Call
Session and the acquisition time is a period of 15 minutes, that is, acquisition is performed periodically every 15 minutes.

Each cube in FIG. 18 is represented by the following coordinates:

$$Cube=P(x,y,z) \qquad (1)$$

where x signifies the managed object, y the management category and z the acquisition time. The cube P in FIG. 18 signifies a call count over an acquisition time yyyy/mm/dd/hh/ql (year, month, day, hour, second of 1996/09/19/05/00) with regard to a card (the Card No. 4563298277), which is the managed object. This is expressed by $$Cube-P=P(Card, Call, yyyy/mm/dd/hh/ql) \qquad (2)$$

By performing management using the three-dimensional matrix, any traffic data can be specified by Equation (1).

As a consequence of the foregoing, the three following characteristics can be ascertained to facilitate monitoring of traffic:

(1) a characteristic indicating status of use of a managed object at a specific time and in a specific management category, wherein the characteristic is obtained by holding the two variables x and y fixed and making x (the managed object) a variable;

(2) a traffic data characteristic of each management category at a specific time and of a specific managed object, wherein the characteristic is obtained by holding the two variables x, z fixed and making y (the management category) a variable; and (3) a traffic time characteristic of a specific managed object and a specific management category, wherein the characteristic is obtained by holding the two variables x, y fixed and making z (the acquisition time) a variable.

Figures 19, 20:
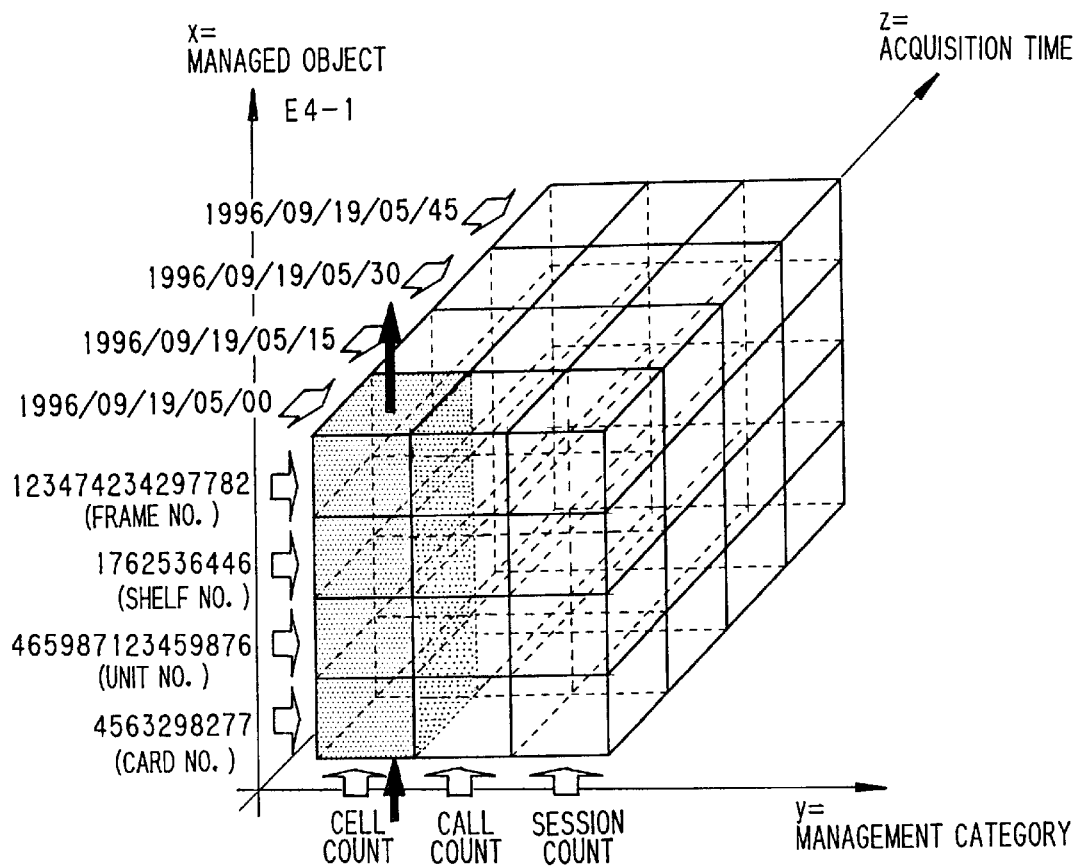
FIG. 19 is a diagram for describing a case in which a managed object is cut from the matrix as a variable.
FIG. 20 illustrates a use status characteristic of each device relating to management category (cell count) at a date and time of 1996/09/19/05/00.

For example, if managed object is cut from the matrix as a variable, as shown in FIG. 19, it is possible to ascertain a characteristic indicating status of use of each managed object at a specific time and in a specific management category, as illustrated in FIG. 20. For example, it is possible to ascertain cell status at a date and time of Sept. 19, 1996, 5:00 for each of the following:

Frame No.=123474234297782
Shelf No.=1762536446
Unit No.=46598712349876
Card No.=4563298277

Figures 21, 22:
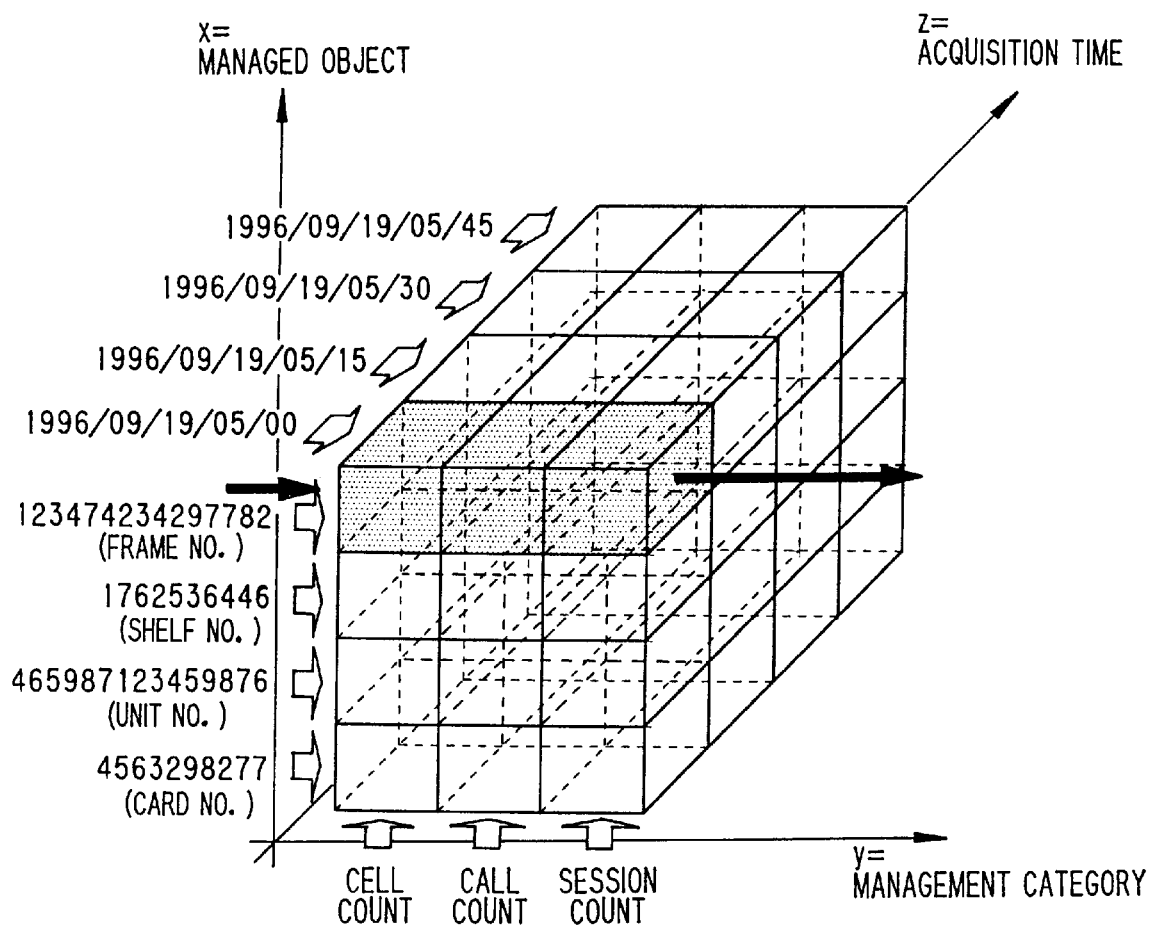
FIG. 21 is a diagram for describing a case in which management category is cut from the matrix as a variable.
FIG. 22 illustrates a characteristic of each management category at a date and time of 1996/09/19/05/00 with regard to a target device 123474234297782.
Figure 23:
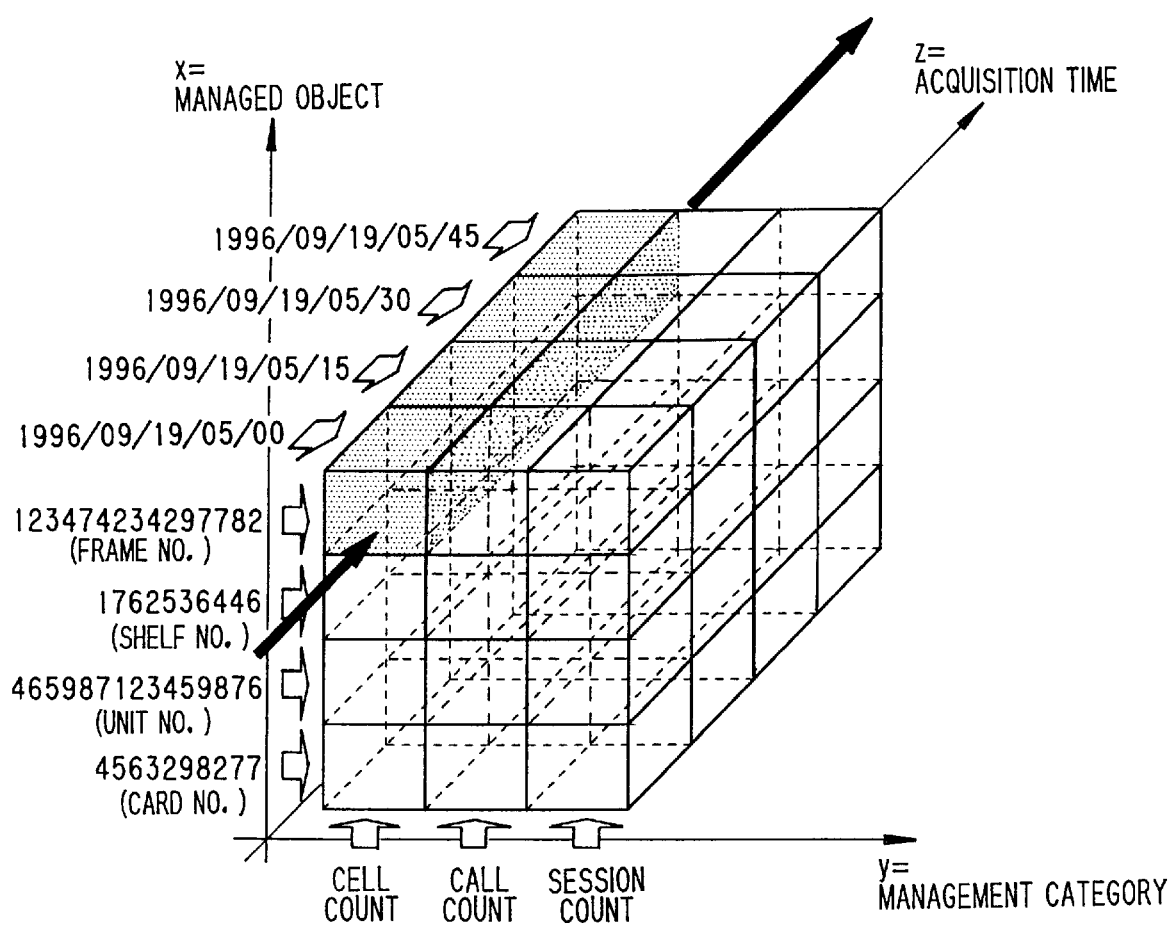
FIG. 23 is a diagram for describing a case in which acquisition time is cut from the matrix as a variable.

If management category is cut from the matrix as a variable, as shown in FIG. 21, it is possible to ascertain the status of each traffic data count (cell count, call count and session count) at a date and time of Sept. 19, 1996, 5:00 for Frame No.=123474234297782 as shown in FIG. 22. If acquisition time is cut from the matrix as a variable, as illustrated in FIG. 23, it is possible to ascertain the change in traffic every 15 minutes of a cell for Frame No.=123474234297782

The change in number of calls every 15 minutes is illustrated in FIG. 24.

(c) Designation of Managed Object

If the managed object designating unit 56a (FIG. 17) designates managed object, the traffic data acquisition unit 51c acquires only the traffic data concerning the managed object that has been designated.

Figure 25:
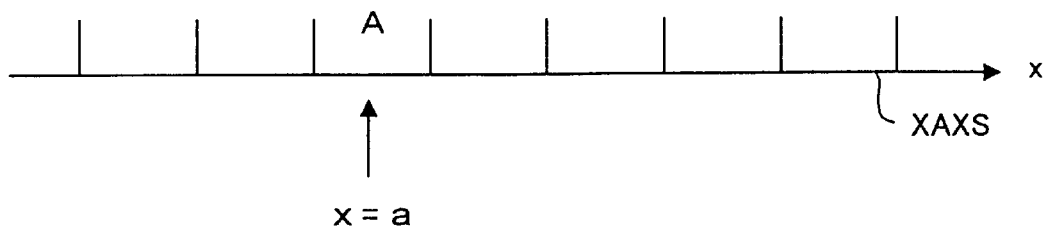
FIG. 25 is a diagram for describing a method of designating a managed object.

FIG. 25 is a diagram for describing a method of designating a managed object. Here XAXS is the x axis of the three-dimensional matrix structure (FIG. 18). A managed object A can be correlated by the function $$A=A(x) \qquad (3)$$

in which the coordinate value x on this axis is a variable. In other words, the managed object A is specified by the coordinate x=a on the x axis and is registered at one point x=a on the x axis as $$A=A(a) \qquad (3)'$$

The managed object A can be expressed by a linked number sequence of N (n) in the manner $$A=[N(1)N(2)N(3),,,N(last)] \qquad (4)$$

Figure 26:
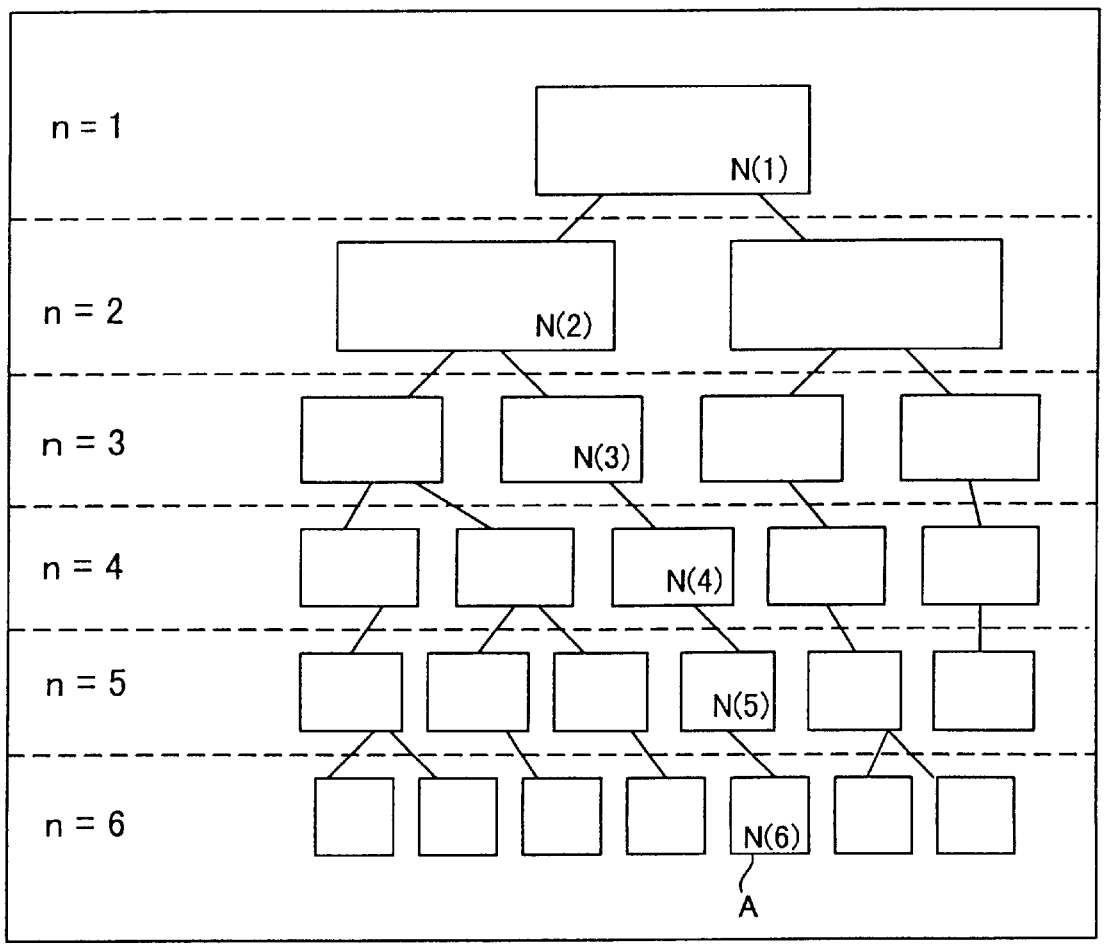
FIG. 26 is a diagram for describing an ordinary inclusion tree.

See the inclusion tree of FIG. 26. Here n represents the hierarchical level of the inclusion tree and N(n) an identification number in the nth hierarchical level. More specifically, the managed object A is expressed by connecting the identification numbers N(1), N(2) , , , N(last) of devices in the inclusion relation in each level from hierarchical level 1 to the last hierarchical level. Accordingly, the managed object A is expressed by $$N(1)N(2)N(3)N(4)N(5)N(6)$$

in FIG. 26.

Figure 27A:
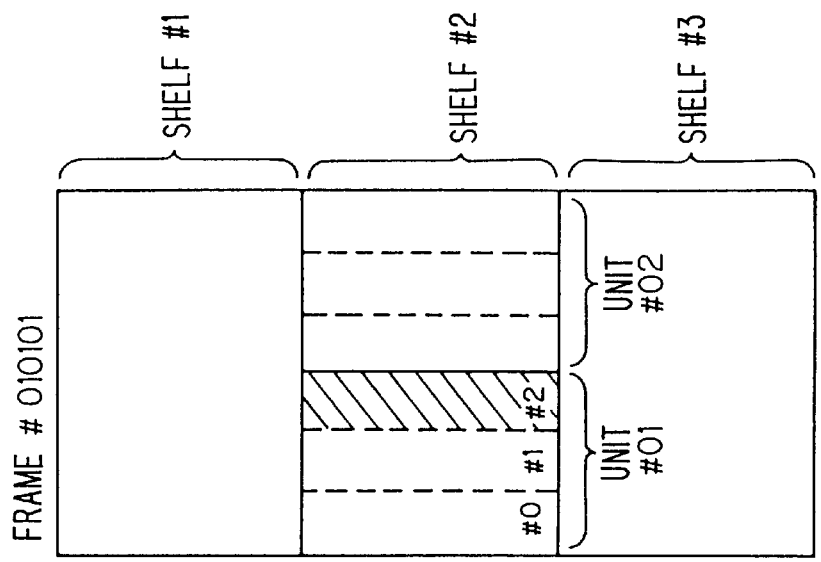
FIGS. 27A and 27B are diagrams for describing the device construction of a switch and a device number (office equipment number)
Figure 27B:
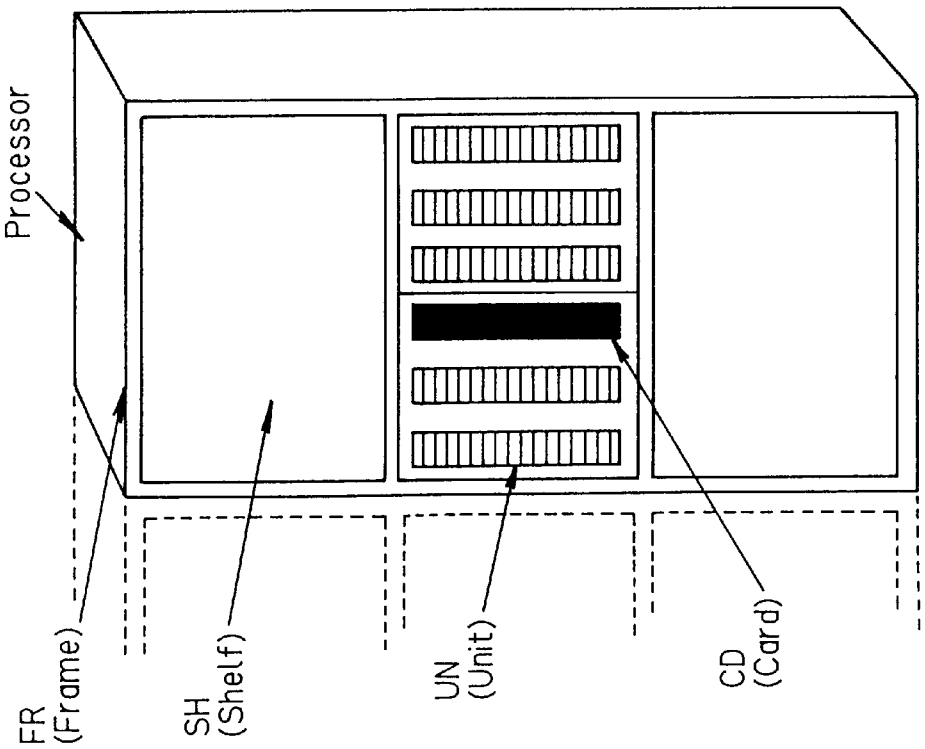
Figure 28:
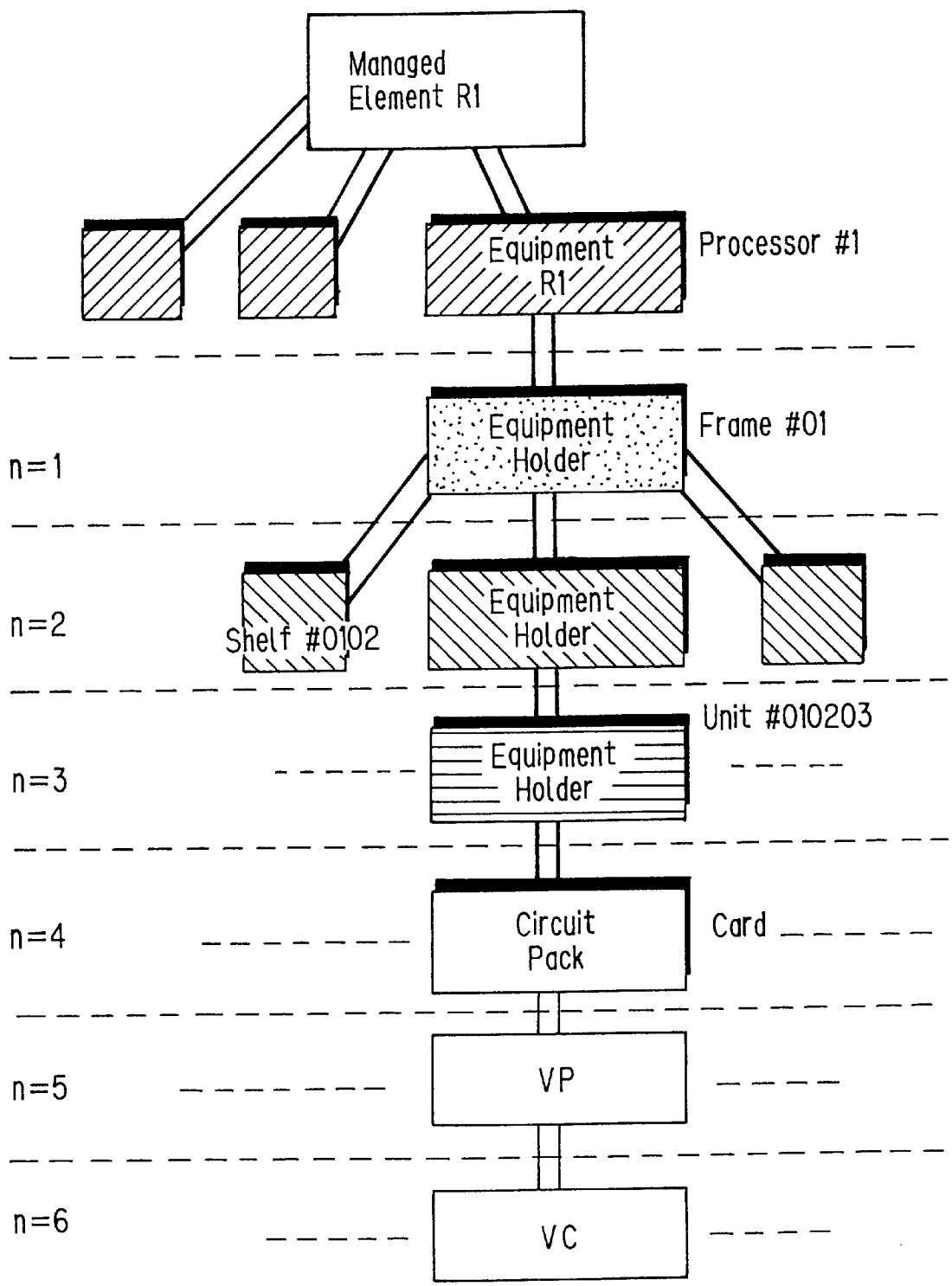
FIG. 28 is a diagram showing the inclusion tree of the switch.

FIGS. 27A and 27B are diagrams showing the device construction of an actual switch, and FIG. 28 is a diagram showing the inclusion tree of the switch. The switch possesses a frame FR, a shelf SH, a unit UN and a card CD as physical devices as well as a VP (virtual path) and VC (virtual connection) as logical devices. The devices have an inclusion relationship in which the shelf SH is accommodated in the frame FR, the unit UN is accommodated in the shelf SH, etc., as evident from FIGS. 27A and 27B. Accordingly, the relationship among these devices can be expressed by the inclusion tree arrangement of FIG. 28. That is, the frame FR, shelf SH, unit UN, card CD, VP and VC correspond to the hierarchical levels of the tree structure shown in FIG. 28, and the actual inclusion relation is expressed by the lines between the devices in the tree. Specifying one device in the tree is the same as specifying the actual device. A Frame No. f, Shelf No. s, Unit No. u, Card No. c, VPI No. x and VCI No. y are assigned to the devices as identification numbers. As a result, a prescribed device is expressed by connecting the identification numbers of devices in an inclusion relation from the hierarchical level 1 to the last hierarchical level to which the device belongs.

For example, a device is uniquely expressed by a series of identification numbers of devices which take into account the inclusion relation at each level in the manner card: f-s-u-c
VP: f-s-u-c-x
VC: f-s-u-c-x-y In the case of an actual switch, as shown in FIG. 27B, the device number (OE number) is expressed by a decimal number of ten digits in the manner ffffffsuuc. More specifically, the device number is expressed by placing the Frame No. ffffff as N(1) at the first through sixth digits, placing the Shelf No. s as N(2) at the seventh digit, placing the Unit No. uu as N(3) at the eighth and ninth digits, and placing the Card No. c as N (last) at the tenth digit. Accordingly, the OE number of the card indicated in black in FIG. 28 is expressed by "0101012012".

Thus, the managed object A indicated by Equation (4), namely [N(1) N(2) N(3) , , , N (last)], can be used as is as a scope key for specifying the device. The device is specified by the scope key A as follows:

The scope key first compares the device number which exists at n=1 level of the tree structure and the value of N(1) in the scope key. If the device whose device number is N(1) is found, the scope key lowers the level of the inclusion tree structure by one level, compares the device number in the n=2 level and N(2) in the scope key and retrieves the device whose device number is N=2. Thus, while successively lowering the level of the hierarchical structure, the scope key performs retrieval at leach level and specifies the device of the N (last) level.

Thus, the device can be specified by the A in Equation (4). Therefore, if the coordinate value x in Equation (3) is given to designate the device A, which is the managed object, it is possible to acquire the traffic data solely from the designated device A. It should be noted that the function A(x) of Equation (3) is a function which converts the coordinate value x to [N(1) N(2) N(3) , , , N (last)], and the correspondence table giving the correspondence between x and [N(1) N(2) N(3) , , , N (last)] is stored in advance. When x has been given, reference is made to this correspondence table to obtain the managed object A=[N(1) N(2) N(3) , , , N (last)] indicated by Equation (4).

By thus designating the object that is to undergo traffic management, it is unnecessary to acquire management data from all of the managed objects and it suffices to acquire and store traffic data solely from the object that is to actually undergo traffic management. This makes it possible to reduce the necessary storage capacity of the storage unit and to shorten the time needed for acquisition of the traffic data.

It is described above that the correspondence between the coordinate x and [N(1) N(2) N(3) , , , N (last)] is stored and that [N(1) N(2) N(3) , , , N (last)] corresponding to the coordinate x is obtained from the correspondence table. However, by performing the operation $$A=A(x)=x$$

in Equation (3) and using x=[N(1) N(2) N(3) , , , N (last)], the device number of the managed object A can be designated directly.

(d) Establishing Correspondence Between Managed Objects and Users

The traffic data is stored in the storage unit 52 beforehand in the form of the three-dimensional matrix structure. If the managed object has been designated, the network management execution unit 55 is capable of outputting prescribed traffic characteristics by dealing with the traffic data of the managed object designated. Accordingly, if one-to-one correspondence can be established between the network users (subscribers) and the managed objects, designating a network user will make it possible to output the traffic characteristic of the network user. In other words, if the name of the user is entered, the network management execution unit 55 obtains the managed object from the corresponding relationship between the managed object and its user, reads traffic data regarding this managed object (the network user) from the storage unit 52, creates the traffic characteristic required for this user and then outputs the traffic characteristic.

Figure 29:
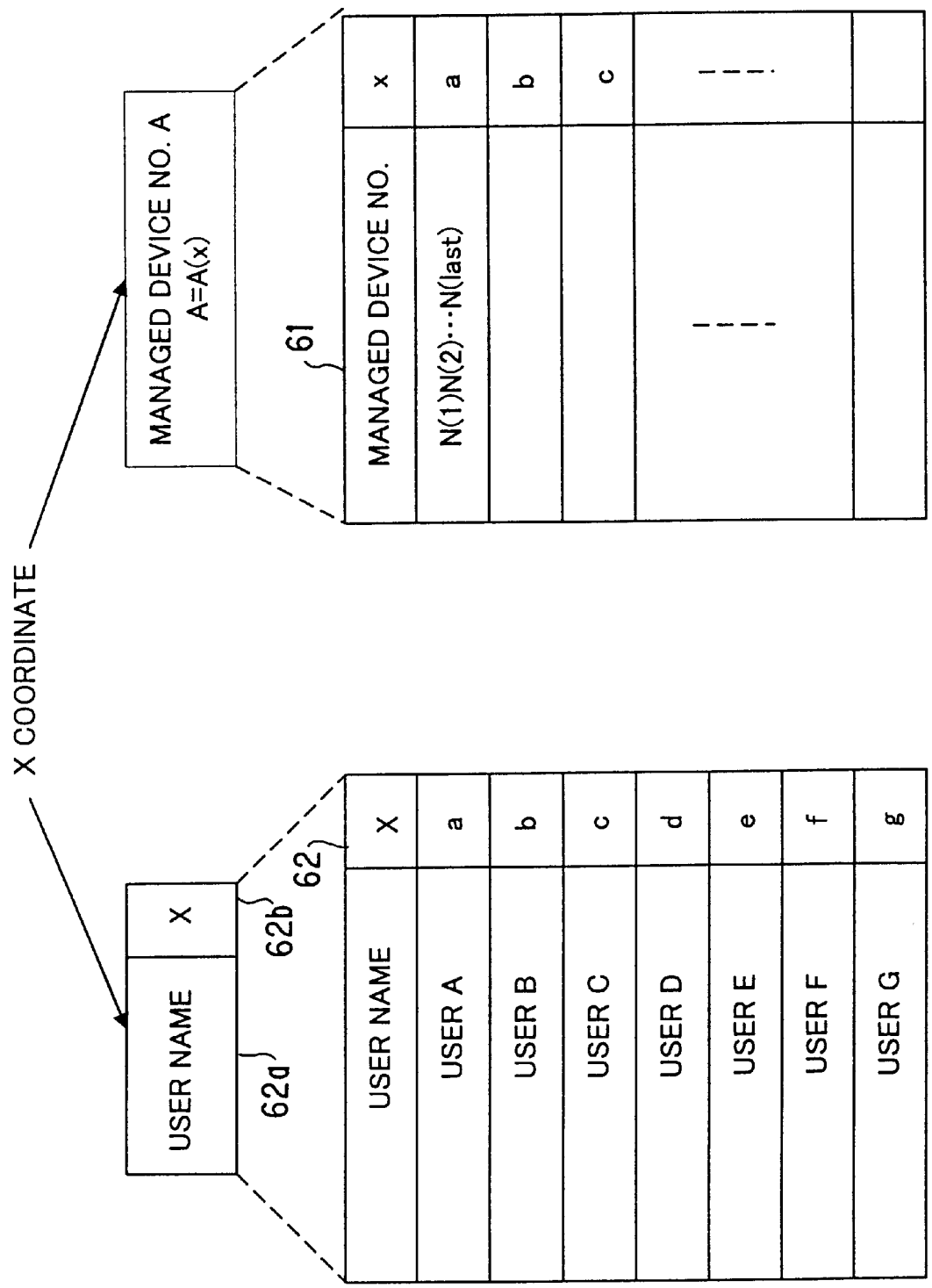
FIG. 29 is a diagram for describing a method of establishing correspondence between managed objects and users.

FIG. 29 is a diagram for describing a method of establishing correspondence between managed objects and users. A first correspondence table 61 stores the correspondence between the coordinate x and the device number [N(1) N(2) N(3) , , , N (last)], and a second correspondence table 62 stores the correspondence between the coordinate x and the user names. In a case where x is the device number [N(1) N(2) N(3) , , , N (last)] itself, the first correspondence table 61 will be unnecessary.

When correspondence is to be established, a user name 62a is entered and then the x coordinate value of the managed object to be correlated with the user is entered as a label 62b. As a result, the user correlating unit 56b registers the entered user name+x coordinate value in the second correspondence table 62. This means that the user name and managed object are made to correspond to each other via the coordinate value x. When the user name is subsequently entered, therefore, the user correlating unit 56b obtains the coordinate value x from the second correspondence table 62 and then inserts the coordinate value x in Equation (3), thereby making it possible to acquire the object device number A=[N(1) N(2) N(3) , , , N (last)] that corresponds to the user name.

Figure 30:
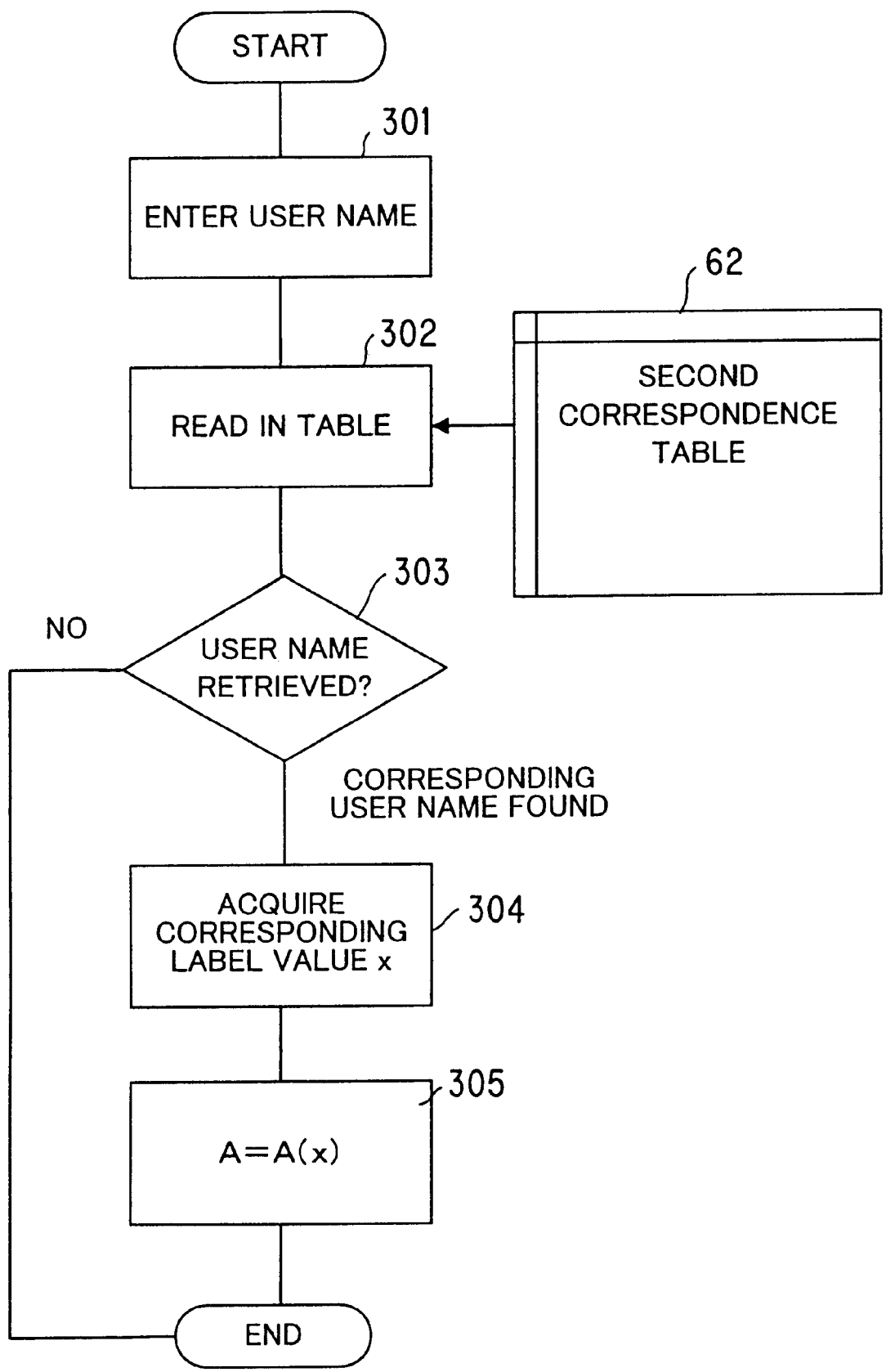
FIG. 30 is a flowchart of processing for acquiring the number of a managed device by specifying the name of a user.

FIG. 30 is a flowchart of processing for acquiring the number of a managed device by specifying the name of a user.

First, the user name is entered (step 301) then the user correlating unit 56b reads in the user name items from the second correspondence table 62 (step 302) and compares the user names read in with the entered user name (step 303). If a user name identical with the entered user name is found, the x coordinate value in the same row as the user name, e.g. a, is read in (step 304). Next, the coordinate value a is substituted for the variable x in the equation $$A=A(x)$$

to thereby acquire the managed object $$A=N(1)N(2)N(3),,,N(last)$$

that corresponds to the coordinate value a (step 305). Processing is then terminated. If a corresponding user name is not found ("NO" at step 303), then processing is ended immediately.

Thus, a device number corresponding to user name can be acquired. As a result, a managed object, namely the traffic data concerning a user, can be acquired from the storage unit 52 by adopting the acquired device number as a scope key, and processing for creating various traffic characteristics, outputting the characteristics, analyzing singular points in the characteristics and outputting the same can be executed using the traffic data.

Further, since the traffic information can be handled in network user (subscriber) units, a traffic report can also be issued on a per-subscriber basis, as shown in FIG. 31. In FIG. 31, NAME is the name of the subscriber and represents the individual or enterprise to which the report is directed. Further, TCND is a graph showing the hourly change in the number of passed cells on one day. By observing the graph, the subscriber can ascertain the particular characteristic, such as at what times of the day the line was used most. TCNM is a graph showing the number of passed cells and the number of lost cells in one month. This graph makes it possible for the subscriber to determine singular days, such as specific days on which the monthly traffic increases. TSPC is a list indicating dates and times at which traffic is especially heavy, and TANL is a traffic analysis list analyzing and indicating the traffic data of the subscriber.

(e) Designation of Management Category

By designating the management category that is to undergo traffic management, it is unnecessary to acquire traffic data regarding all management categories and it suffices to acquire and store traffic data solely with regard to management categories that are to actually undergo traffic management. This makes it possible to reduce the necessary storage capacity of the storage unit and to shorten the time needed for acquisition of the traffic data.

FIG. 32 is a diagram for describing designation of category of management. A node NDij in an inclusion tree represents a managed device in a ith level. Traffic data is divided into three management categories, namely number of cells (cell count), number of calls (call count) and number of sessions (Session Count), for each managed device NDij. The management category necessary for traffic management is designated under the control of the management category designating unit 56c (FIG. 17). The traffic data acquisition unit 51c reads in only the traffic data of the management category designated and stores the data as a three-dimensional matrix in the storage unit 52.

A field MDD for designating the category of measured data is included in a traffic monitoring and setting screen in the manner shown in FIG. 33. To designate a management category, therefore, this screen is displayed on the display unit and the management category (cell count, call count, session count) for which data is to be collected is specified. It should be noted that the same traffic monitoring and setting screen can be used to set not only the management category but also a subscriber name, subscriber information and a managed device for which correspondence has been established with a subscriber name.

FIG. 34 is a management category designating table indicating which category of traffic data is saved for a particular managed object. The circle marks in the table signify the saving of management categories that have been designated. Management categories of items not having circle marks are discarded. Accordingly, with regard to managed object A, only cell count is saved.

Figure 35:
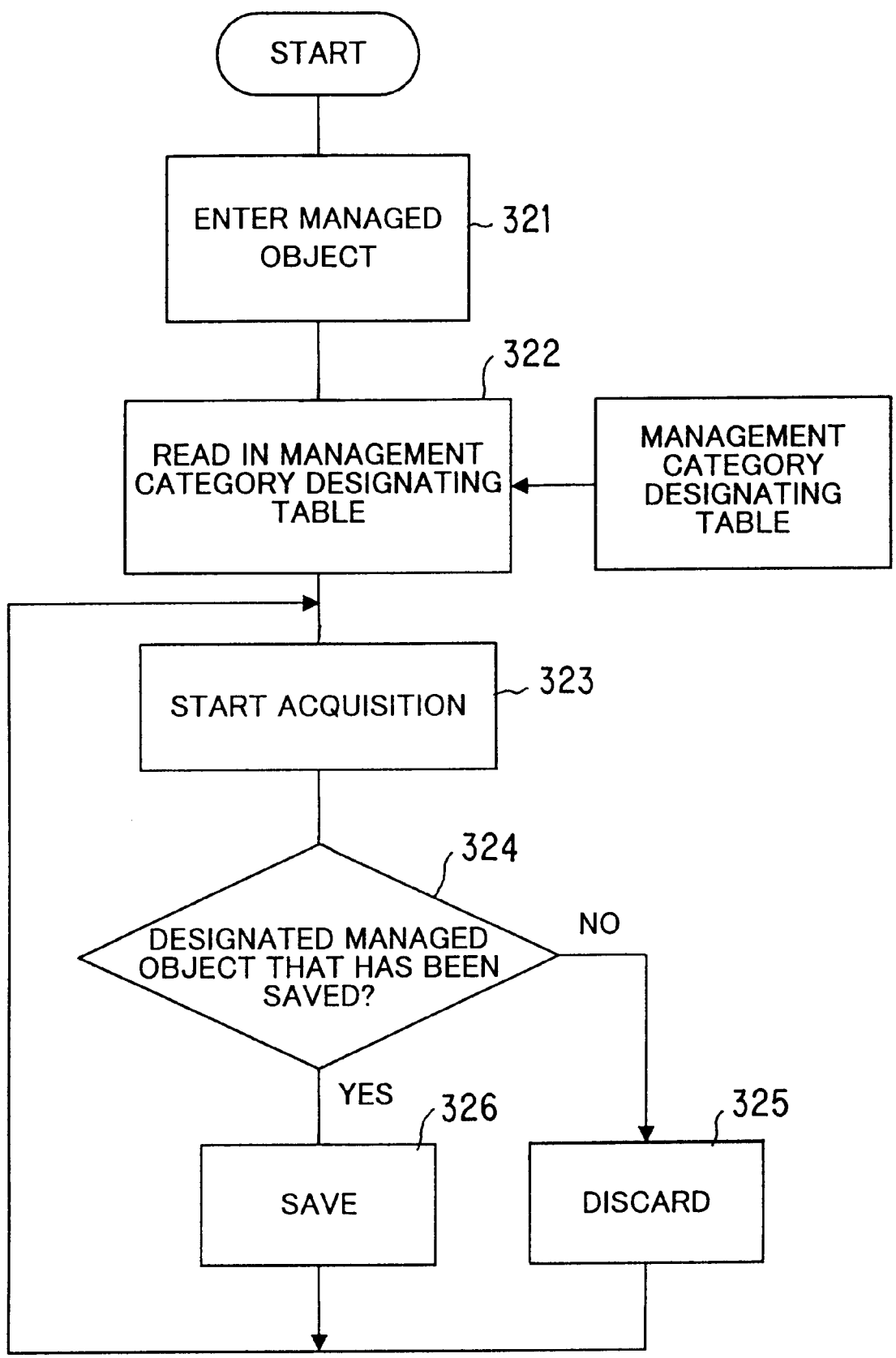
FIG. 35 is a flowchart of processing for saving the traffic data of a designated management category.

FIG. 35 is a flowchart of processing for saving the traffic data of a designated management category. First, the managed object for which traffic data is to be collected is entered (step 321). Next, reference is had to the management category designating table (FIG. 34) to recognize (step 322) the management category for which acquisition is to be performed with regard to the managed object designated at step S321. Acquisition of traffic data is started (step 323) for the managed object designated and it is determined (step 324) whether the category of the acquired data agrees with the management category that has been designated. If the two do not agree, then the traffic data is discarded (step 325). If the two do agree, then the traffic data is accepted and stored in the storage unit 52 in the form of the three-dimensional matrix structure (step 326).

With regard to a managed object designated by executing the processing from step 324 onward whenever traffic data is collected, the traffic data of the designated management category is collected over a designated period of time and saved in the storage unit.

Figure 36:
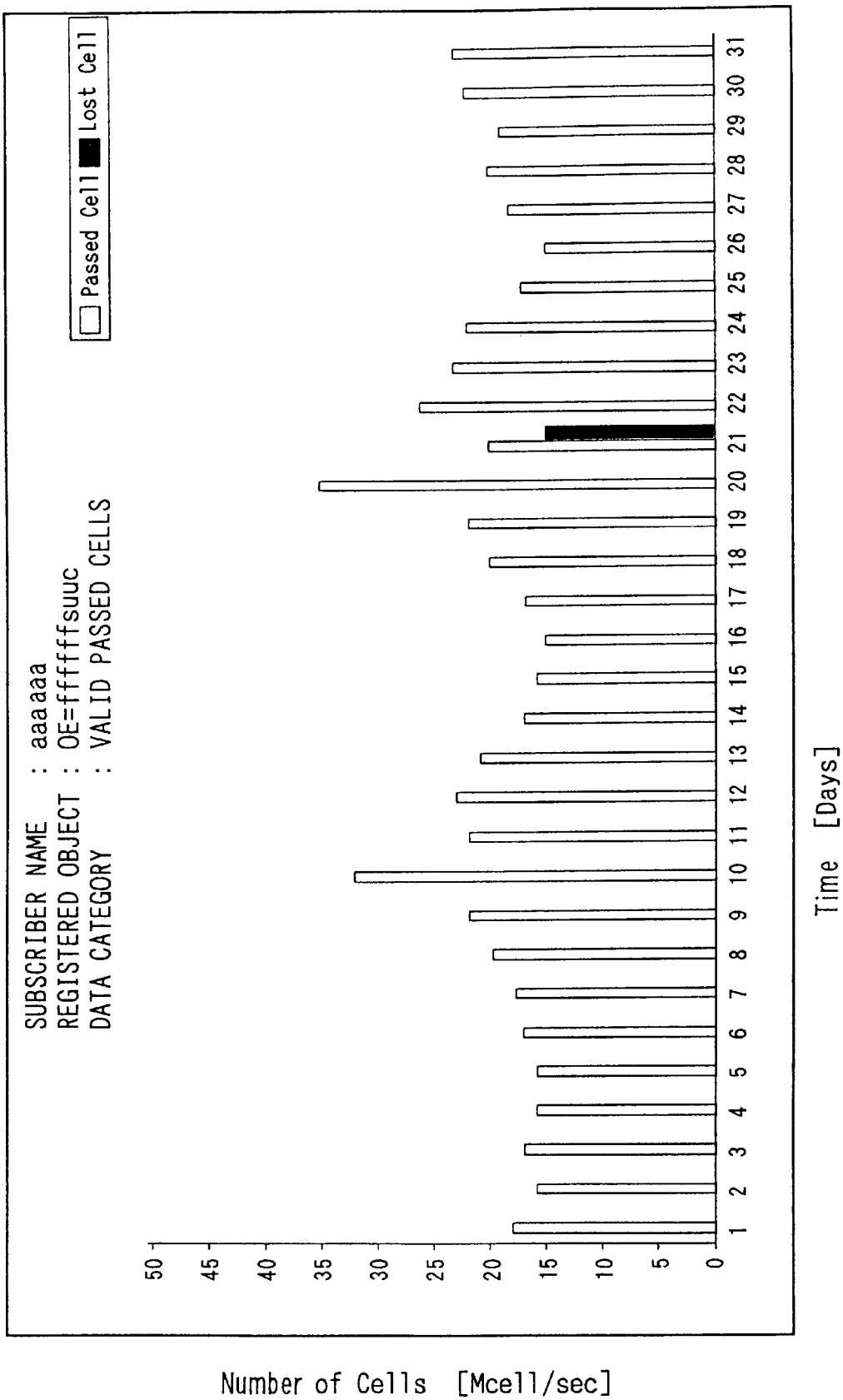
FIG. 36 is a characteristic graph of passed cells vs. days of the month.

By thus designating the management category and collecting traffic data, the daily count of passed cells of a prescribed subscriber can be acquired, a monthly characteristic graph can be created, as shown in FIG. 36, and the graph can be output.

(f) Designation of Acquisition Time Period and Data Acquisition within Acquisition Time Period By designating the time period over which traffic data is collected, it is unnecessary to acquire traffic data constantly and it suffices to acquire and store traffic data solely with regard to a time period over which traffic management is to actually be performed. This makes it possible to reduce the necessary storage capacity of the storage unit and to shorten the time needed for acquisition of the traffic data. The acquisition time period designating unit 56d (FIG. 17) sets a time period T1 designated by the operator, and the traffic data acquisition unit 51c performs control to acquire traffic data in the designated period T1.

Figure 37:
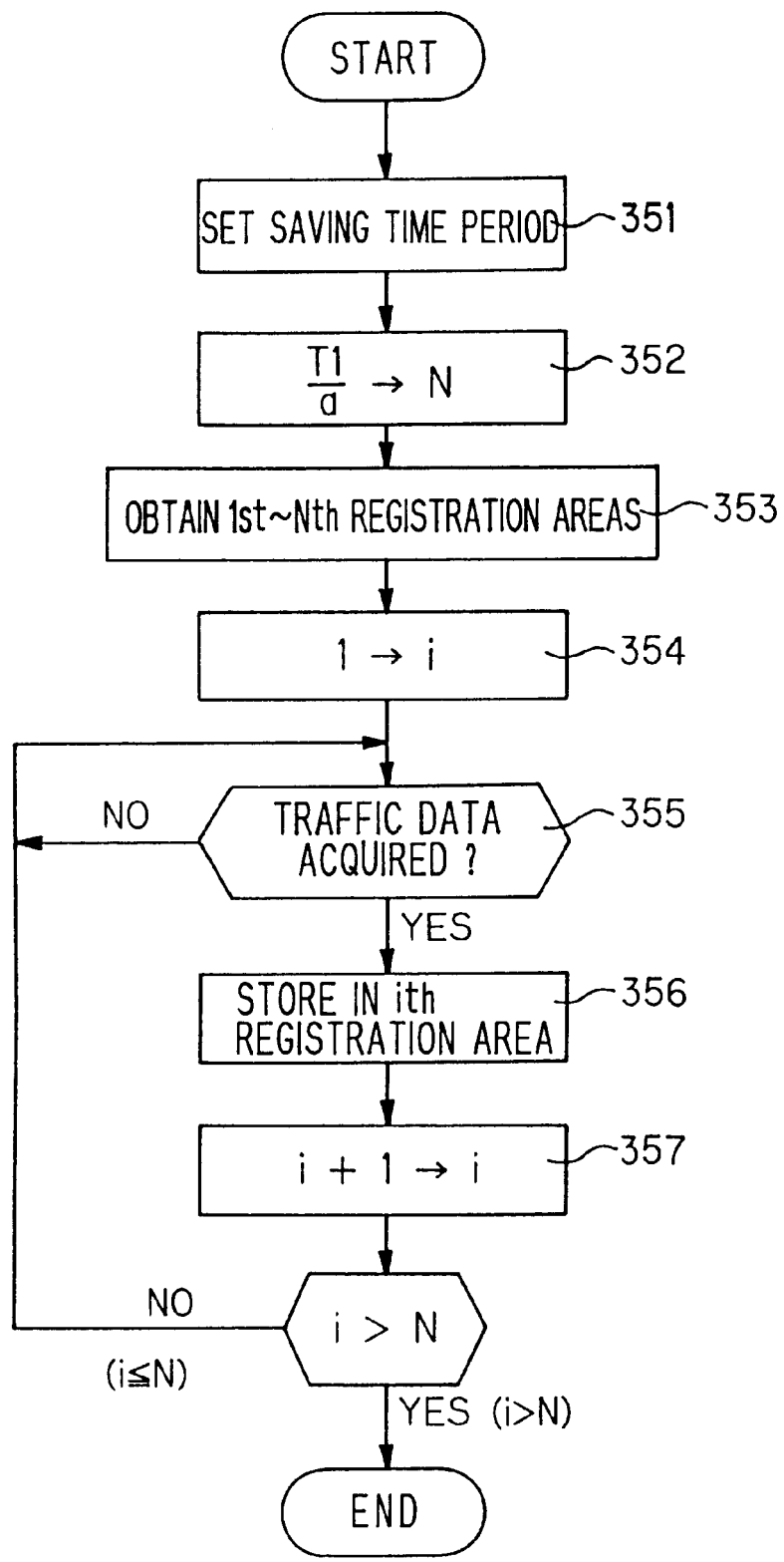
FIG. 37 is a flowchart of processing for acquiring traffic management data over a designated period of time.

FIG. 37 is a flowchart of processing for acquiring traffic management data over a designated period of time.

Figure 38:
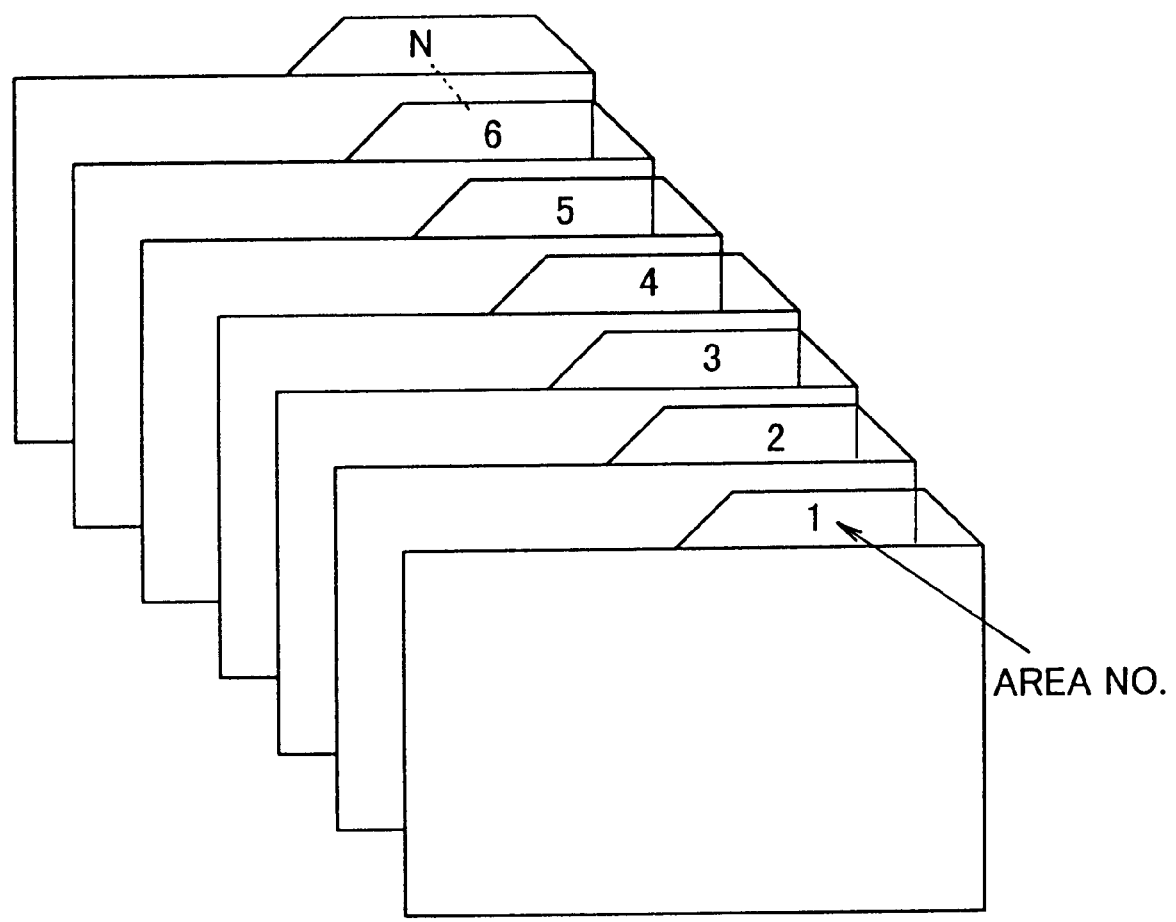
FIG. 38 is a diagram for describing traffic data registration areas.

When the data saving period T1 is designated with regard to a prescribed managed object and management category under the control of the acquisition time period designating unit 56d (step 351), the traffic data acquisition unit 51c divides the saving period T1 by a traffic acquisition interval a and obtains the number N of items of data obtained in the saving period (step 352). Next, as shown in FIG. 38, N-number of traffic data registration areas are prepared and it is so arranged that the traffic data obtained is placed in the first through Nth registration folders in regular order (step 353).

Thereafter, i is initialized to 1 (step 354) and it is determined whether traffic data has been collected (step 355). If traffic data has been collected, then the data is stored in an ith folder (step 356) and i is incremented (step 357). Next, N and i are compared in size (step 358). If $N \geq i$ is found to hold, the program returns to step 355 and processing from is repeated from this step onward. If N<i is found to hold, then the acquisition of traffic data in the designated acquisition time period is ended.

(g) Manipulation of Acquired Traffic Data

The acquired traffic data (cell count, call count, session count) of a first time period unit is shaped to traffic data, such as average value, peak value and total amount, of a second time period unit longer than the first time period unit, then traffic data of shorter time periods is successively shaped to traffic data, such as average value, peak value and total amount, of longer time periods as necessary. As a result, the amount of memory used in the storage means can be reduced and a traffic characteristic of each time period can be generated using the shaped data.

Accordingly, a rounding unit 55a (FIG. 17) shapes and compresses the data successively to an average value, peak value and total amount of a higher ranking period of time in such a manner that traffic data that has been acquired at intervals of 15 minutes is shaped from minute units to hour units, from hour units to day units, from day units to week or month units and from month units to year units, stores the shaped and compressed data in the storage unit 52 and discards the data of lower order time periods as appropriate. As a result, traffic data can be saved efficiently, even when long-term preservation of data has been designated, while memory is conserved.

Figure 39:
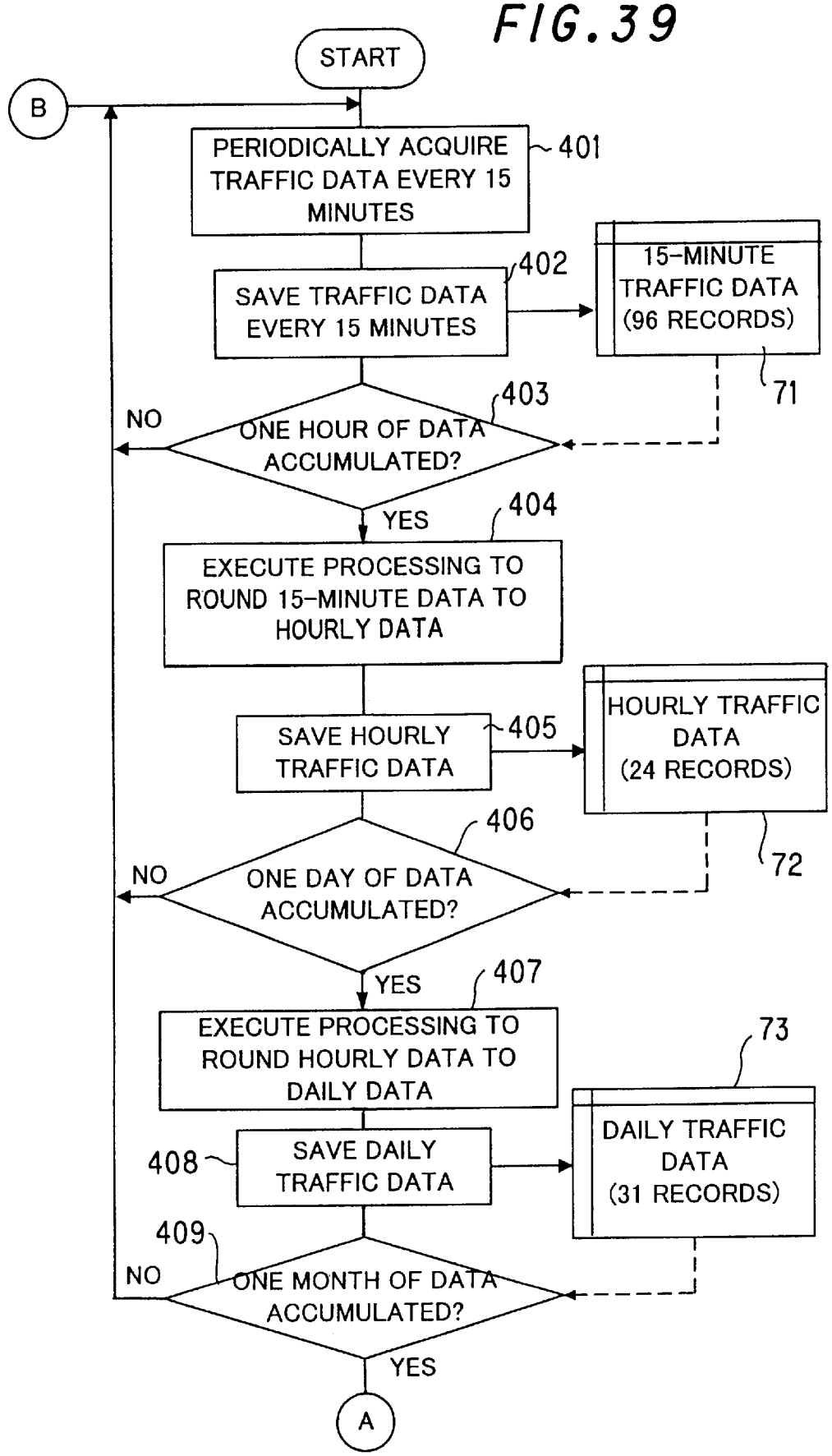
FIG. 39 is a flowchart of first rounding processing.
Figure 40:
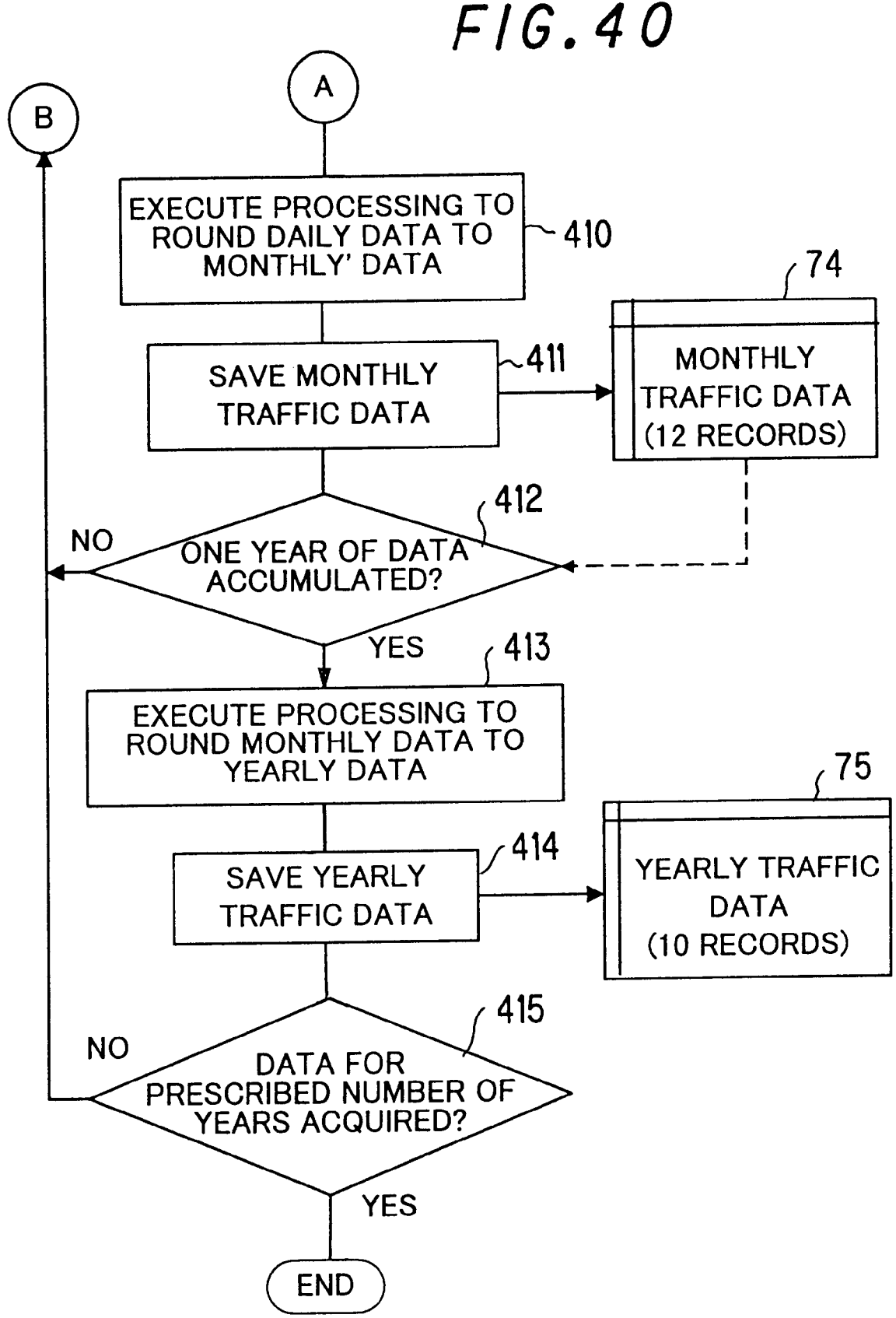
FIG. 40 is a flowchart of second rounding processing.
Figure 41:
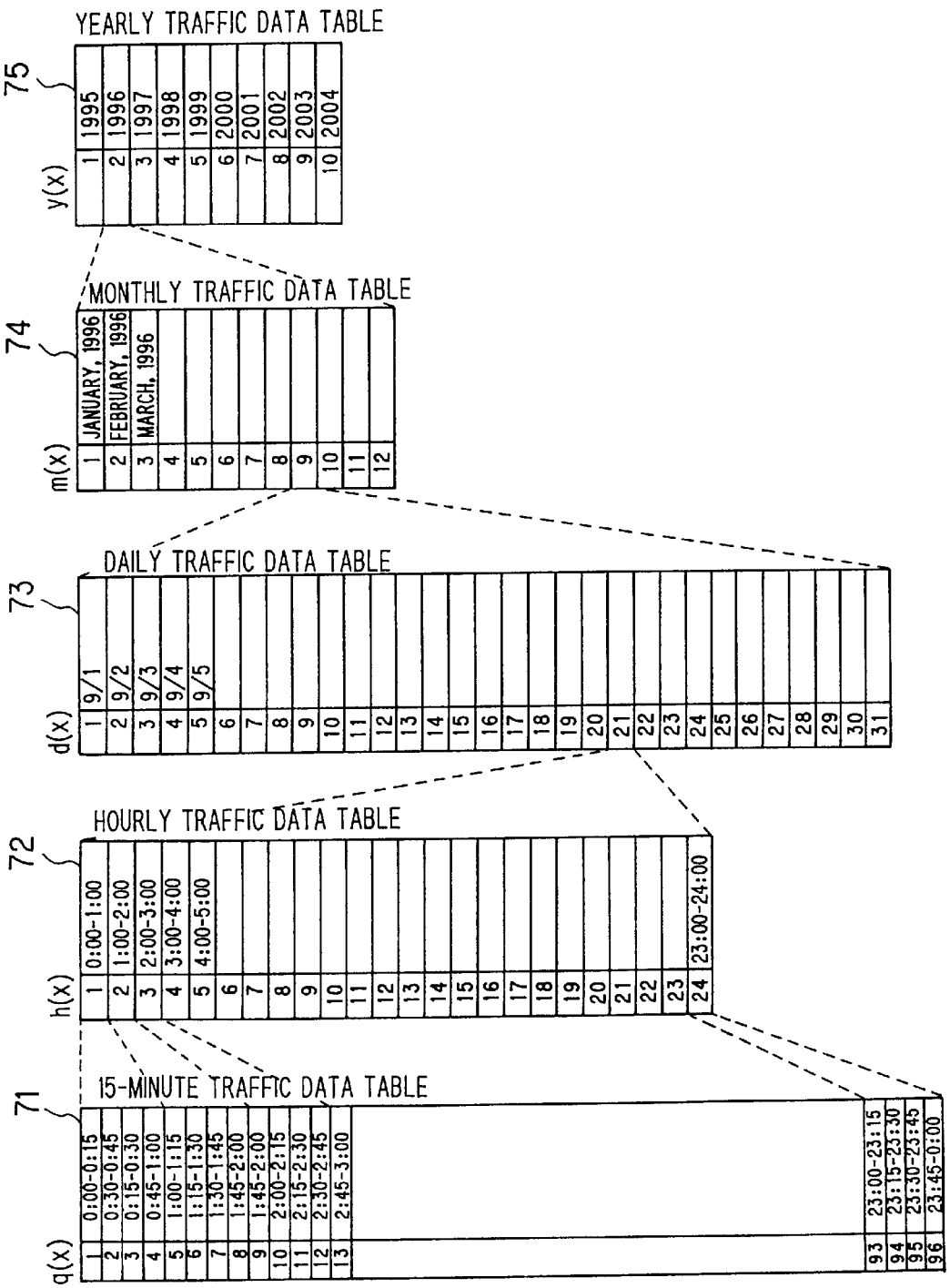
FIG. 41 is a diagram for describing various traffic data tables.

FIGS. 39 and 40 are rounding flowcharts, and FIG. 41 is a diagram for describing various traffic data tables provided in the storage unit 52.

The traffic data acquisition unit 51c successively stores traffic data q(x) (x=1~96), which has been acquired every 15 minutes, in corresponding acquisition time locations of a 15-minute traffic table 71 (see FIG. 41) holding 96 records that correspond to one day (steps 401, 402) of data.

The rounding unit 55a determines whether one hour of traffic data has been acquired (step 403). If one hour of traffic data has not been acquired, the program returns to step 401, whence the above-mentioned processing is repeated. If one hour of traffic data has been acquired, then the rounding unit 55a executes rounding processing every four records, which correspond to one hour of data, obtains the average value, peak value and total amount per hour (step 404) and stores the results of rounding processing in a corresponding acquisition time location in an hourly traffic data table 72 (FIG. 41) holding 24 records that correspond to one day of data (step 405).

Equations of rounding processing for rounding 15-minute traffic data q(x) to hourly traffic data h(x) are as follows:

(1) In case of the total number:

$$h(y) = \sum_{x=1}^{4} q\{4(y-1)+x\} \quad (y=1\sim 24) \quad (5)$$

(2) In case of the average value:

$$h(y) = \text{Ave}\left[\sum_{x=1}^{4} q\{4(y-1)+x\}\right] \quad (y=1\sim 24) \quad (6)$$

(3) In case of the peak value:

$$h(y)=Max[q\{4(y-1)+1\}\sim q\{4(y-1)+4\}]$$

$$(y=1\sim 24) \quad (7)$$

Next, the rounding unit 55a determines whether one day of traffic data has been acquired (step 406). If one day of traffic data has not been acquired, the program returns to step 401, whence the above-mentioned processing is repeated. If one day of traffic data has been acquired, then the rounding unit 55a executes rounding processing every 24 records, which correspond to one day of data, obtains the average value, peak value and total amount for that day (step 407) and stores the results of rounding processing in a corresponding acquisition time location in a daily traffic data table 73 (FIG. 41) holding 31 records that correspond to one month of data (step 408).

Equations of rounding processing for rounding hourly traffic data h(x) to daily traffic data d(x) are as follows:

(1) In case of the total number:

$$d(y) = \sum_{x=1}^{24} h(x) \quad (y=1\sim 31) \quad (8)$$

(2) In case of the average value:

$$d(y)\text{Ave}\left[\sum_{x=1}^{24} h(x)\right] \quad (y=1\sim 31) \quad (9)$$

(3) In case of the peak value:

$$d(y)=Max[h(1)\sim h(24)](y=1\sim 31) \quad (10)$$

Next, the rounding unit 55a determines whether one month of traffic data has been acquired (step 409). If one month of traffic data has not been acquired, the program returns to step 401, whence the above-mentioned processing is repeated. If one month of traffic data has been acquired, then the rounding unit 55a executes rounding processing every 31 records, which correspond to one month of data, obtains the average value, peak value and total amount for that month (step 410) and stores the results of rounding processing in a corresponding acquisition time location in a monthly traffic data table 74 (FIG. 41) holding 12 records that correspond to one year of data (step 411).

(1) In case of the total number:

$$m(y) = \sum_{x=1}^{31} d(x) \quad (y=1\sim 12) \quad (11)$$

(2) In case of the average value:

$$m(y) = \text{Ave}\left[\sum_{z=1}^{31} d(x)\right] \quad (y=1\sim 12) \quad (12)$$

(3) In case of the peak value:

$$m(y)=Max[d(1)\sim d(31)](y=1\sim 12) \quad (13)$$

Next, the rounding unit 55a determines whether one year of traffic data has been acquired (step 412). If one year of traffic data has not been acquired, the program returns to step 401, whence the above-mentioned processing is repeated. If one year of traffic data has been acquired, then the rounding unit 55a executes rounding processing every 12 records, which correspond to one year of data, obtains the average value, peak value and total amount for that year (step 413) and stores the results of rounding processing in a corresponding acquisition time location in a yearly traffic data table 75 (FIG. 41) (step 414). Thereafter, the data rounding unit 55a determines whether traffic data for a prescribed number of years (ten years, for example) has been stored (step 415). If the answer is "NO" at step 415, the program returns to step 401 and processing from the step onward is repeated until the prescribed number of years of data has been stored.

Equations of rounding processing for rounding monthly traffic data m(x) to yearly traffic data y(x) are as follows:

(1) In case of the total number:

$$y(y) = \sum_{x=1}^{12} m(x) \quad (y \text{ is a natural number}) \quad (14)$$

(2) In case of the average value:

$$y(y) = \text{Ave}\left[\sum_{x=1}^{12} m(x)\right] \quad (y \text{ is a natural number}) \tag{15}$$

(3) In case of the peak value:

$$y(y) = Max[m(1) \sim m(12)](y \text{ is a natural number}) \tag{16}$$

FIG. 42 is a diagram for describing the content of the traffic data tables 71, 72 in a case where 15-minute intervals of traffic data (valid cell count) are rounded to traffic data (total number) in one-hour units. The valid cell count acquired every 15 minutes is stored successively at locations corresponding to the acquisition time in the 15-minute traffic data table 71 holding 96 records that correspond to one day of data. The stored cell count for the period of 15 minutes corresponds to one record. The rounding processing indicated by Equation (5) is executed every hour, the data thus obtained is adopted as one record every hour, and the data is stored at the location corresponding to the acquisition time in the hourly traffic data table 72 holding 24 records that correspond to one day of data.

FIG. 43 is a diagram for describing the content of the traffic data tables 72, 73 in a case where one-hour intervals of traffic data (valid cell count) are rounded to traffic data (total number) in one-day units. The traffic data of the valid cell count resulting from rounding processing executed every hour is subjected to rounding processing every day as one day of traffic data in accordance with Equation (8). The data thus obtained is adopted as one record every hour, and the data is stored at the location corresponding to the day of acquisition in the daily traffic data table 73 holding a maximum of 31 records that correspond to one month of data.

FIG. 44 is a diagram for describing the content of the traffic data tables 73, 74 in a case where one-day intervals of traffic data (valid cell count) are rounded to traffic data (total number) in one-month units. The traffic data of the valid cell count resulting from rounding processing executed every day is subjected to rounding processing every month as one month of traffic data in accordance with Equation (11). The data thus obtained is adopted as one record every month, and the data is stored at the location corresponding to the month of acquisition in the monthly traffic data table 74 holding a maximum 12 records that correspond to one year of data.

FIG. 45 is a diagram for describing the content of the traffic data tables 74, 75 in a case where one-month intervals of traffic data (valid cell count) are rounded to traffic data (total number) in one-year units. The traffic data of the valid cell count resulting from rounding processing executed every month is subjected to rounding processing every year as one year of traffic data in accordance with Equation (14). The data thus obtained is adopted as one record every year, and the data is stored at the location corresponding to the year of acquisition in the yearly traffic data table 75. A plurality of years of traffic data are stored in the table 75.

Rounding processing by "total number", "average" and "peak value" can also be executed in similar fashion with regard to cell loss count, OAM cell count, etc., in addition to the valid cell count.

(h) Graphical Editing and Output of Traffic Data

Figure 46A:
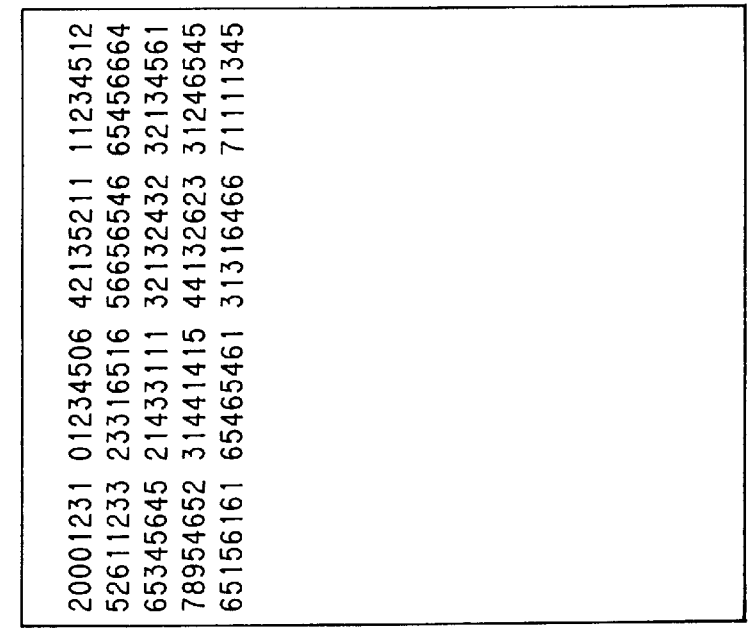
FIGS. 46A and 46B are diagrams for describing graphical editing.
Figure 46B:
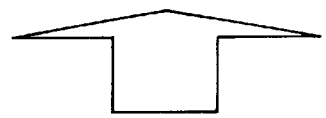
Figure 47:
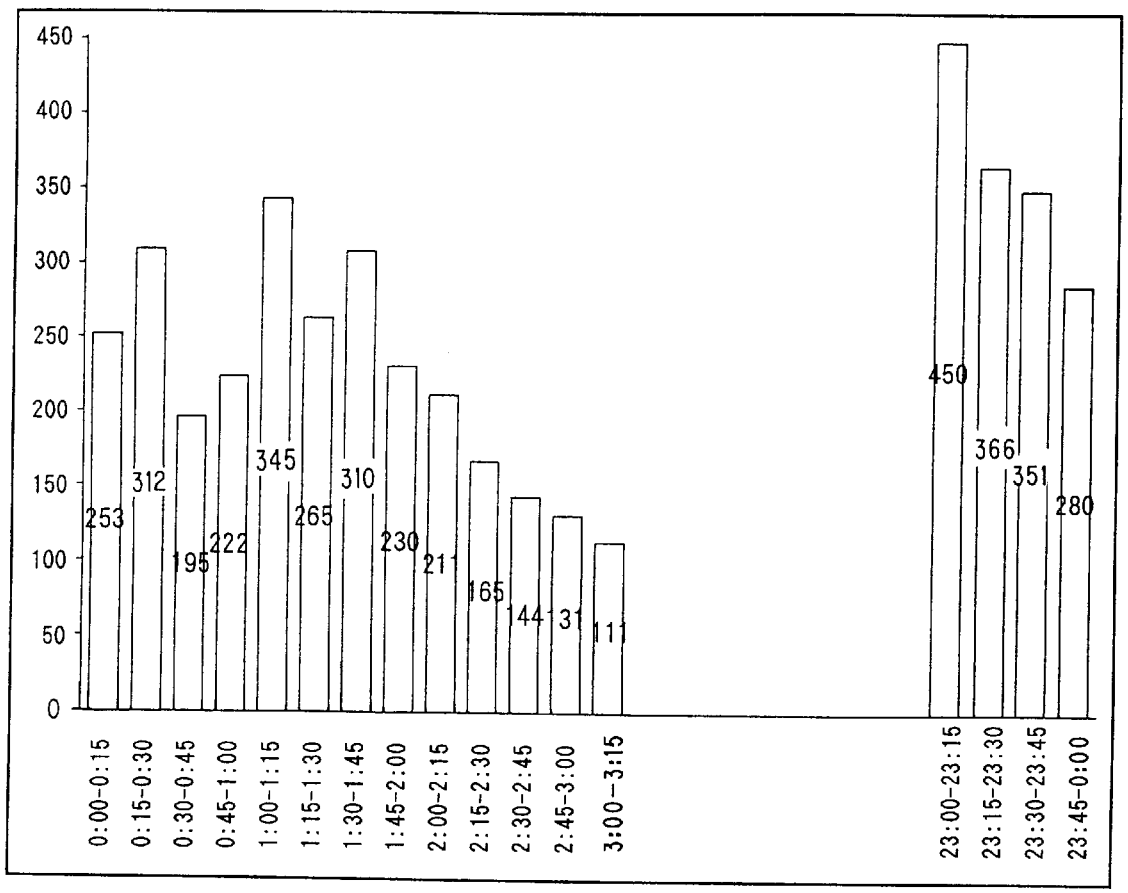
FIG. 47 is a diagram for describing graphing output.

Traffic data that has been acquired by the traffic data acquisition unit 51c is an array of numerals. Accordingly, the graphical editing/output unit 55b (FIG. 17) converts this traffic data to data that is easy to graph. More specifically, the graphical editing/output unit 55b converts traffic data information, which is an array of numerals of the kind shown in FIG. 46A, to data obtained by establishing correspondence between acquisition times and valid cell counts at these times, as shown in FIG. 46B. As a result of this conversion, it is possible to display a graph in which acquisition time is plotted along the horizontal axis and valid cell count along the vertical axis, as depicted in FIG. 47.

Figure 48:
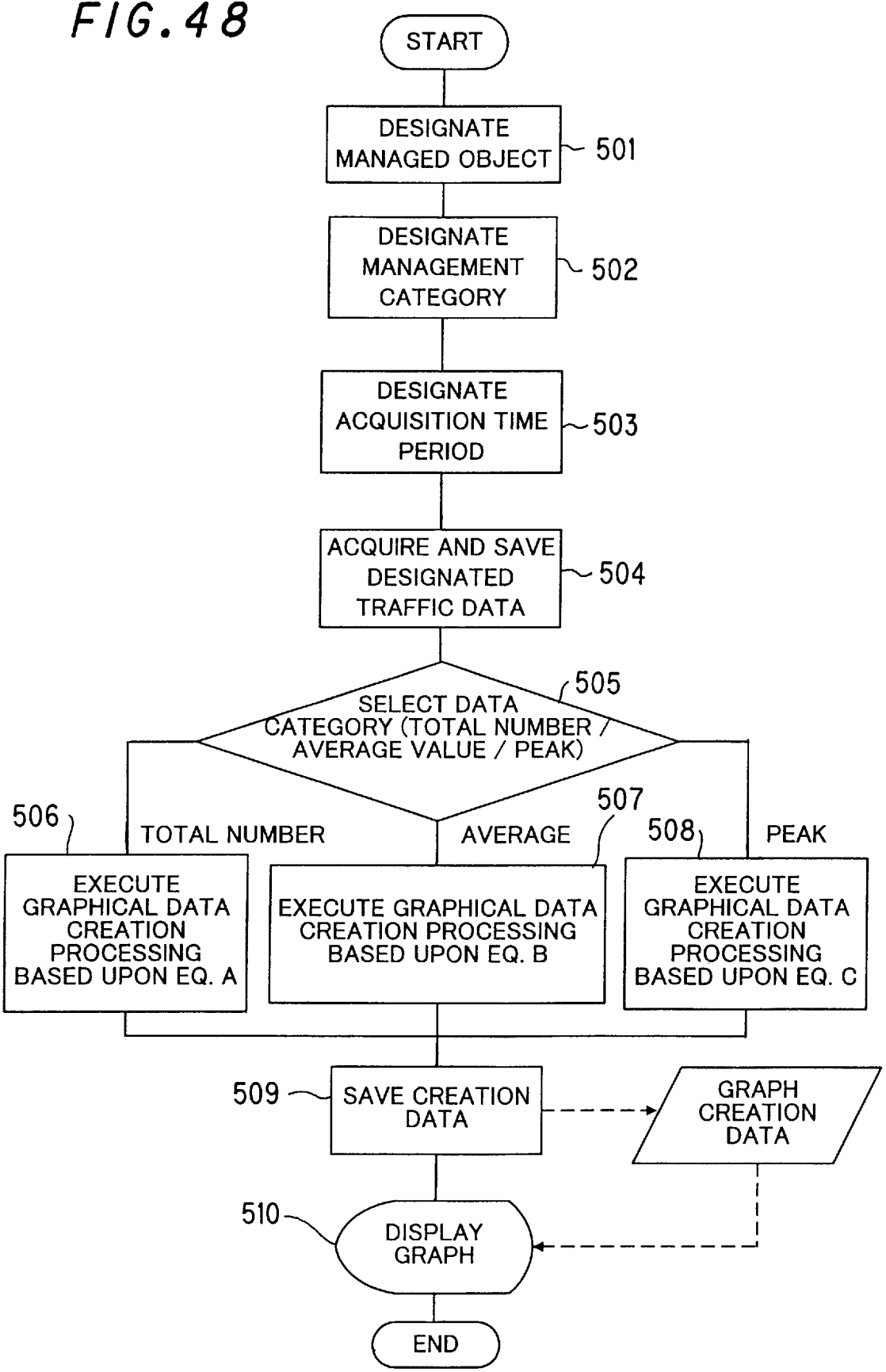
FIG. 48 is a flowchart of processing for graphical editing and output processing.

FIG. 48 is a flowchart of processing for graphical editing and output processing. In order to acquire traffic data that is desired to be graphed, the managed object, management category and acquisition time period are designated (steps 501~503), raw traffic data is acquired from the managed object and the data is saved in continuous fashion (step 504). Processing for creating graphical data is executed for every data category (total number, average, peak) using the raw data that has been acquired (steps 505~508). For example, to display a graph using the total number of passed cells per unit time, Equation (A) below is executed. To display a graph using the average number of passed cells per unit time, Equation (B) below is executed. To display a graph using the peak number of passed cells per unit time, Equation (C) below is executed.

$$\Sigma L(x)(x=1\sim a) \qquad [\text{Equation A}]$$

$$\text{Ave}\Sigma L(x)(x=1\sim s) \qquad [\text{Equation B}]$$

$$max\{L(1)\sim L(a)\} \qquad [\text{Equation C}]$$

where L(x) represents the raw data and a is the number of items of data decided by the acquisition time period.

Next, the data that has been obtained is saved (step 509). The graph is read out and displayed (step 510) on the display screen when appropriate.

(i) Editing/Graphical Output of Various Traffic Characteristic Data

By superposing one-dimensional traffic data tables to obtain data in two directions and executing characteristic processing, it is possible to grasp a traffic characteristic that could not be recognized merely by graphically displaying one-dimensional traffic data as is. As a result, traffic characteristics in terms of hourly, daily, monthly and yearly acquisition time periods can be ascertained and traffic characteristics based upon day of the week can be grasped with ease. If this principle is used, moreover, it can be utilized in ascertaining characteristics classified by subscriber, customer, district, business, etc. To this end, the traffic characteristic creating/output unit 55c (FIG. 17) uses the acquired traffic data to generate various traffic characteristics and output graphs.

Figure 49:
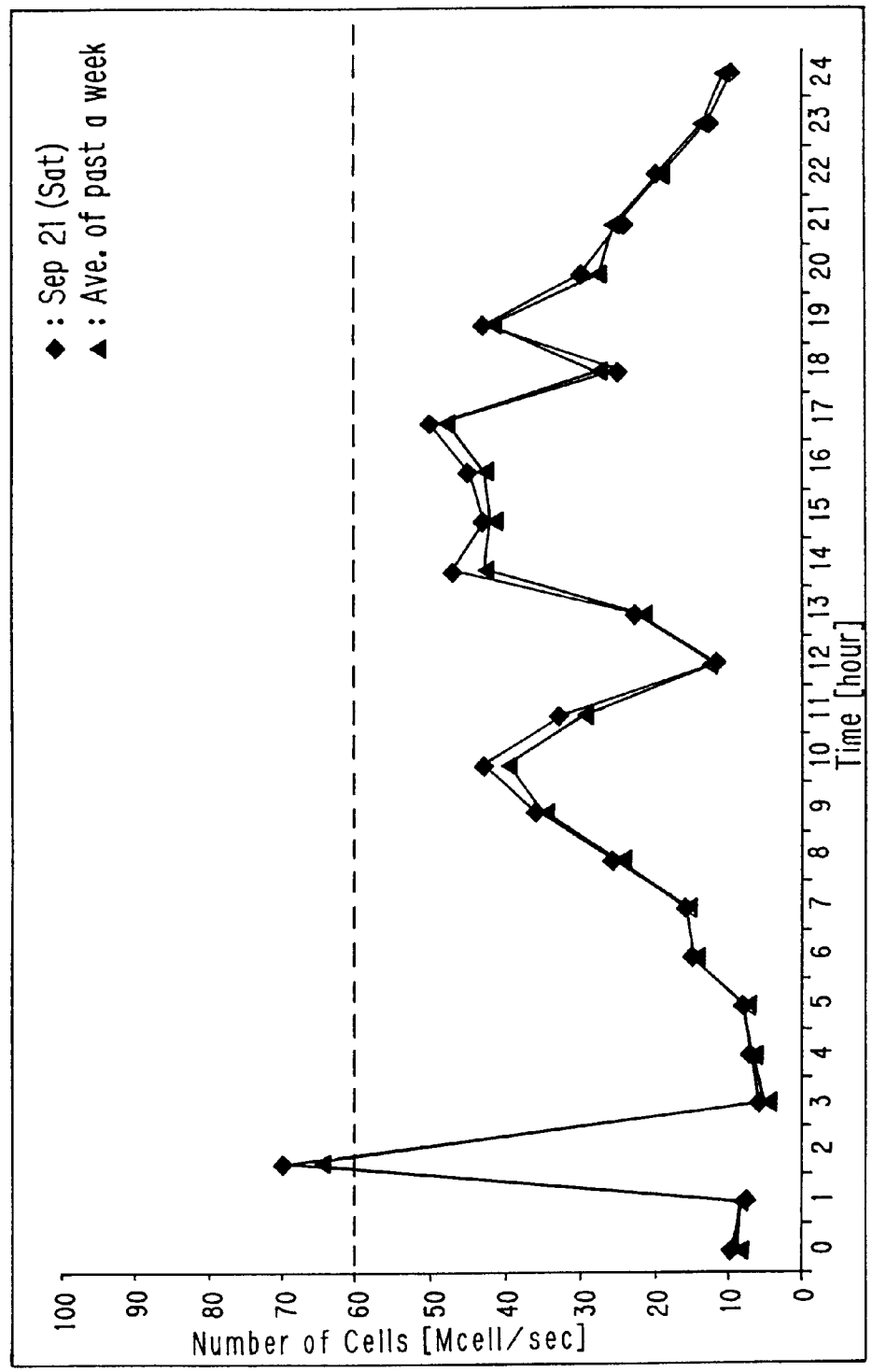
FIG. 49 illustrates an example of a graphical output obtained by superimposing average traffic data from the past week and hourly traffic data prevailing on a particular day.
Figure 50:
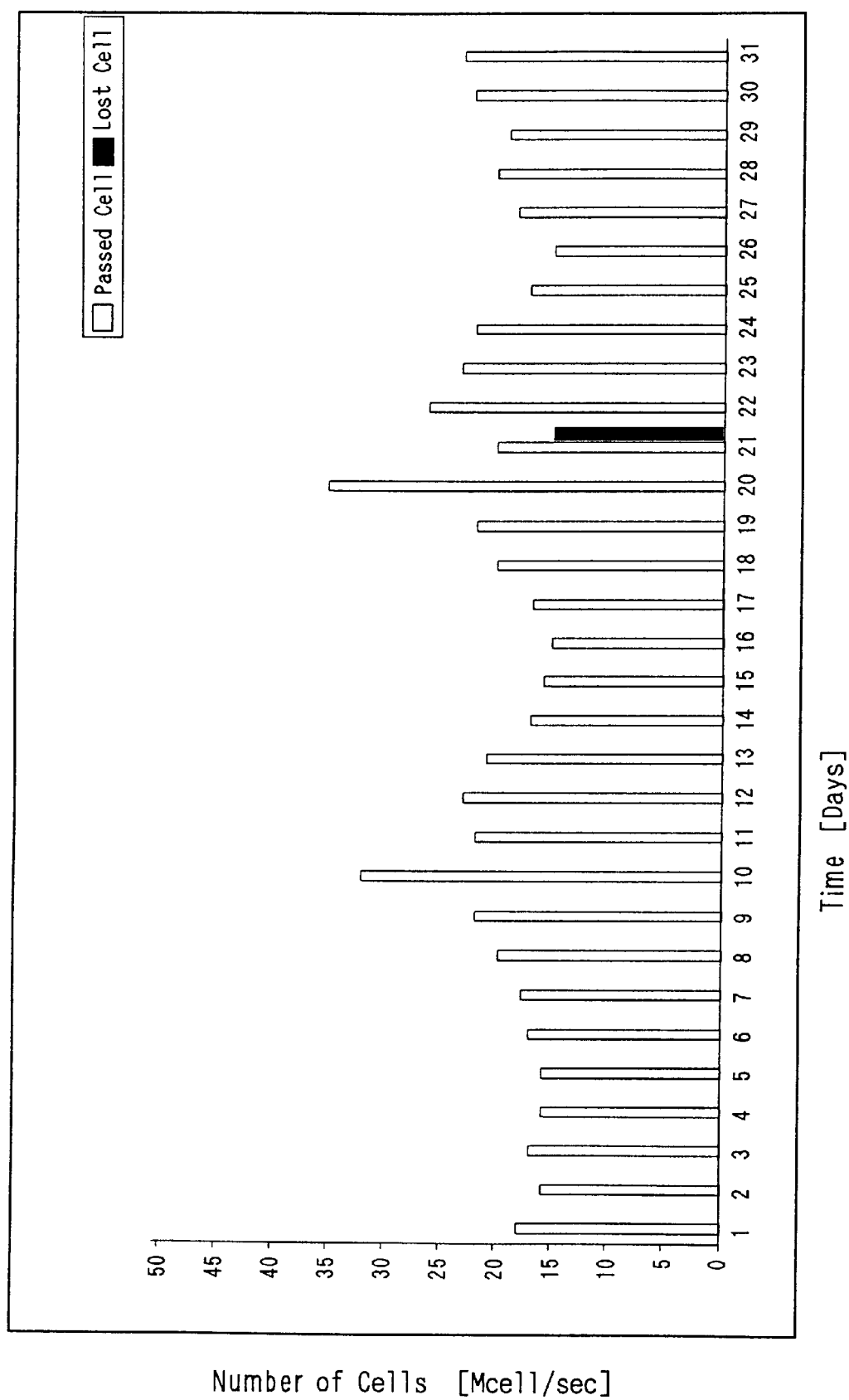
FIG. 50 illustrates an example of a graphical output in which valid cell count and invalid cell count are displayed in superposed form.
Figure 51:
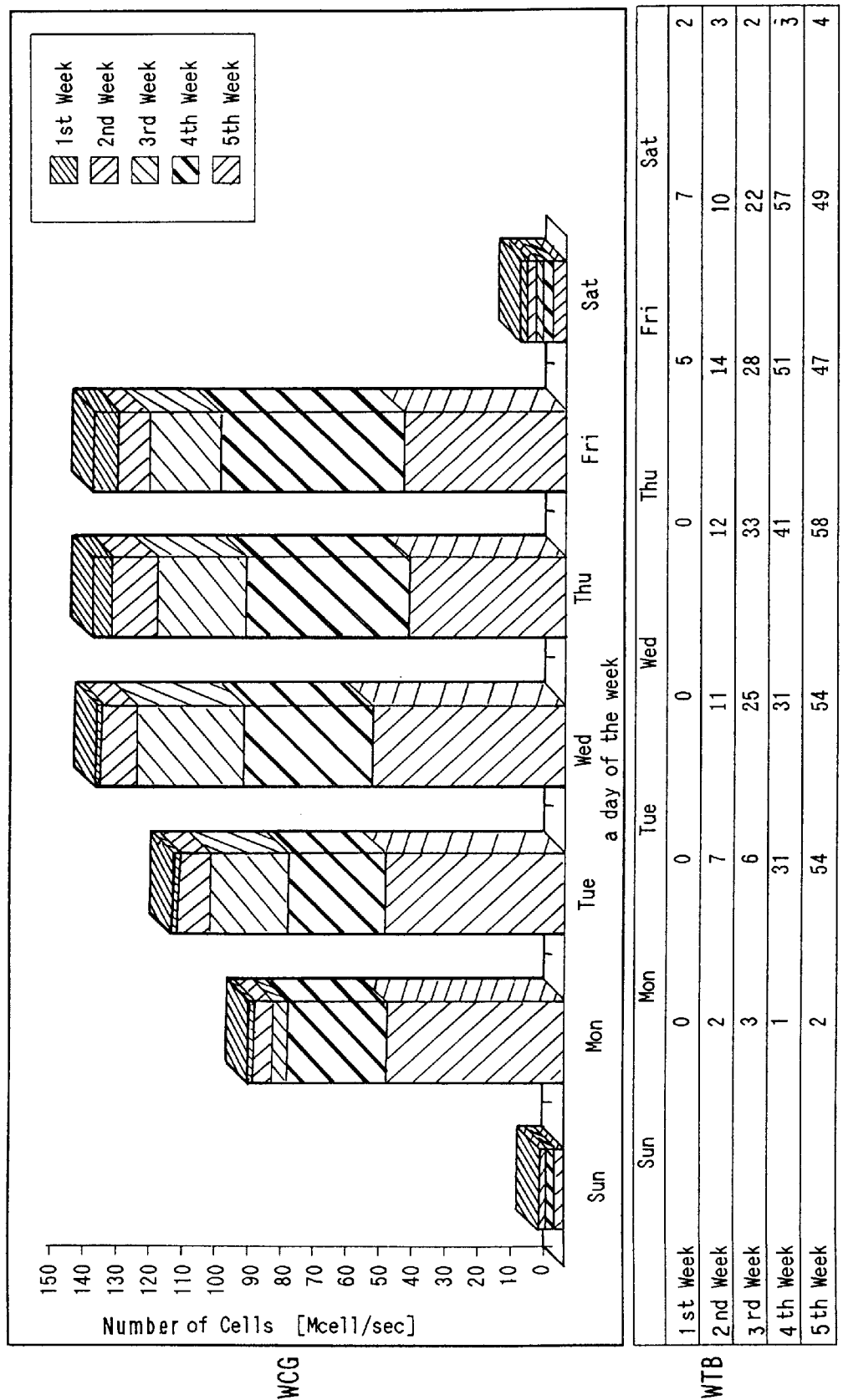
FIG. 51 illustrates an example of a day-of-the-week characteristic graph.

FIGS. 49, 50 and 51 are examples of graphical outputs according to the present invention. FIG. 49 illustrates a graphical display obtained by superimposing average traffic values obtained from the past week and hourly traffic data prevailing on the particular day. The traffic data is taken from the hourly traffic data table. In a case where the transition of the volume of traffic is viewed by partitioning one day into hourly units, this graph makes it possible to readily ascertain time periods during which the volume of traffic is especially high, namely the characteristic of singular time periods.

FIG. 50 illustrates a graphical display obtained by superposing "valid cell count" and "invalid cell count" obtained from the daily traffic data table. By ascertaining the month and day on which invalid cells occurred, it is possible to easily specify singular days on which the most cell loss occurs and traffic is most affected.

FIG. 51 illustrates a day-of-the-week characteristic graph WCG. Specifically, a day-of-the-week data table WTB is created from the daily traffic data table, and the day-of-the-week characteristic graph WCG is obtained from the day-of-the-week data table WTB. By accumulating the traffic data every week in a form classified by day of the week every week and displaying the data in this form, it is possible to readily comprehend days of the week on which frequency of use is high and low, and it is possible to utilize this information in planning future investments in equipment, in grasping singular days of the week with regard to subscribers and customers and in ascertaining status of use classified by district and business.

Figure 52:
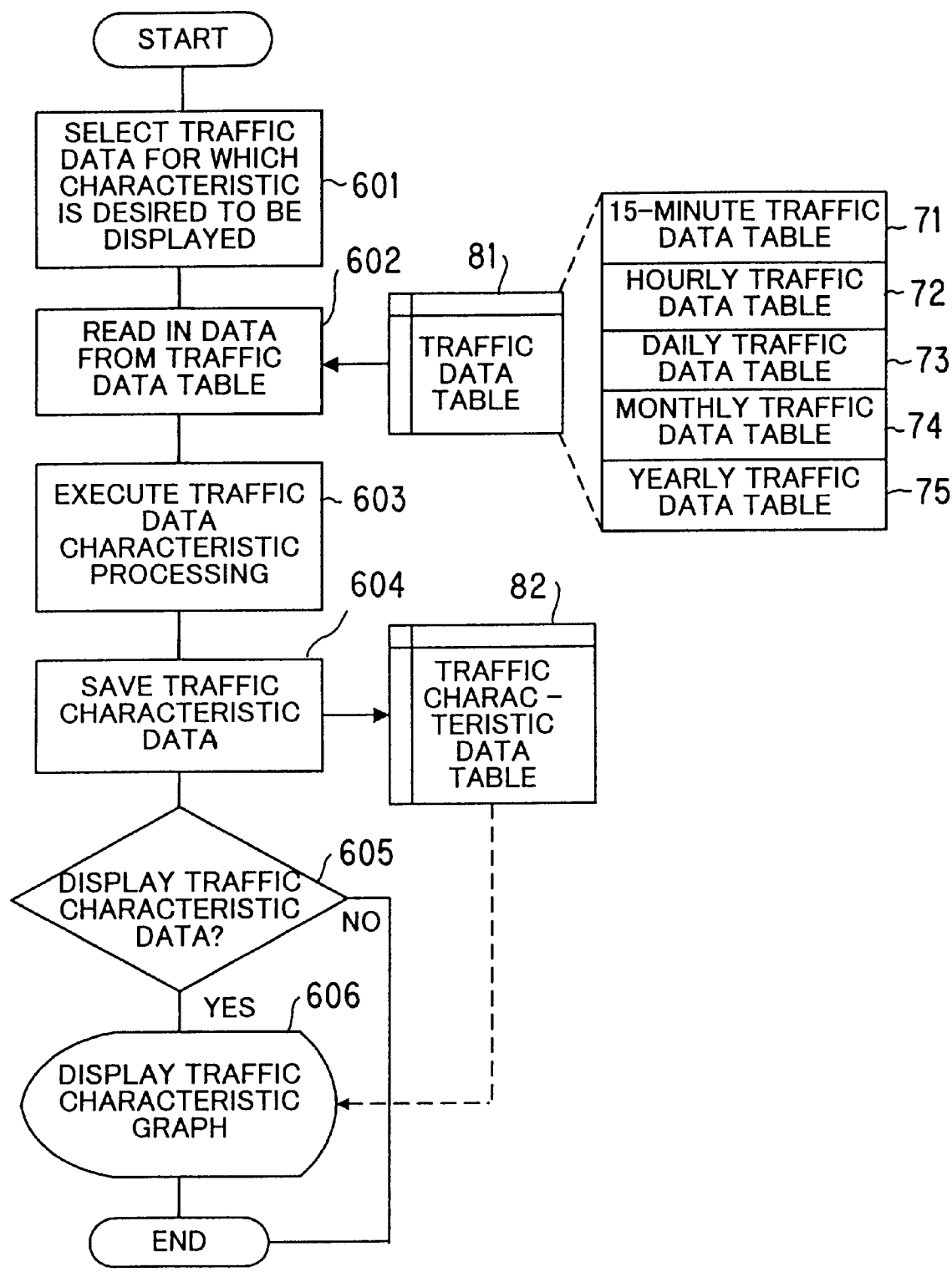
FIG. 52 is a flowchart of processing for creating traffic characteristic data.

FIG. 52 is a flowchart of processing for creating traffic characteristic data.

Traffic data for which a characteristic display is desired is selected from among the 15-minute traffic data table 71, hourly traffic data table 72, daily traffic data table 73, monthly traffic data table 74 and yearly traffic data table 75 shown in FIG. 41 (step 601), the pertinent traffic data is read in from a traffic data table 81 (step 602), prescribed traffic characteristic processing is executed (step 603) and the traffic characteristic data obtained is saved in a traffic characteristic data table 82 (step 604). As a result, it is possible to display a prescribed traffic characteristic graph. If display of traffic characteristic data is subsequently requested by an operation (step 605), this traffic characteristic graph is displayed on the display screen (step 606).

Figure 53:
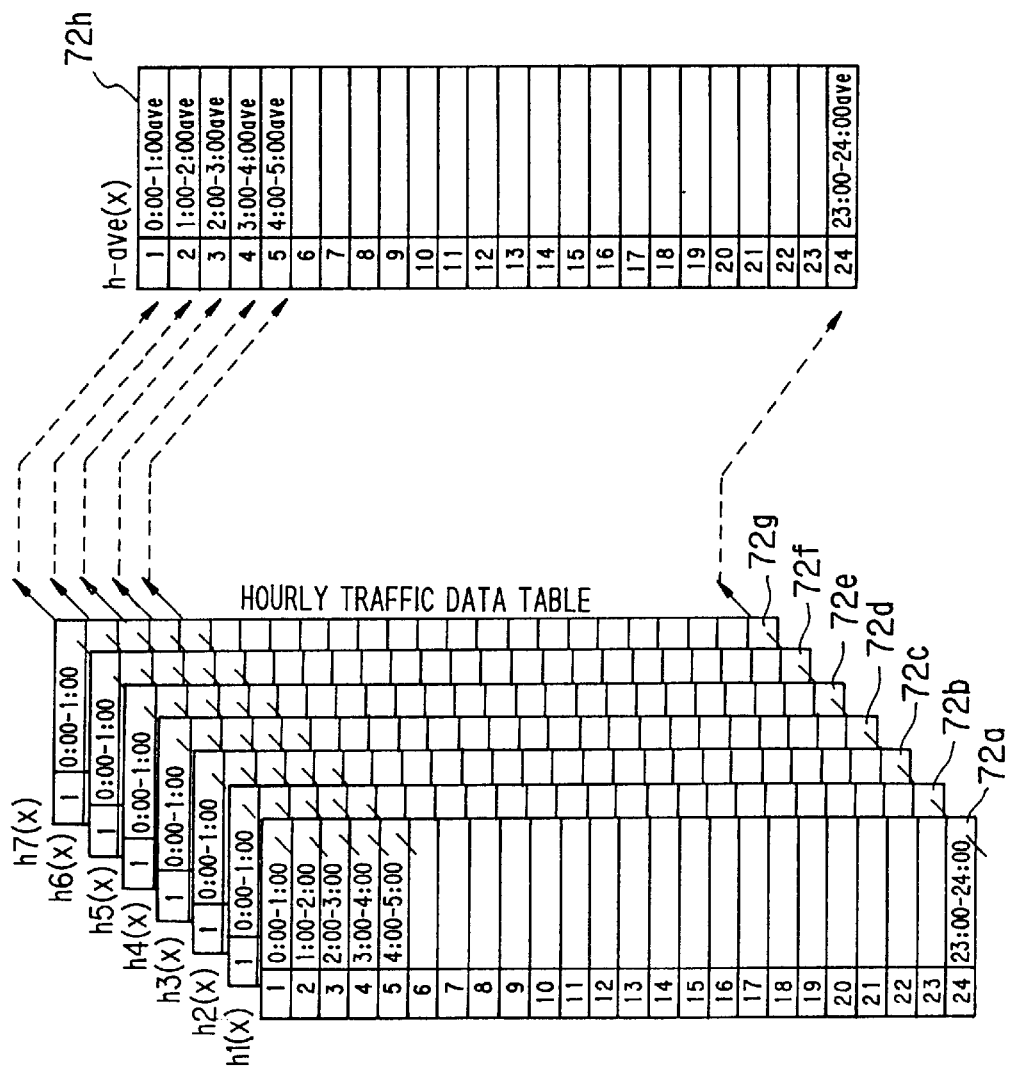
FIG. 53 is a diagram for describing traffic characteristic data.

FIG. 53 is a diagram for describing the traffic characteristic processing of step 603. This is for a case in which hourly traffic data tables 72a~72g making up one week of tables are used to create an hourly traffic data table 72h in which the hourly traffic data has been averaged over one week.

The hourly traffic data tables 72a~72g for one week are superposed, the average value of traffic data for the same time period is calculated in accordance with the equation $$h - ave = Ave\left[\sum_{i=1}^{7} hi(y)\right] \quad (y = 1\sim24) \tag{17}$$

and the values obtained are stored successively in the hourly traffic data table 72h which is the average over one week. Using the weekly average hourly traffic data table 72h makes it possible to ascertain the hour-by-hour traffic characteristic of the past week (see FIG. 49). Similarly, by superposing and averaging a plurality of tables of the daily traffic data characteristics, monthly traffic data characteristics and yearly traffic data characteristics, it is possible to ascertain the traffic characteristic over each period of time.

Figure 54:
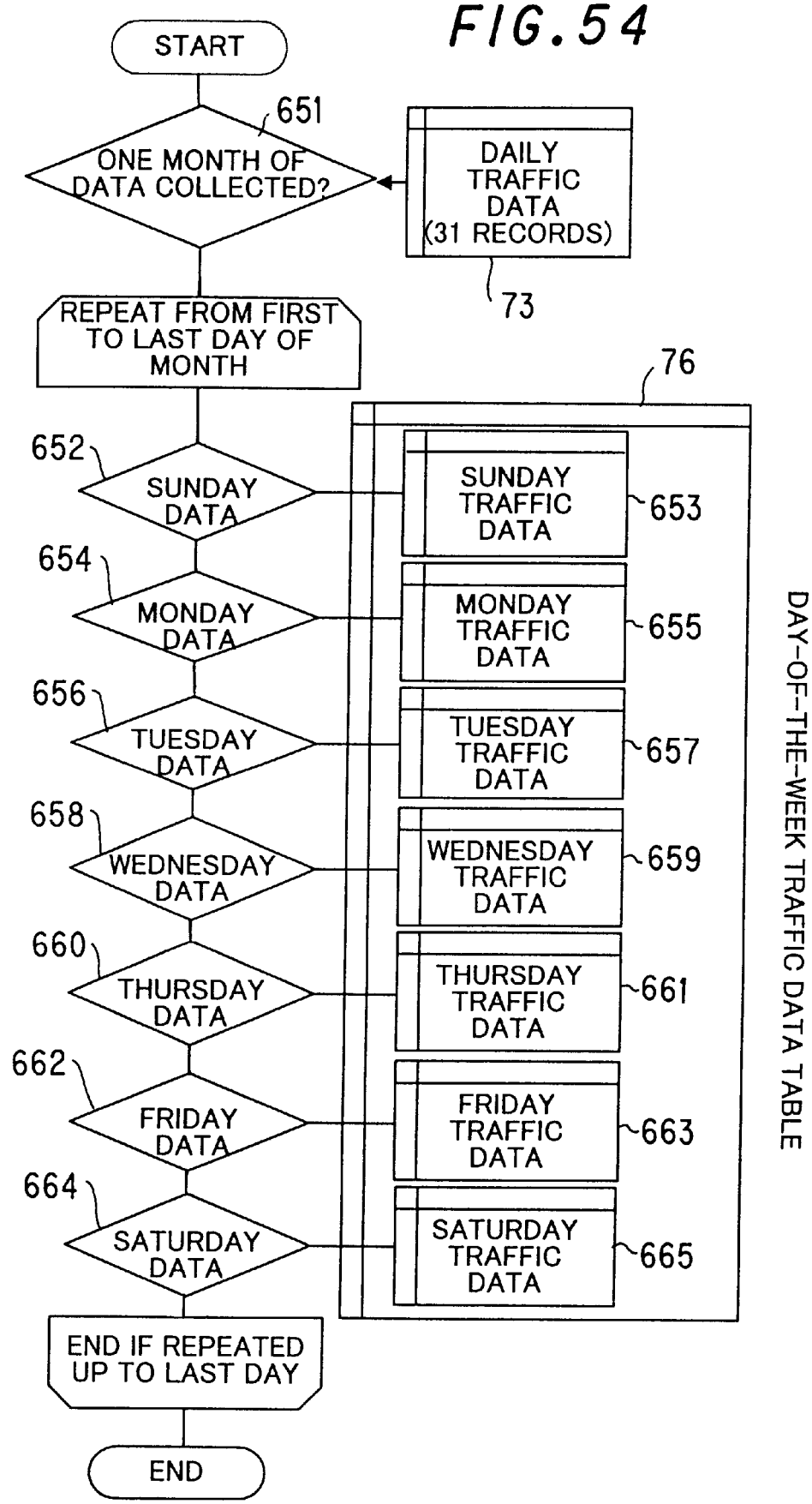
FIG. 54 is a flowchart of traffic characteristic processing for obtaining a day-of-the-week characteristic.

FIG. 54 is a flowchart of traffic characteristic processing for obtaining day-of-the-week characteristic data (see FIG. 56) from the daily traffic data table 73 (see FIG. 55).

It is determined whether daily traffic data has been read in and collected for one month (step 651). If such data has been collected, first Sunday data only is extracted (step 652) and is stored as Sunday traffic data in a Sunday column of the day-of-the-week traffic data table 76 (step 653). Similarly, data from Monday through Saturday is extracted successively from the daily traffic data table 73 and saved in the respective day-of-the-week columns of the day-of-the-week traffic data table 76 (steps 654~665). Thus partitioning the daily traffic data in weekly (seven-day) units is processing for correlating the data with the calendar of the particular month. Using this day-of-the-week traffic data table makes it possible to ascertain the traffic characteristics classified by day of the week (see FIG. 51).

(j) Sorting Processing and Output of Sorting Results

If the traffic data can be sorted by day, week, month or year time period in accordance with a predetermined reference and a plurality of the more higher ranking sorted results can be output according to subscriber, urban and rural prefecture, district and occupation, these results can be utilized in predicting future investments in equipment and in analyzing subscriber trends. Accordingly, the sorting processor 55d (FIG. 17) is adapted to (1) apply sorting processing, such as sorting in ascending or descending order or sorting by name, to the traffic data collected according to subscriber, urban and rural prefecture, district and occupation, etc., (2) to display the results of sorting and (3) to allow the operator to recognize, by this display, singular times, singular days, singular months and singular years, or singular subscribers, for which frequency of utilization is high or low per each subscriber, urban and rural prefecture, district and occupation.

FIG. 57A shows a characteristic of valid cell count versus time in hours. This characteristic is created by converting the numbers of valid cells acquired at 15-minute intervals to the number of valid cells every hour by rounding processing and using this effective cell count in one-hour units. FIG. 57B is a list obtained by sorting the hourly valid cell count in descending order and outputting the cell counts in this order matched with the times at which the valid cell counts were acquired. Referring to this list makes it possible to readily identify the time periods during which frequency of use is high.

Figures 58A, 58B:
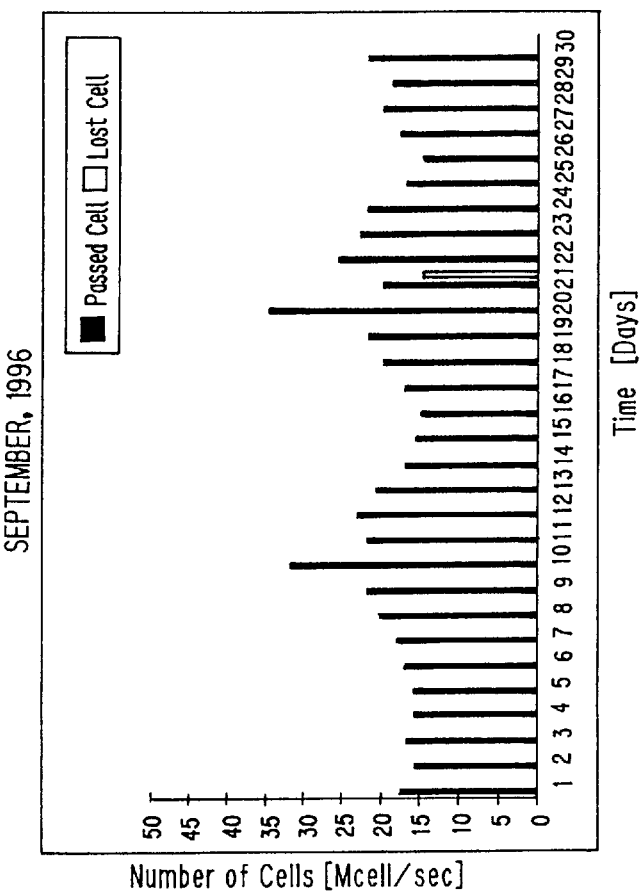
FIGS. 58A and 58B are diagrams for describing second sorting processing and sorted results.

FIG. 58A shows a characteristic of valid cell count versus time in days. This characteristic is created by obtaining the numbers of valid cells in one-day units by rounding processing and using this valid cell count. FIG. 58B is a list obtained by sorting the daily valid cell count in descending order and outputting the cell counts in this order matched with the days on which the valid cell counts were acquired. Referring to this list makes it possible to readily identify the days on which frequency of use is high.

Figure 59:
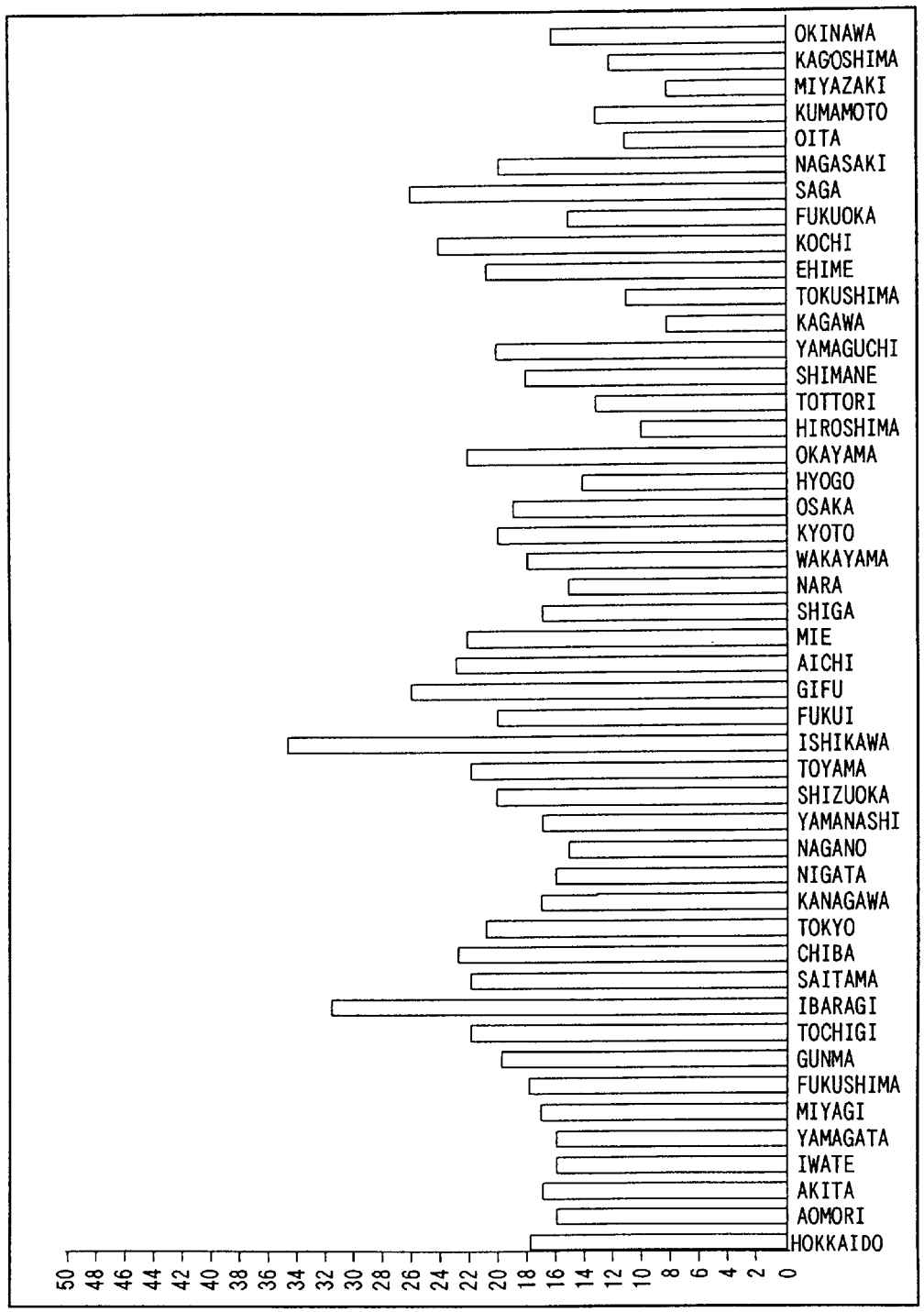
FIG. 59 is a graph indicating valid cell count classified by urban and rural prefectures.

FIG. 59 shows the display of a graph indicating valid cell count classified by urban and rural prefecture, and FIG. 60 is a list obtained by sorting the valid cell count in descending order classified by urban and rural prefecture and outputting the cell counts in this order matched with the urban and rural prefectures for which the valid cell counts were acquired. Referring to this list makes it possible to readily identify the urban and rural prefectures for which rate of utilization is high. This list can be applied according to type of business, district, etc.

Figure 61:
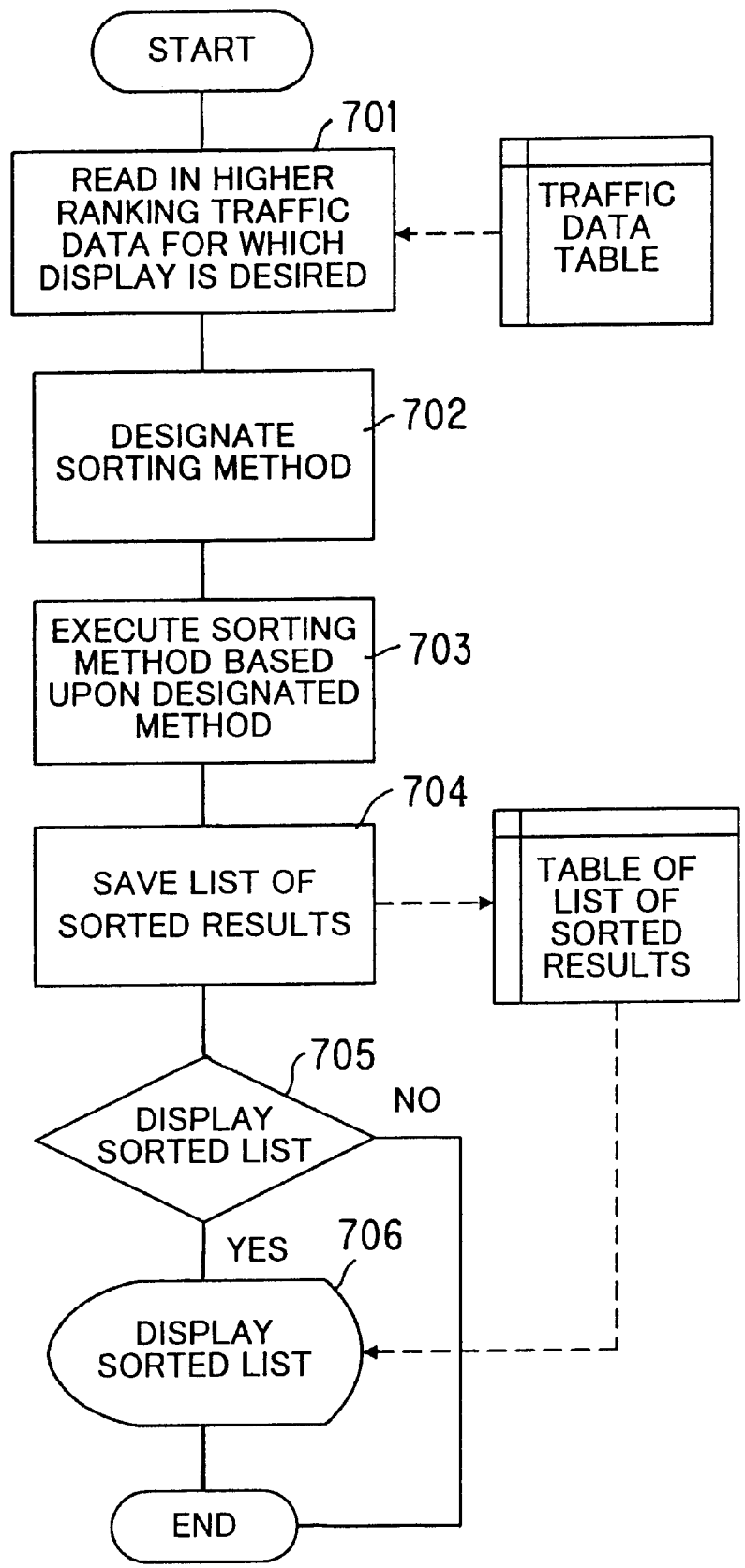
FIG. 61 is a flowchart of sorting processing.

FIG. 61 is a flowchart of sorting processing.

Higher ranking traffic data desired to be displayed is read in from the 15-minute traffic data table 71 (FIG. 41), hourly traffic data table 72, daily traffic data table 73, monthly traffic data table 74 and yearly traffic data table 75, which have been classified by subscriber, urban and rural prefecture, district and occupation, etc. (step 701). Next, a sorting method is specified so as to sort traffic data such as valid cell count or invalid cell count in ascending order, descending order or in order of name (step 702), sorting processing is executed (step 703) and a list of the sorted results is saved (step 704). Next, it is determined whether output of the sorted results is necessary (step 705). If display is necessary, the list of sorted results is displayed on the display screen (step 706).

FIG. 62 shows various lists obtained by sorting processing. A 15-minute traffic data table 91 has the 15-minute traffic data ranked in descending order. This table is obtained by sorting the 15-minute traffic data in descending order at step 702. An hourly traffic data table 92 has the hourly traffic data ranked in descending order. This table is obtained by sorting the hourly traffic data in descending order at step 702. A daily traffic data table 93 has the daily traffic data ranked in descending order. This table is obtained by sorting the daily traffic data in descending order at step 702. A monthly traffic data table 94 has the monthly traffic data ranked in descending order. This table is obtained by sorting the monthly traffic data in descending order at step 702. A yearly traffic data table 95 has the yearly traffic data ranked in descending order. This table is obtained by sorting the yearly traffic data in descending order at step 702.

(D) Decentralization of Processing

The foregoing relates to a case in which a single server functioning as a network management device is provided to perform network management. However, it is also possible to configure a system in such a manner that network management is performed by decentralized processing through provision of a plurality of servers.

Figure 63:
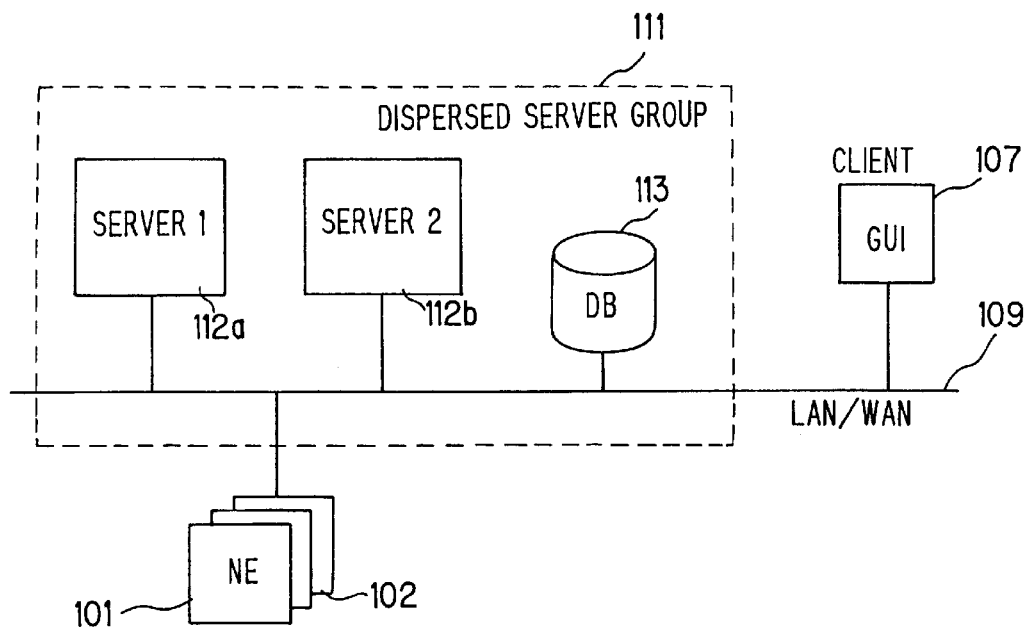
FIG. 63 is a diagram illustrating the configuration of dispersed server system.

FIG. 63 is a diagram illustrating the configuration of dispersed server system. Shown in FIG. 63 are the network elements 101, 102, the client 107, the management network 109 such as a LAN/WAN and a dispersed server group 111. The server group 111 includes a server 112a functioning as a first network management device, a server 112b functioning as a second network management device, and a data base 113 shared by both servers. The dispersed server group 111 manages the network elements 101, 102 connected by the management network 109, and the client 107 is capable maintaining and managing the network elements 101, 102 by accessing the dispersed server group 111.

Figure 64:
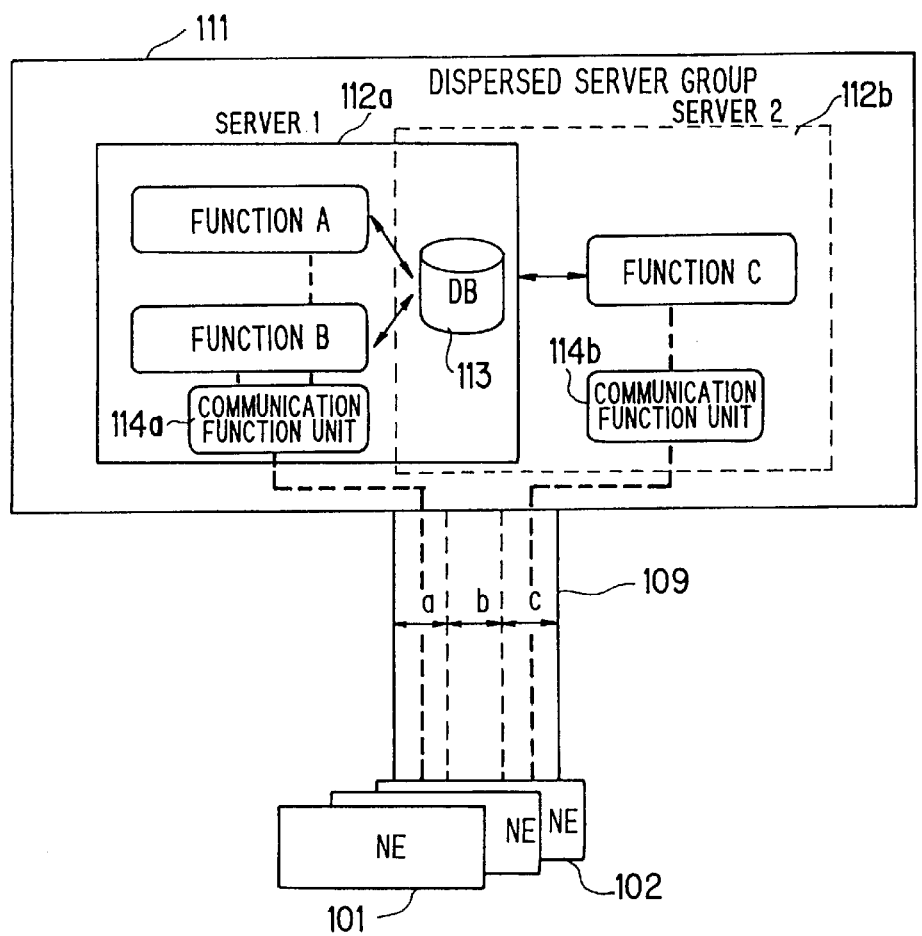
FIG. 64 is a diagram for describing decentralized processing.

FIG. 64 is a diagram for describing decentralized processing. The plurality of servers 112a, 112b are dispersed according to function and processing is logically decentralized by providing logical channels between the managed objects (network elements 101, 102) and the server group 111. As a result, line occupation by specific functions between the managed objects (network elements) and the server group 111 is avoided and each function utilizes the respective one of the logical channels, whereby the functions can maintain and operate the managed objects smoothly.

The dispersed servers 112a, 112b individually possess communication function units 114a, 114b, respectively, and are capable of managing each of the managed objects (network elements). Accordingly, a function A or a function B implemented by the server 112a with regard to a managed object (network element), as by issuance of a command, uses a logical channel a, and a function C implemented by a managed object (network element) with regard to the server 112b, as by an autonomous message, uses a logical channel c.

Thus, by dispersing a maintenance function among a plurality of the servers 112a, 112b having the communication function units 114a, 114b, respectively, and independently allocating, by the logical channels, the band used by the line 109, it is possible to reduce convergence with regard to data input to and output from the communication function unit of each server. In a case where there is notification of a large quantity of alarms from a managed object (network element), it is possible to readily introduce maintenance, operations and control commands from the server 112a to the managed object while an autonomous message is received by the server 112b. More specifically, it is possible to avoid a situation in which a command having a high priority can no longer be introduced to the managed object during the reception of a large quantity of event or alarm information.

In accordance with the present invention, if management information necessary for executing a prescribed operation has been acquired, the operation can be accepted and network management executed even if all of the management data concerning the network elements has not been acquired by the network element management data acquisition means. This makes it possible to shorten the time needed for start-up or resumption of operation and makes it possible for the operator to execute a smooth management operation.

In accordance with the present invention, resource management data acquisition means acquires management data, which relates to network element resources, from the root of a tree structure in stages in regular order, wherein the tree structure indicates the sequence of acquisition. Further, alarm management data acquisition means acquires management data relating to alarms in stages in order of decreasing inclusion level of an inclusion structure, which indicates the sequence of acquisition. As a result, executable operations can be increased in stages even before acquisition of all management data is completed at start-up or resumption of operation of the network management device. Moreover, it is possible to narrow down managed objects in dependence upon the status of management data acquisition to finally obtain the target managed object (e.g., a faulty device). Accordingly, an operator utilizing the network management device is capable of successively performing executable operations and of executing resource management and alarm management smoothly.

In accordance with the present invention, traffic data is acquired over a prescribed period of acquisition time per management category and is stored in the form of a three-dimensional matrix structure with regard to each managed object. As a result, by specifying (1) the managed object, (2) the management category and (3) the acquisition time period, traffic characteristics can be created and output using traffic data regarding the desired managed object, management category and time period.

In accordance with the present invention, the traffic data having the three-dimensional structure is edited to thereby create traffic characteristics required by the network end user, such as the daily change in traffic, the weekly change in traffic, the monthly change in traffic and the yearly change in traffic, with regard to a prescribed managed object and management category. These traffic characteristics can be supplied to the network end user in the form of a graph or the like.

In accordance with the present invention, user correlation means for establishing correspondence between an object of traffic management and its user is provided, and network management execution means handles traffic data solely with regard to the managed object with which one-to-one correspondence with the user has been established. If the name of the user is entered, therefore, the network management execution means obtains the managed object from the corresponding relationship, reads traffic data regarding this managed object (the user) from the storage means, creates a traffic characteristic required by the user and presents the traffic characteristic to the user.

In accordance with the present invention, managed object, management category and period of preservation are specified interactively, traffic data of each network element is acquired solely with regard to the object managed, management category and preservation period designated, and the traffic data is stored. This makes it possible to reduce the required storage capacity of the storage means and to shorten the time needed to collect the traffic data.

In accordance with the present invention, acquired traffic data (number of cells, number of calls, number of sessions, etc.) of a first time period is shaped to traffic data, such as average value, peak value and total amount, of a second time period longer than the first time period. Thereafter, the traffic data of shorter time periods is successively shaped to traffic data, such as average value, peak value and total amount, of longer time periods as necessary. As a result, the required storage capacity of the storage unit can be reduced, traffic data can be preserved efficiently even when long-term preservation is specified, and a variety of traffic characteristics can be created and output using the compressed and shaped data.

In accordance with the present invention, traffic data is sorted by day, week, month or year time period in accordance with a prescribed reference, and a plurality of the higher ranking sorted results can be output. As a result, a singular time, day, month and year when e.g. frequency of utilization is high or a singular subscriber for whom frequency of utilization is high can be specified with ease.

As many apparently widely different embodiments of the present invention can be made without departing from the spirit and scope thereof, it is to be understood that the invention is not limited to the specific embodiments thereof except as defined in the appended claims.

What is claimed is:

1. A network management device for managing a plurality of network elements interconnected by a communication network, wherein the network management device is connected to each of the network elements via a management network and comprises:

network element management data acquisition means for acquiring, in stages, various management data possessed by the network elements when a session with a network element is resumed and when the network management device itself is started up;

operation dependence rule storage means for storing a dependence relationship between an operation relating to network management and management data necessary to execute network management that conforms to said operation;

means for referring to the dependence relationship, when an operation has been specified, for determining whether management data necessary to execute the network management that conforms to the operation has been acquired; and means for executing the network management that conforms to said operation in a case where the necessary data has been acquired;

whereby an operation for which management data necessary for executing the network management has been acquired is made utilizable before all of the management data concerning each of the network elements is acquired by the network element management data acquisition means.

2. The apparatus according to claim 1, wherein said network element management data acquisition means has resource management data acquisition means;

said resource management data acquisition means acquiring, in stages, management data relating to each resource of the network elements.

3. The apparatus according to claim 2, further comprising means for stipulating and storing, in the form of a tree structure, a sequence through which management data relating to resources of the network elements is acquired;

said resource management data acquisition means acquiring, in stages, and in regular order starting from the root of the tree structure, said management data relating to said resources of the network elements.

4. The apparatus according to claim 1, wherein said network element management data acquisition means has alarm management data acquisition means;

said alarm management data acquisition means acquiring, in stages, management data relating to an alarm.

5. The apparatus according to claim 4, further comprising means for stipulating and storing, in the form of an inclusion structure, a sequence through which management data relating to an alarm is acquired;

said alarm management data acquisition means acquiring, in stages, and in regular order of inclusion levels in the inclusion structure, said management data relating to said alarm.

6. The apparatus according to claim 1, wherein said network element management data acquisition means has traffic management data acquisition means;

said traffic management data acquisition means acquiring, in stages, management data relating to traffic management of each managed object.

7. A network management device for managing a plurality of network elements interconnected by a communication network, wherein the network management device is connected to each of the network elements via a management network and comprises:

network element management data acquisition means for acquiring management data possessed by the network elements;

storage means for storing the management data acquired by said network element management data acquisition means; and network management execution means for executing processing, which conforms to an operation relating to network management, using the management data that has been acquired, and outputting results of this processing;

said network element management data acquisition means having traffic data acquisition means;

said traffic data acquisition means acquiring traffic data over a prescribed period of time for each management category of each managed object, and storing the traffic data acquired in said storage means in the form of a three-dimensional matrix structure in which managed object, management category and period of time serve as variables.

8. The apparatus according to claim 7, further comprising managed object designating means for interactively designating a managed object which is an object of traffic management;

said traffic data acquisition means acquiring traffic data concerning each network element solely with regard to said managed object designated by said managed object designating means.

9. The apparatus according to claim 8, further comprising user correlation means for establishing correspondence between each managed object and its network end user when said managed object is designated by said managed object designating means;

said network management means handling traffic data solely with regard to the managed object with which one-to-one correspondence with the end user has been established.

10. The apparatus according to claim 8, further comprising management category designating means for interactively designating management category for each managed object designated by said managed object designating means;

said traffic data acquisition means acquiring traffic data solely with regard to the designated management category of the designated managed object.

11. The apparatus according to claim 10, further comprising saving period designating means for interactively designating over which time periods traffic data is acquired and stored for each management category designated by said management category designating means;

said traffic acquisition means acquiring traffic data solely over a saving time period, which has been designated by said saving period designating means, with regard to the designated management category of the designated managed object.

12. The apparatus according to claim 11, further comprising data rounding means for shaping a plurality of acquired traffic data of a first time period to traffic data, such as average value, peak value and total amount, of a second time period longer than the first time period, thereafter successively shaping a plurality of traffic data of shorter time periods to traffic data, such as average value, peak value and total amount, of longer time periods as necessary, and storing the data.

13. The apparatus according to claim 7, further comprising:

editing means for editing the acquired traffic data in such a manner that the traffic data can be graphically displayed; and graph output means for outputting graph based upon the traffic data edited by said editing means.

14. The apparatus according to claim 7, further comprising traffic characteristic creating means for creating and outputting traffic characteristic, which has been requested by an operation, using the acquired traffic data.

15. The apparatus according to claim 7, further comprising means for sorting the acquired traffic data in accordance with a prescribed reference and outputting results of sorting.

* * * * *